(12) United States Patent
Burpulis et al.

(10) Patent No.: US 11,023,117 B2
(45) Date of Patent: Jun. 1, 2021

(54) SYSTEM AND METHOD FOR MONITORING VARIATIONS IN A TARGET WEB PAGE

(71) Applicants: Byron Burpulis, Wilmington, DE (US); Josh Kelso, Wilmington, DE (US)

(72) Inventors: Byron Burpulis, Wilmington, DE (US); Josh Kelso, Wilmington, DE (US)

(*) Notice: Subject to any disclaimer, the term of this patent is extended or adjusted under 35 U.S.C. 154(b) by 0 days.

(21) Appl. No.: 16/265,248

(22) Filed: Feb. 1, 2019

(65) Prior Publication Data

US 2019/0235744 A1 Aug. 1, 2019

Related U.S. Application Data

(63) Continuation-in-part of application No. 15/365,077, filed on Nov. 30, 2016, now abandoned, which is a continuation-in-part of application No. 14/990,685, filed on Jan. 7, 2016, now abandoned.

(60) Provisional application No. 62/100,768, filed on Jan. 7, 2015.

(51) Int. Cl.
| | |
|---|---|
| *G06F 3/0484* | (2013.01) |
| *G06Q 10/10* | (2012.01) |
| *G06F 40/194* | (2020.01) |
| *G06F 40/197* | (2020.01) |
| *G06F 40/14* | (2020.01) |

(52) U.S. Cl.
CPC ...... *G06F 3/04847* (2013.01); *G06F 3/04842* (2013.01); *G06F 40/14* (2020.01); *G06F 40/194* (2020.01); *G06F 40/197* (2020.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,115,640 | A * | 9/2000 | Tarumi | G06Q 10/10 700/99 |
| 6,578,005 | B1 * | 6/2003 | Lesaint | G06Q 10/06 705/7.14 |
| 6,973,497 | B1 * | 12/2005 | Border | H04L 41/5048 709/228 |
| 7,360,092 | B1 * | 4/2008 | Peterson | H04L 9/3226 713/150 |
| 7,634,810 | B2 * | 12/2009 | Goodman | H04L 63/1416 726/22 |
| 7,685,631 | B1 * | 3/2010 | Paya | H04L 9/3271 726/8 |

(Continued)

OTHER PUBLICATIONS

Office Action dated Jan. 22, 2018, issued in connection with U.S. Appl. No. 14/990,685 (18 pages).

(Continued)

*Primary Examiner* — Octavian Rotaru
(74) *Attorney, Agent, or Firm* — McCarter & English, LLP

(57) ABSTRACT

Systems and methods for automatic detection of variances in digital assets such as web pages are provided. User interface screens are generated by the system for allowing a user to review a target digital asset and to select portions of the digital asset for automatic variance detection by the system. The system then monitors the selected portions of the digital asset (or, the entire digital asset) for variances, and automatically generates reports indicating detected variances.

26 Claims, 43 Drawing Sheets

(56) References Cited

U.S. PATENT DOCUMENTS

| | | | | |
|---|---|---|---|---|
| 7,698,442 B1* | 4/2010 | Krishnamurthy | ... | H04L 63/1483 709/229 |
| 7,769,820 B1* | 8/2010 | Spies | ...... | H04L 63/08 709/218 |
| 7,818,399 B1* | 10/2010 | Ross, Jr. | ........... | G06Q 30/0613 709/218 |
| 8,079,087 B1* | 12/2011 | Spies | ...................... | G06F 21/51 726/26 |
| 8,112,791 B2* | 2/2012 | Kiester | ................... | G06F 21/31 726/6 |
| 8,627,438 B1* | 1/2014 | Bhimanaik | ............. | H04L 65/60 726/9 |
| 8,739,264 B1* | 5/2014 | Eddings | .............. | H04L 63/0853 726/9 |
| 8,776,196 B1* | 7/2014 | Oliver | ................ | H04L 63/1408 726/6 |
| 8,910,281 B1* | 12/2014 | Aharoni | .............. | H04L 63/1416 726/22 |
| 9,083,735 B2* | 7/2015 | Reumann | ............ | H04L 63/1441 |
| 9,300,653 B1* | 3/2016 | Dufel | .................. | H04L 63/0823 |
| 9,325,730 B2* | 4/2016 | Higbee | ................. | H04L 51/22 |
| 9,521,161 B2* | 12/2016 | Reumann | ............ | H04L 63/1483 |
| 9,621,579 B2* | 4/2017 | Casaburi | ............. | H04W 12/12 |
| 9,712,508 B2* | 7/2017 | Prakash | .............. | G06F 11/1461 |
| 2002/0133596 A1* | 9/2002 | Border | ................... | H04L 45/22 709/227 |
| 2004/0078422 A1* | 4/2004 | Toomey | .............. | H04L 63/1466 709/202 |
| 2004/0123157 A1* | 6/2004 | Alagna | ............... | H04L 63/1466 726/8 |
| 2004/0181571 A1* | 9/2004 | Atkinson | ............. | G06Q 10/107 709/200 |
| 2004/0255137 A1* | 12/2004 | Ying | ................... | H04L 63/0884 713/193 |
| 2005/0071755 A1* | 3/2005 | Harrington | ............. | G06F 40/14 715/229 |
| 2005/0076221 A1* | 4/2005 | Olkin | ...................... | H04L 51/28 713/176 |
| 2006/0041508 A1* | 2/2006 | Pham | .................. | H04L 63/1433 705/50 |
| 2006/0069605 A1* | 3/2006 | Hatoun | ............ | G06Q 10/06316 705/7.15 |
| 2006/0069697 A1* | 3/2006 | Shraim | .............. | H04L 63/1425 |
| 2006/0080735 A1* | 4/2006 | Brinson | ............... | G06F 21/554 726/22 |
| 2006/0123478 A1* | 6/2006 | Rehfuss | ................ | H04L 63/1408 726/22 |
| 2006/0271861 A1* | 11/2006 | Yolleck | .............. | H04L 63/1483 715/760 |
| 2006/0291455 A1* | 12/2006 | Katz | ...................... | H04L 67/14 370/355 |
| 2007/0039038 A1* | 2/2007 | Goodman | .......... | H04L 63/1441 726/2 |
| 2007/0073575 A1* | 3/2007 | Yomogida | ....... | G06Q 10/063114 705/7.15 |
| 2007/0101010 A1* | 5/2007 | Ellison | .................... | G06F 21/36 709/229 |
| 2007/0107053 A1* | 5/2007 | Shraim | .............. | H04L 63/1483 726/22 |
| 2007/0192853 A1* | 8/2007 | Shraim | .............. | H04L 63/1483 726/22 |
| 2007/0245027 A1* | 10/2007 | Ghosh | ............... | H04L 29/12594 709/228 |
| 2007/0250920 A1* | 10/2007 | Lindsay | ................ | G07F 7/1025 726/7 |
| 2007/0294352 A1* | 12/2007 | Shraim | .............. | H04L 63/1491 709/206 |
| 2007/0294762 A1* | 12/2007 | Shraim | .............. | H04L 63/1491 726/22 |
| 2007/0299915 A1* | 12/2007 | Shraim | .............. | H04L 63/1491 709/206 |
| 2008/0178117 A1* | 7/2008 | Gelman | ................ | G06F 3/0481 715/808 |
| 2008/0189608 A1* | 8/2008 | Nurmi | ................... | G06F 40/169 715/273 |
| 2008/0289047 A1* | 11/2008 | Benea | ................ | H04L 63/1483 726/27 |
| 2009/0063850 A1* | 3/2009 | Joram | ................... | H04L 9/3271 713/155 |
| 2009/0077383 A1* | 3/2009 | de Monseignat | ... | H04L 63/0823 713/175 |
| 2009/0077637 A1* | 3/2009 | Santos | ............... | H04L 63/1483 726/5 |
| 2009/0086936 A1* | 4/2009 | Clifford | ........... | G06Q 10/06398 379/88.13 |
| 2009/0180606 A1* | 7/2009 | Omiya | .................... | G06Q 10/06 379/265.05 |
| 2009/0232366 A1* | 9/2009 | Okochi | .................. | G06Q 10/10 382/119 |
| 2009/0260010 A1* | 10/2009 | Burkhart | ................ | G06F 9/451 718/100 |
| 2009/0328208 A1* | 12/2009 | Peters | ................. | H04L 63/1441 726/22 |
| 2010/0043058 A1* | 2/2010 | Sanders | ................. | G06F 21/36 726/3 |
| 2010/0122202 A1* | 5/2010 | Omiya | ................... | H04M 3/5175 715/772 |
| 2010/0179853 A1* | 7/2010 | Garcia | ............... | G06Q 10/0631 705/7.12 |
| 2010/0241595 A1* | 9/2010 | Felsher | .................. | G06Q 10/10 705/400 |
| 2010/0259464 A1* | 10/2010 | Chang | ................ | H04M 1/7253 345/2.3 |
| 2010/0262904 A1* | 10/2010 | Chou | .................. | G06F 16/9577 715/240 |
| 2011/0010219 A1* | 1/2011 | Stearns | ............. | G06Q 10/0633 705/7.27 |
| 2011/0140834 A1* | 6/2011 | Kiliccote | ............. | G06F 21/606 340/5.2 |
| 2011/0214187 A1* | 9/2011 | Wittenstein | ........... | H04L 61/301 726/25 |
| 2011/0247045 A1* | 10/2011 | Rajagopal | ........... | H04L 63/1441 726/1 |
| 2011/0277024 A1* | 11/2011 | Begley | ..................... | H04L 63/08 726/7 |
| 2011/0302653 A1* | 12/2011 | Frantz | ................ | H04L 63/1408 726/22 |
| 2011/0314529 A1* | 12/2011 | Bailey, Jr. | .......... | G06Q 20/4014 726/7 |
| 2011/0321125 A1* | 12/2011 | Kyohgoku | ............. | G06F 21/00 726/2 |
| 2012/0054833 A1* | 3/2012 | Albisu | .................... | G06F 21/36 726/4 |
| 2012/0151567 A1* | 6/2012 | Chayanam | ............. | G06F 21/31 726/7 |
| 2012/0179905 A1* | 7/2012 | Ackerly | ............. | H04L 63/0815 713/155 |
| 2012/0204245 A1* | 8/2012 | Ting | ...................... | H04L 9/3228 726/6 |
| 2012/0239928 A1* | 9/2012 | Judell | ..................... | H04L 9/30 713/168 |
| 2012/0254959 A1* | 10/2012 | Schmidt | ............ | H04W 12/0609 726/6 |
| 2012/0330710 A1* | 12/2012 | Hauser | ................... | G06Q 10/10 705/7.15 |
| 2013/0080510 A1* | 3/2013 | Leftik | .................... | G06F 40/274 709/203 |
| 2013/0099891 A1* | 4/2013 | Nandakumar | .......... | G06F 21/31 340/5.2 |
| 2013/0103544 A1* | 4/2013 | Nandakumar | .......... | G06F 21/31 705/26.41 |
| 2013/0104197 A1* | 4/2013 | Nandakumar | .......... | G06F 21/40 726/4 |
| 2013/0104212 A1* | 4/2013 | Nandakumar | ........ | H04L 9/3271 726/7 |
| 2013/0104213 A1* | 4/2013 | Nandakumar | .......... | G06F 21/31 726/7 |

(56) References Cited

U.S. PATENT DOCUMENTS

| | | | | |
|---|---|---|---|---|
| 2013/0104245 | A1* | 4/2013 | Nandakumar | G06F 21/31 726/28 |
| 2013/0145018 | A1* | 6/2013 | Iizuka | G06F 11/0757 709/224 |
| 2013/0159732 | A1* | 6/2013 | Leoutsarakos | G06F 21/31 713/193 |
| 2013/0173351 | A1* | 7/2013 | Livne | G06Q 10/0639 705/7.38 |
| 2013/0185815 | A1* | 7/2013 | Leotsarakos | G06F 21/36 726/30 |
| 2013/0263263 | A1* | 10/2013 | Narkolayev | H04L 63/1483 726/22 |
| 2014/0026220 | A1* | 1/2014 | Gehrig, Jr. | G06F 21/44 726/23 |
| 2014/0189435 | A1* | 7/2014 | Manuel-Devadoss | G06F 11/3495 714/43 |
| 2014/0215217 | A1* | 7/2014 | Gronowski | H04L 9/0819 713/171 |
| 2014/0281490 | A1* | 9/2014 | Prakash | H04W 12/0023 713/155 |
| 2014/0317692 | A1* | 10/2014 | Somekawa | G06F 21/31 726/4 |
| 2014/0359411 | A1* | 12/2014 | Botta | G06F 40/197 715/205 |
| 2015/0067833 | A1* | 3/2015 | Verma | H04L 63/1483 726/22 |
| 2015/0074225 | A1* | 3/2015 | Nagaraju | H04L 67/34 709/217 |
| 2015/0095933 | A1* | 4/2015 | Blackburn | H04N 7/141 725/25 |
| 2015/0134552 | A1* | 5/2015 | Engels | H04L 9/3247 705/318 |
| 2015/0206126 | A1* | 7/2015 | Zeinecker | G06Q 20/3255 705/44 |
| 2015/0319156 | A1* | 11/2015 | Guccione | H04L 63/105 726/7 |
| 2016/0148332 | A1* | 5/2016 | Stibel | G06Q 20/4014 705/44 |
| 2018/0176313 | A1* | 6/2018 | Nagaraj | H04L 67/02 |

OTHER PUBLICATIONS

Office Action dated Jan. 22, 2018, issued in connection with U.S. Appl. No. 15/365,077 (20 pages).
Notice of Abandonment dated Oct. 9, 2018, issued in connection with U.S. Appl. No. 14/990,685 (2 pages).
Office Action dated Nov. 8, 2018, issued in connection with U.S. Appl. No. 15/365,077 (5 pages).
International Search Report and Written Opinion of the International Searching Authority dated Mar. 18, 2020, in connection with International Application No. PCT/US2020/016104 (15 pages).

* cited by examiner

| | Dashboard | Jobs | Reporting | Tickets | Campaign Mgmt | Archives | Disclosures | Admin |
|---|---|---|---|---|---|---|---|---|

Job List ❓ ➡️ Create A New Job ⊕ | Run All Selected Jobs ⟳ | Refresh ⟳ | 🔍 Filter By Search

| | ☐ | Job Id ▾ | Title | TimeStamp | User/Group | Last Activity | Status | Actions |
|---|---|---|---|---|---|---|---|---|
| 1 | ☐ | 150 | diamond test4 | 12/09/2015 04:25 PM | Last01, First01 | Job Created | New | ✏️ |
| 2 | ☐ | 149 | Diamond Test 3 | 12/09/2015 02:48 PM | Developer, Company | Job Scanned | Compliant | ✏️ ⊙ |
| 3 | ☐ | 148 | Kelso testing - this better work | 12/08/2015 03:18 PM | Last02, First02 | Job In Error | In Error | ✏️ |
| 4 | ☐ | 147 | nGage2 | 12/08/2015 01:23 PM | Last03, First03 | Job Created | New | ✏️ |
| 5 | ☐ | 146 | BAC Cash Rewards | 12/09/2015 05:12 PM | Developer, Company | Job Scanned | Compliant | ✏️ ⊙ |

FIG. 5A

| ⚠️ 13 Open Issues | 🕐 1 Open Tickets | ✓ 10 Compliant Jobs | ⚡ 30 Total Jobs |
|---|---|---|---|

Recent Activity ❓ | Create A New Job ⊕ | Refresh ⟳

| | Job Id | Title | TimeStamp ▾ | User | Last Activity | Status | Actions |
|---|---|---|---|---|---|---|---|
| 1 | 152 | Kelso Ngage test | 12/14/2015 08:27 AM | Developer, Company | Job Scanned | Compliant | ✏️ ⊙ |
| 2 | 153 | Andy's Test | 12/11/2015 10:24 AM | Last01, First01 | Job Scanned | Compliant | ✏️ ⊙ |
| 3 | 138 | WorldExtend Test2 | 12/11/2015 10:10 AM | Last01, First01 | Job Scanned | Compliant | ✏️ ⊙ |
| 4 | 147 | nGage2 | 12/10/2015 03:20 PM | Last01, First01 | Notified | 1 Issue | 👁️ ✏️ ⊙ |
| 5 | 150 | diamond test4 | 12/10/2015 10:14 AM | Last02, First02 | BMark Missing | INCOMPLETE | ⊙ |
| 6 | 146 | BAC Cash Rewards | 12/09/2015 05:12 PM | Developer, Company | Job Scanned | Compliant | ✏️ |
| 7 | 151 | Foxnews Test 1 | 12/09/2015 04:25 PM | Developer, Company | Job Created | New | ▶ |
| 8 | 149 | Diamond Test 3 | 12/09/2015 02:48 PM | Developer, Company | Job Scanned | Compliant | ✏️ |
| 9 | 130 | BAC Cash Rewards | 12/09/2015 02:35 PM | Developer, Company | Job Scanned | Compliant | ✏️ ⊙ |
| 10 | 148 | Kelso testing - this better work | 12/08/2015 03:18 PM | Last03, First03 | Job In Error | In Error | ✏️ |

FIG. 5B

Create a Job                                                                 + ×

| Title *       | Enter a name to identify a job              |
|---------------|---------------------------------------------|
| Base Url *    | Enter URL with following format "http..."   |
| Target Url    | Enter URL with following format "http..."   |
| Description   |                                             |

| 🎛 Dashboard | ⚡ Jobs | ☑ Reporting | ☑ Tickets | 🗐 Campaign Mgmt | 📕 Archives | 🏛 Disclosures | ⚙ Admin |

⚡ Job Details - 138 ❓     [Edit Job] [New Benchmark] [Rerun Benchmark] [Run Variance]

| Settings | Activity Log | Variance Runs | Schedules | Notifications | Recording Log | Inspecting Log |

Job
WorldExtend Test2

Description

Base URL
http://www.website.worldextend

Target URL
http://www.website.worldextend

HTML Attributes to Ignore (separate by commas)
id8

URL Parameters to Ignore (separate by commas)
http://www.website.worldextend

Browsers:
Chome 41
Chome 42
Chome 43
Chome 45
Chome 46
Firecat 37
Firecat 38
Firecat 39
Firecat41
IE 10
IE 11
IE 12 (Edge)

»  «

Chome 44
Firecat40

FIG. 5D

⚡Job Details - 147 ❓   [Edit Job] [New Benchmark] [Rerun Benchmark] [Run Variance]

| Settings | Activity Log | Variance Runs | Schedules | Notifications | Recording Log | Inspecting Log |

🔍 Filter By Search

| # | Activity | Message | TimeStamp | User |
|---|---|---|---|---|
| 8 | Benchmark Created | Benchmark created for web driver IE 9 | 12/10/2015 03:17 PM | Last01, First 01 |
| 9 | Benchmark Request | Processing | 12/10/2015 03:17 PM | Last01, First 01 |
| 10 | Job in Queue | Job in queue | 12/10/2015 03:16 PM | Last01, First 01 |
| 11 | Notified | Notificaction was sent | 12/10/2015 03:14 PM | Last01, First 01 |
| 12 | Job Scanned | 1 variance found for job nGage2 | 12/10/2015 03:13 PM | Last01, First 01 |
| 13 | Issues Detected | 1 issue found in web driver IE 9 | 12/10/2015 03:13 PM | Last01, First 01 |
| 14 | Element Error | Element not found | 12/10/2015 03:13 PM | Last01, First 01 |
| 15 | Variance Request | Processing | 12/10/2015 03:12 PM | Last01, First 01 |
| 16 | Job in Queue | Job in queue | 12/10/2015 03:12 PM | Last01, First 01 |
| 17 | Job Successful | Benchmarks created for all browsers | 12/10/2015 03:11 PM | Last01, First 01 |
| 18 | Benchmark Created | Benchmark created for web driver IE 9 | 12/10/2015 03:11 PM | Last01, First 01 |
| 19 | Benchmark Request | Processing | 12/10/2015 03:10 PM | Last01, First 01 |
| 20 | Job in Queue | Job in queue | 12/10/2015 03:10 PM | Last01, First 01 |
| 21 | Job Created | Job Created (nGage2) | 12/08/2015 01:23 PM | Last02, First 02 |

FIG. 5E

| | Archival Management | | | | | |
|---|---|---|---|---|---|---|
| ⏏ Exit Admin | Archival | | | Settings | | |
| ▪ User Management | Archival | | | | | |
| ⁂ Group Management | 10 ▾ records per page | | | | Search: | |
| 🗁 Archive Management | St.No | Job Title | File Name | Type | Job owner name | File Created | Action |
| ▦ Audit Log | 1 | Yawho Test | screenshot1443753125307.jpg | Benchmark | Person 1 name | 2015-11-01 18:34:24.0 | View Delete |
| ⚡ Activity Log | 2 | Yawho Test | screenshot1443753126883.jpg | Benchmark | Person 1 name | 2015-11-01 18:34:24.0 | View Delete |
| ✪ Job Management | 3 | Yawho Test | screenshot1443753128883.jpg | Benchmark | Person 1 name | 2015-11-01 18:34:24.0 | View Delete |
| | 4 | Yawho Test | screenshot1443753130596.jpg | Benchmark | Person 1 name | 2015-11-01 18:34:24.0 | View Delete |
| | 5 | Yawho Test | screenshot1443753132327.jpg | Benchmark | Person 1 name | 2015-11-01 18:34:24.0 | View Delete |
| | 6 | Yawho Test | screenshot1443753134262.jpg | Benchmark | Person 1 name | 2015-11-01 18:34:24.0 | View Delete |
| | 7 | Yawho Test | screenshot1443753135556.jpg | Benchmark | Person 1 name | 2015-11-01 18:34:24.0 | View Delete |
| | 8 | Yawho Test | screenshot1443753136820.jpg | Benchmark | Person 1 name | 2015-11-01 18:34:24.0 | View Delete |
| | 9 | Yawho Test | screenshot1443753138115.jpg | Benchmark | Person 1 name | 2015-11-01 18:34:24.0 | View Delete |
| | 10 | Yawho Test | screenshot1447701812302.jpg | Benchmark | Person 1 name | 2015-11-01 18:34:24.0 | View Delete |

Figure shows a screenshot (4000) of a research interface titled "RESEARCH - Discover OLB Page" with user "Josh Kelso". Navigation tabs include Dashboard, Jobs, Reports, Tickets, Archives, Admin.

Item: 2 of 2 | Browser: Chrome 64 | Ticket No.: 0 | Name: 1st page - modern money blog Page Url: https://www.discover.com/online-banking/

Executed at 06/11/2018 11:15 AM

Content area shows HTML source with anchor tags and links including references to:
- https://www.discover.com/online-banking/banking-topics/how-to-choose-the-right-finance-app/
- "How to Choose the Right Finance App: What to Consider Before Downloading"
- BANK_CDPROD_BANKING_TOPICS_ARTICLE1_READMORE_LNK
- https://www.discover.com/online-banking/banking-topics/how-to-plan-a-vacation-without-going-into-debt/
- "How to Plan a Vacation Without Going Into Debt"
- "Estimate trip costs, save regularly and enjoy your next vacay without the stress of debt"
- BANK_CDPROD_BANKING_TOPICS_ARTICLE1_READMORE_LNK Table (4002):

| Date/Time | Web Driver | Page Url | Name | Element | Ticket No. | Action |
|---|---|---|---|---|---|---|
| 06/11/2018 11:15 AM | Chrome 64 | https://www.discover.com/online-banking | 1st page top banner | /html/body/div[6]/div | 0 | |
| 06/11/2018 11:15 AM | Chrome 64 | https://www.discover.com/online-banking 1st page - modern money blog | | /html/body/div[6]/div[6]/div[6] (4004) | 0 | |

| Date/Time | Web Driver | Page Url | Name | Element | Ticket No. | Action |
|---|---|---|---|---|---|---|
| 03/15/2018 11:48 AM | Chrome 41 | https://www.tdbank.com/personalcare | home page | /\*[@id='td-wrapper']/div | 20180315100001 | ● |

| ejjs™ | Dashboard | ⚡ Jobs | ⊞ Reports | ⌨ Tickets | ✉ Archives | ✱ Admin | | Josh Kelso ˅ |

⚡ Andover Bank ⓘ

Item: 1 of 2 | Browser: Chrome 44 | Ticket No.: 0 | Name: home page | ◨ ◨ ◁ ◨ ◇ | Return to Job Page Url: http://www.andoverbankohio.com/

Executed at 09/25/2017 02:26 PM

<form method="post" action="/" id="main"> <div class>aspNetHidden"> <input type="hidden" name="_EVENTTARGET" id="_EVENTTARGET" value=""> <input type="hidden" name="_EVENTARGUMENT" id="_EVENTARGUMENT" value=""> </div> <input type="hidden" name="_LASTFOCUS" id="_LASTFOCUS" value=""> <div class>aspNetHidden"> <input type="hidden" name="hdnSubDirectory" id="hdnSubDirectory"> <header> <div class="container"> <div class="grid_12"> <div class="box model clearfix"> <div class="box_item"> <p><a href="/"><img alt="Andover_Bank_logo" class="hdr_logo"></p> <p><a href="/"><img alt="Andover_Bank_logo" src="/cms/images/layout/header_logo.png"></a></p> <div class="box_item"> <img alt="Andover_Bank_logo" class="mb" src="/cms/images/layout/header_logo_mb.png"></a></p> </div> <div class="box item"> <div class="hdr_tools_mod Clearfix"> <ul class=

<form method="post" action="/" id="main"> <div class>aspNetHidden"> <input type="hidden" name="_EVENTTARGET" id="_EVENTTARGET" value=""> <input type="hidden" name="_EVENTARGUMENT" id="_EVENTARGUMENT" value=""> <input type="hidden" name="_LASTFOCUS" id="_LASTFOCUS" value=""> <div class>aspNetHidden"> <input type="hidden" name="hdnSubDirectory" id="hdnSubDirectory"> <header> <div class="container"> <div class="grid_12"> <div class="box model clearfix"> <div class="box_item"> <p><a href="/"><img alt="Andover_Bank_logo" class="hdr_logo"></p> <img src="/cms/images/layout/header_logo.png"></a></p> <div class="box_item"> <img alt="Andover_Bank_logo" class="mb" src="/cms/images/layout/header_logo_mb.png"></a></p> </div> <div class="box item"> <div class="hdr_tools_mod Clearfix"> <ul class="

| Date/Time | Web Driver | Page Url | Name | Element | Ticket No. | Action |
|---|---|---|---|---|---|---|
| 09/25/2017 02:26 PM | Chrome 44 | http://www.andoverbankohio.com/ | home page | /html/body/form | 0 | ⦿ |
| 09/25/2017 02:26 PM | Chrome 44 | http://www.andoverbankohio.com/busine business tab | | /html/body/form | 0 | ⦿ |

FIG. 26 ejis™

| @ Dashboard | 4 Jobs | 📊 Reports | 🖉 Tickets | 🗔 Archives | ⚙ Admin | | | Josh Keiso ⌄ |

4 RESEARCH - Discover Credit...②    Edit Job | New Benchmark | Rerun Benchmark | Run Job Settings | Permissions | Schedules | Notifications | Benchmark Runs | Variance Runs | Activity Log Refresh ↻    All ⌄    🔍 Filter By Search

| State | Status | Run # | Date/Time | Browser | User | Action |
|---|---|---|---|---|---|---|
| Current | Success | 3 | 03/20/2018 12:26 PM | Chrome 64 | Keiso, Josh | 👁 |
| Current | Success | 3 | 03/20/2018 12:25 PM | Firefox 58 | Keiso, Josh | 👁 |
| Current | Success | 3 | 03/20/2018 12:24 PM | Safari 11.0 | Keiso, Josh | 👁 |
| Current | Success | 3 | 03/20/2018 12:19 PM | Chrome 41 | Keiso, Josh | 👁 |
| Current | Success | 3 | 03/20/2018 12:18 PM | Firefox 37 | Keiso, Josh | 👁 |
| Current | Error | 3 | 03/20/2018 12:18 PM | Safari 5.1 | Keiso, Josh | 👁 |
| Current | Success | 3 | 03/20/2018 12:17 PM | IE 10 | Keiso, Josh | 👁 |
| History | Success | 1 | 03/20/2018 12:12 PM | Chrome 64 | Keiso, Josh | 👁 |

FIG. 27A ejis™

- Exit Admin
- User Management
- Group Management
- Archive Management
- Audit Log
- Activity Log
- Job Management &jkelso ▾

Audit Log

Log Date and Log Type Filters

06/19/2018–06/19/2018 | --Select-- ▾ | Search

10 ▾ records per page    Search: [ ]

| Entry # | User Name | Date | Type | Message | IP Address | Browser |
|---|---|---|---|---|---|---|
| 1 | Josh Kelso | 06/19/2018 01:39 PM | USER | Retrive all group name load dropdown | 50.200.28.206 | User-Agent:Mozilla/5.0 (Macintosh; Intel Mac OS X 10.12; rv:52.0) Gecko/20100101 Firefox/52.0(1024x768) |
| 2 | Josh Kelso | 06/19/2018 09:29 AM | AE_USERS | admin | 50.200.28.206 | User-Agent:Mozilla/5.0 (Macintosh; Intel Mac OS X 10.12; rv:52.0) Gecko/20100101 Firefox/52.0(900x1440) |
| 3 | Josh Kelso | 06/19/2018 09:29 AM | AE_USERS | Authentication | 50.200.28.206 | User-Agent:Mozilla/5.0 (Macintosh; Intel Mac OS X 10.12; rv:52.0) Gecko/20100101 Firefox/52.0(900x1440) |
| 4 | Tony Tancredi | 06/19/2018 09:29 AM | AE_USERS | Authentication | 50.200.28.206 | User-Agent:Mozilla/5.0 (Macintosh; Intel Mac OS X 10.13; rv:60.0) Gecko/20100101 Firefox/60.0(1440x3440) |

FIG. 27B

SYSTEM AND METHOD FOR MONITORING VARIATIONS IN A TARGET WEB PAGE

RELATED APPLICATIONS

The present application is a continuation-in-part of U.S. patent application Ser. No. 15/365,077 filed Nov. 30, 2016, which is a continuation-in-part of U.S. patent application Ser. No. 14/990,685 filed Jan. 7, 2016, which claims priority to U.S. Provisional Patent Application Ser. No. 62/100,768 filed Jan. 7, 2015, the contents of all of which are hereby expressly incorporated by reference in their respective entirety.

FIELD

The present invention relates to a risk mitigation tool that may be utilized by enterprise clients, and, more particularly, to an engine, system and method of providing an automated and efficient process and methodology for managing, monitoring, and maintaining online digital and mobile presence and assets.

BACKGROUND

One of the main challenges facing most enterprises is that they support multiple public-facing websites that require significant resources to maintain, monitor and manage. Through the normal course of business, enterprise websites undergo many instances of content and functional changes that require large investments of resources to implement and manage. As a result, many enterprise customer and/or public facing websites have inaccurate content and messaging displayed that poses potential risk and/or liability to the organization. For example, risks may include: Financial (tied to promotional offers and disclosures); Brand/Reputation; Customer Attrition; Partnerships/Vendor Attrition; Disruption in supply chain delivery of products/services; Internal and External Policy; and legal, by way of non-limiting example.

To date, there exists no automated, single-source solution that allows an organization to ensure accuracy across all of its online digital assets from a content and visual perspective. As such, it would be desirable to provide enterprise clients an application to automate monitoring of an online/digital asset (website, micro-site, mobile app) using multiple comparison methods alongside a rules-based engine to identify the differences from the intended display. Along with alleviating human error and enabling a more efficient and effective QA Testing process, such an apparatus, system and method could act as an audit tool to store and maintain versions of legal/risk/compliance digital communications, and further will substantially reduce the labor cost structures customarily associated with these types of audit and other related digital reviews through the solution's automated timestamp, reconciliation, and organization processes specially associated with the comparative and identification methods.

Thus, there is a need for a single source solution that allows an organization to ensure accuracy across all online digital assets from a content and visual perspective. More particularly, there is a need for an engine, system and method to provide enterprise clients an application that will automate monitoring of an online/digital asset (website, micro-site, mobile app) using multiple comparison methods alongside a rules-based interrogation engine to identify the differences from the intended display.

SUMMARY

The present invention provides an engine, system and method for providing automated and efficient processes for managing, monitoring, and maintaining online digital and mobile presence and assets. Such a system may allow for the elimination of human error and the enabling of a more efficient and effective content experimentation and testing process. The present invention may also may act as an audit tool to store and maintain versions of legal/risk/compliance digital communications for use across a system. The present invention may be immediately deployable within an existing technology infrastructure, and may be deployed as a thin client and/or user-transparent client, and may further provide for cross-platform communication between systems and devices not otherwise communicatively compatible.

The present invention provides a system for auditing digital content, comprising a non-transitory computer readable medium having stored thereon a computer executable program, the computer executable program when executed causes a computer system to select a portion of a base digital content, wherein the base digital content comprises a static arrangement of information and is stored on a database communicatively coupled to the computer system; locate through at least one known address at least one presented digital content; compare the selected portion of the base digital content to a portion of the presented digital content; wherein the presented digital content is at least partially resident on at least one virtual server accessed by a remote user.

Also provided are systems and methods for automatic detection of variances in digital assets such as web pages. User interface screens are generated by the system for allowing a user to review a target digital asset and to select portions of the digital asset for automatic variance detection by the system. The system then monitors the selected portions of the digital asset (or, the entire digital asset) for unauthorized variances, and automatically generates reports indicating detected variances.

It is to be understood that both the foregoing general description and the following detailed description are exemplary and explanatory, and are intended to provide further explanation of the invention as discussed herein throughout.

BRIEF DESCRIPTION OF THE DRAWINGS

The accompanying drawings are included to provide a further understanding of the disclosed embodiments. In the drawings:

FIGS. 5A-E illustrate exemplary embodiments of the present invention;

FIG. 8 illustrates an exemplary embodiment of the present invention;

FIGS. 20A-25B are screenshots illustrating sample user interface screens generated by the system for allowing a user to review both a graphical rendering of a target website page and corresponding HTML code, and to identify portions of the website page for automatic variance detection; and FIGS. 26-27B are screenshots illustrating additional user interface screens generated by the system.

DETAILED DESCRIPTION

A computer-implemented platform and methods of use are disclosed that provide more automated and efficient process and methodology for managing, monitoring, and maintaining online digital and mobile presence. Described embodiments are intended to be exemplary and not limiting. As such, it is contemplated that the herein described systems and methods can be adapted to provide many types of users with access and delivery of many types of domain data, and can be extended to provide enhancements and/or additions to the exemplary services described. The invention is intended to include all such extensions. Reference will now be made in detail to various exemplary and illustrative embodiments of the present invention.

Figure 1:
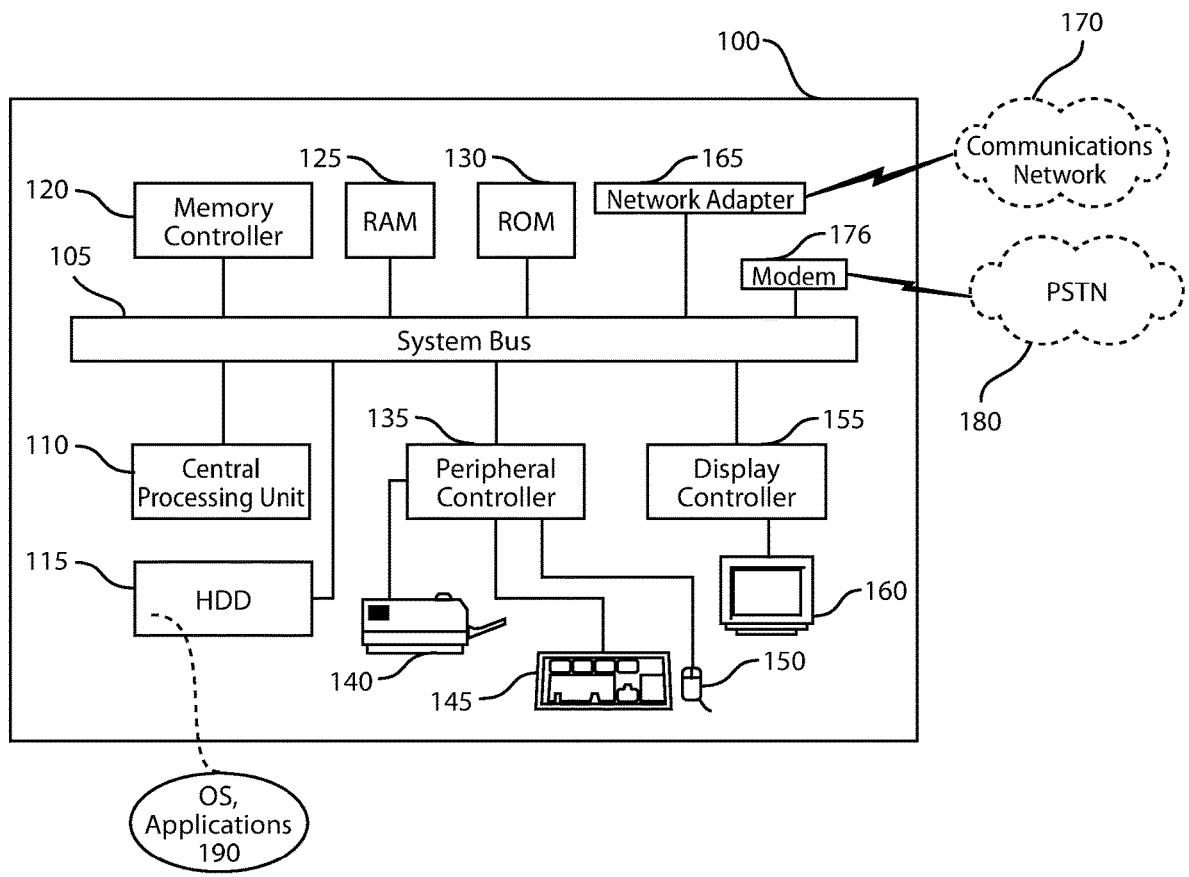
FIG. 1 is a block diagram of an exemplary computing system for use in accordance with herein described systems and methods.

FIG. 1 depicts an exemplary computing system 100 that can be used in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, mobile devices, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based display, gas plasma-based display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically, and may be coupled directly to computing system 100, or indirectly to computing system 100, such as via PSTN or cellular network 180. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
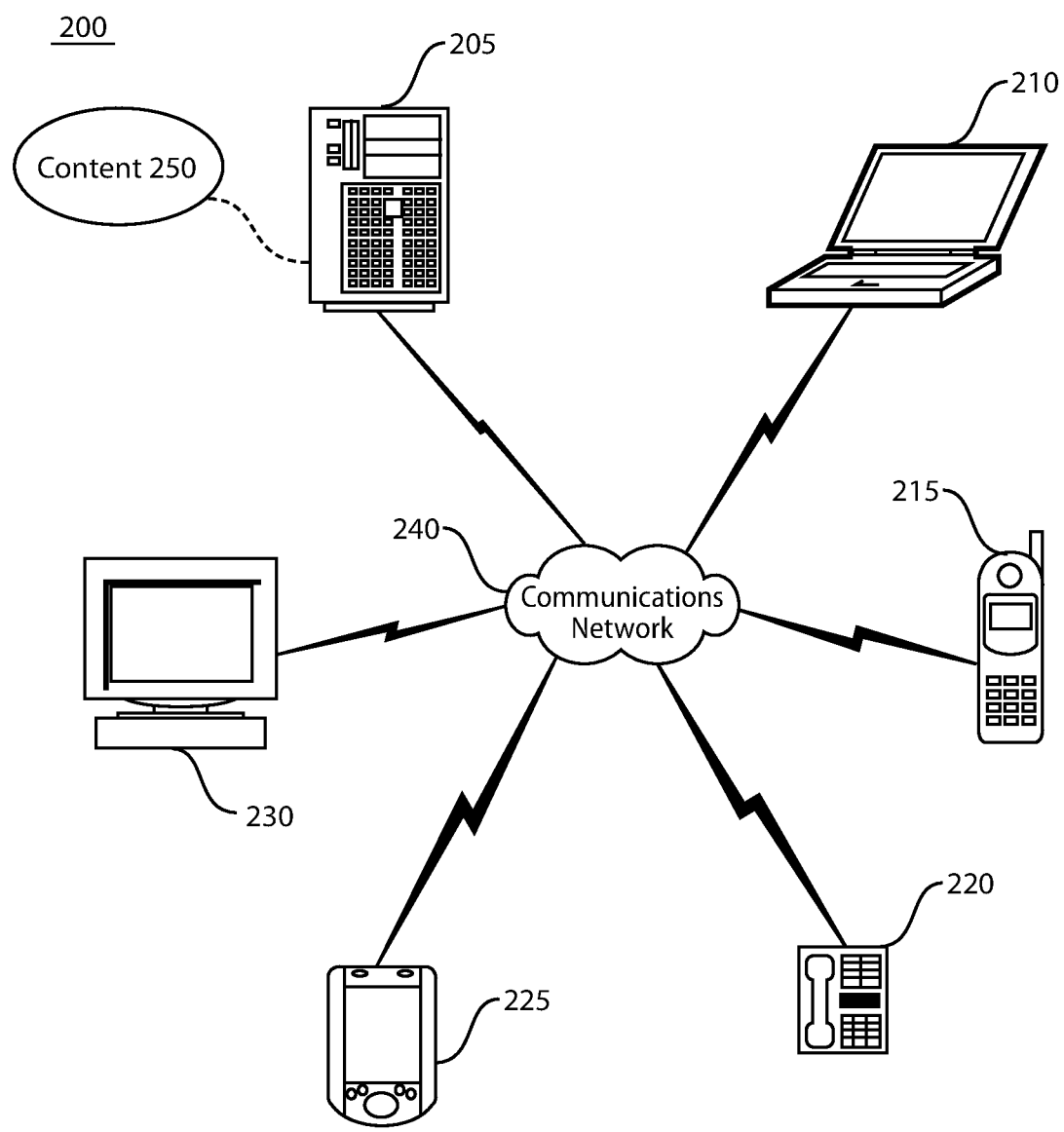
FIG. 2 is a block diagram showing an exemplary networked computing environment for use in accordance with herein described systems and methods.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or independently developed applications, the like, to interact with server 205.

The server 205 may thus deliver applications specifically designed for mobile client devices, such as, for example, client device 225. A client device 225 may be any mobile telephone, PDA, tablet or smart phone and may have any device compatible operating system. Such operating systems may include, for example, Symbian, RIM Blackberry OS, Android, Apple iOS, Windows Phone, Palm webOS, Maemo, bada, MeeGo, Brew OS, and Linux for smartphones and tablets. Although many mobile operating systems may be programmed in C++, some may be programmed in Java and .NET, for example. Some operating systems may or may not allow for the use of a proxy server and some may or may not have on-device encryption. Of course, because many of the aforementioned operating systems are proprietary, in prior art embodiments server 205 delivered to client device 225 only those applications and that content applicable to the operating system and platform communication relevant to that client device 225 type.

JavaScript Serialized Object Notation (JSON), a lightweight, text-based, language-independent data-interchange format, is based on a subset of the JavaScript Programming Language, Standard ECMA-262, 3.sup.rd Edition, dated December 1999. JSON syntax is a text format defined with a collection of name/value pairs and an ordered list of values. JSON is very useful for sending structured data over wire (e.g., the Internet) that is lightweight and easy to parse. It is language and platform independent, but uses conventions that are familiar to C-family programming conventions. The JSON language is thus compatible with a great many operating systems (a list of such systems is available at www.json.org).

The present invention may provide functionality such as client integration and absorption/use by the client through a Web/Browser, and with or without external and internal hosting options (externally hosted—no internal tech development or installation needed by the client; internally hosted on clients enterprise hardware (environment). Functionality may additionally be provided using the computing systems and networks discussed above based on a hybrid approach, such as wherein a user's existing service integration provider is leveraged.

The present invention may be configured in any number of ways, including: initial Setup of each URL to be monitored; records URL and authorization credentials where required; user specific business rules; records user actions and keystrokes to replicate customer interaction; and/or utilizes those keystrokes to scan different browsers and versions selected by the user.

The present invention may provide for the recording of content using a recorder/snippet module and may provide the following functionality, such as to ensure compliance of digital assets with benchmarks within the bounds indicated by a rules-set: Contextual comparison—HTML DOM (Document Object Model) layer; Pixel comparison—Image of each webpage or selected zone/area/snippet; Snippet comparison—Specific, user designated/identified section or area of a webpage; software will leverage contextual, pixel and snippet comparison functionality to identify any unintended display; Supports multi-browser functionality, to encapsulate entire customer population) a user may employ (any known browser system).

The present invention may provide various detection elements through the at least one rules engine, such as: Delta in any visual and HTML elements; Variations in copy/text; Variation in asset and image location; Image accuracy; Validation of all internal and external links; and/or Validation of colors and style.

The present invention may thus provide a business rules engine that allows for application and/or vertical specific rules that provide: Rules based interrogational engine; Set business specific tolerances at multiple levels (for example, URL, Webpage, Snippet on a webpage (specific area identified on the webpage), Multiple snippets on a webpage, and/or Severity levels (high, med, low); Alert management through distribution list based on severity and/or Group setup and management (Production support=High, Business users=Low, etc.) and include multiple channels of engagement for issue management (i.e., Email, Phone, and/or SMS).

The present invention may also provide scanning capabilities for: scanning desired URL(s). For example, such scanning may be subjected to rules related to the frequency of scans (multi-day, daily, weekly, monthly, . . . etc.); and/or the scanning, recordation and reporting/alerting in relation to any and all or particular variances that fall outside the set business rules and tolerances.

The present invention may also provide for QA/Testing, allowing for: automation of testing, such as regression testing, for example, which may reduce people hours to perform QA functions and/or reduces overall costs associated with regression testing; and improve systemic accuracy by removing human error from testing, lowering testing errors, and/or increasing management, controls and efficiency.

The present invention may also comprise at least one Back End Database for storing all data collected; collecting a history of each job/scan (such as errors found, overall status, and/or scan date/timestamp, for example); maintaining versions of selected jobs/scans to produce as audit trails; storing of current and previous status of all jobs/scans; storing results of each Job/Scan; storing user permissioning; and storing user actions (job setup, job initiation, etc.).

An obstacle for content providers when communicating with various third party users and the various devices and software versions used by those users, may be centered on the support of multiple customer or public facing websites and related digital assets, each of which may require significant resources to maintain, monitor, manage, and keep in compliance with regulatory regimes, other industry players, and, for example, Service Level Agreement (SLA) standards, State and Federal government regulatory bodies, industry committees, and related standards organizations, Business to Business (B2B) client service contract standards, and end customer/consumer liability and serviceability warranties and obligations.

An additional obstacle for content providers is the lack of existing internal communication and reconciliation between a digital asset developer's intermittent accomplishment step, or lack thereof, and its definitive reconciliation within the overall sequence of the asset's development. Further, the lack of a definitive connection of the respective resource or content provider's accountability to demonstrate the specific accomplishment in an accountable time sequence through showing a definitive alteration, and/or lack thereof, and that the specific asset development step in sequence is inextricably connected to themselves. The present invention combines this level of recourse or content provider reconciliation in the digital asset solution sequence. Further, by providing a definitive set of automated fail-safe determinations and/or outcomes of all alterations, or lack thereof, within a given step in the sequence, and keeping those findings automatically versioned and always attached to the resource and/or content provider's efforts, or lack thereof, with the asset. Also further, the present invention connects each resource's and/or content provider's step in asset solution sequence connoted in the same way with the other, to form and inextricable chain of asset "accountable steps" on all alterations associated with a given asset in the supply chain for a digital asset's ideation and conceptualization, through development, to production release, and onto on going developments of further testing and asset maintenance. As such the present invention's automation accomplishes, as definitive recognition, exact outcomes of alterations and/or the lack thereof, notification, and attaches accountability to all resources and/or content providers and all accomplishments and/or lack thereof, with a precision and automation never before experienced with the "concept-to-completion" development and on-boarding of digital assets.

Compliance issues are exacerbated because, in the normal course of business, enterprise websites may undergo many instances of content, asset and functionality changes that require large investments of resources to implement and manage. Such changes may include content as well as functionality changes, including, for example, altering the code used to fit and/or optimized use with various OS and access programs, such as browsers and the like. Such changes may result in inaccurate content and messaging being displayed that may pose potential risks and/or liability to the organization and may compromise the exchange of information in and between highly regulated and secure environments.

In sum, the present embodiments may provide mid-layer management and analytics for large scale B2B or B2C methodologies. That is, the exemplary embodiment provide products, apparatuses, systems and methods for managing assets that would typically be the subject of multi-agency oversight, but in the embodiments these assets are managed in a unitary system that provides one or more subsidiary systems. The embodiments may, for example, employ analytics on digital assets to generate tasks, or "tickets", to fix inconsistencies in the digital assets that may incur liabilities if left unremediated.

Accordingly, the embodiments may provide closed system control, wherein access to digital assets is provided, the received digital assets are managed and analyzed, tickets are generated within the system, workflow responsive to the tickets is managed within the system, and remedial action may or may not be taken within the system to output corrected digital assets. That is, in some exemplary embodiments, solely the ticket indicating the need for remedial action may be issued by the inventive embodiments, while in other embodiments an end-to-end corrective system for remediation of digital assets may be provided. Thereby, the remediation of digital assets may be management by the closed system using any of a variety of known methodologies, including charging fees in a per transaction basis, a daily, monthly, annual, or multi-annual subscription basis, or the like.

In providing the subject "system", exemplary embodiments may be highly applicable in regulated industries that use online content. In short, exemplary embodiments may be employed in numerous verticals, and with numerous size companies, wherein all such verticals or companies must carefully manage digital assets, either for the purposes of meeting subject regulations, or for the purposes of customer service and public relations, by way of non-limiting example. Accordingly, verticals in which the disclosed embodiments may be highly applicable may be, by way of non-limiting example, credit card companies that provide retail or loyalty point systems responsive to purchases using the credit card, and part because such additional services provided by a credit card company are outside of the credit card company's core business, and hence may be the frequent subject of errors in digital assets; providers of large volumes of goods or services for sale, wherein all aspects of the sales volume has related thereto digital content that must be accurately reflective of pricing, state-by-state taxation, shipping costs, and the like, such as Amazon.com; loyalty point systems provided by transportation and travel networks, such as major airlines, hotel chains, and the like; and any goods or service provider that must manage background relationships with providers of retail goods, retail services, gasoline, utilities, finance, food stuffs, and the like, that are outside of the core business of that good or service provider. The foregoing is the case, in large measure, because operation of digital assets outside of or in addition to the provision of core business may heighten the likelihood of errors in digital assets that will require remediation of those digital assets. Moreover, such non-core business aspects may additionally provide liability to the core business, such as in the form of unredeemed points, unredeemed financial aspects, or the like, that may lead to serious accounting errors in the business if the digital assets related to these unredeemed liabilities are improperly managed.

In prior art efforts, issues such as those discussed above are typically handled using exclusively a "stare and compare" methodology. That is, personnel manually review all digital assets related to core and non-core business, an issue spot items of concern in relation to those digital assets. Therefore, current methodologies are both highly inaccurate and very expensive in ways that frequently affect not only a business' performance in its non-core aspects, but which additionally often affect a business and its finances even in performance of its core functions.

Thus, the instant exemplary embodiments provide a mid-level, closed interface which may employ manual, and will employ automated, aspects to manage individual assets. Management of these assets may include analytics related to these assets, corrective action as to the assets, insurance of compliance of assets with laws, regulations, and active campaigns, and the like. Such compliance may include insurance that privacy concerns are avoided as to users, unintentional extension of financial exposure (such as an unintentional extension of dates of discount pricing) are avoided, regulated divisions between customer relations with core and non-core aspects of a good or service are maintained, or the like.

The analytics mentioned above may include reverse looking, current, and forward looking outputs. That is, the analytics may include a rules engine that may spot past errors in digital assets and learn from those errors so that such errors may be avoided in the future; may review current errors in digital assets so that tickets may be generated indicating remedial action of those digital assets; and future analytics may be provided, such as whereby predictive rules may indicate the likelihood of particular individual or individuals redeeming points in certain timeframes, redeeming points for certain goods or services, desiring or needing particular goods or services in the future based on those required or needed in the past, goods or services that are likely to experience an up-pick in demand or a diminishment in supply in the near or long term, the relationship of the offering of certain non-core goods and services to the enhancement of sales or core goods and services, or the like.

Figure 3:
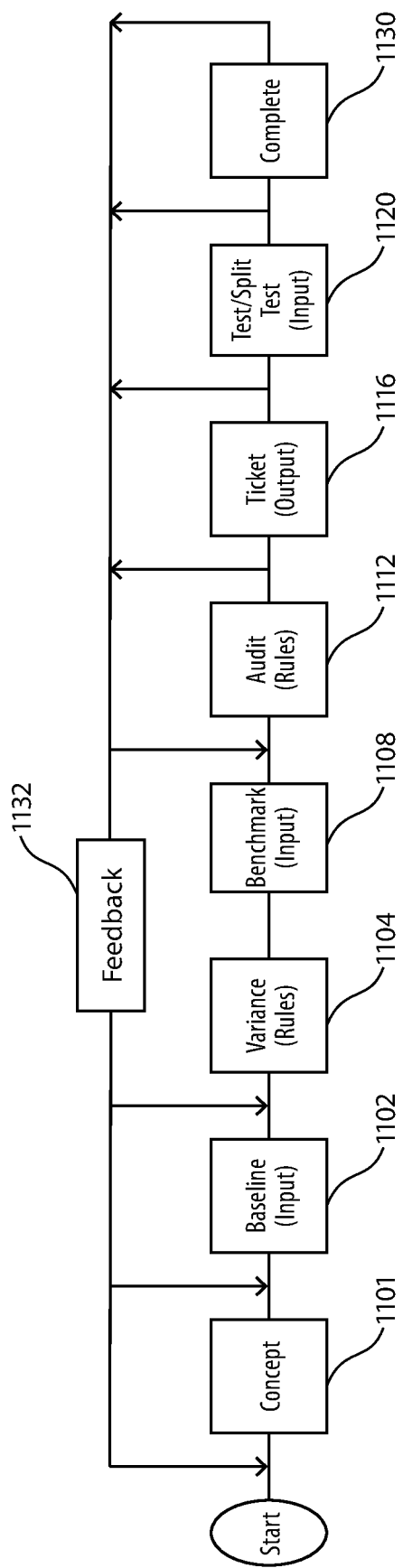
FIG. 3 is a flow diagram illustrating aspects of the exemplary embodiments.

The flow diagram of FIG. 3 is illustrative of an exemplary embodiment of the present invention. In the flow diagram, at step 1102, a base line offer is made, which is derived from or intended to stimulate a particular behavior. At step 1104, the rules engine discussed herein assesses any variance in the display from the base line offer, and may, in certain embodiments, algorithmically estimate the reason for and/or severity of the variance from the baseline. In a variance step, comparative sequencing may be applied, such as wherein as little as one pixel in an incorrect color may be noted by the variance engine, such as to ensure avoidance of any cascade of even the smallest error. For example, an error of even one or a few pixels may cause modification of the amount of information that is displayed on a user screen or page. By way of example, in such a case, if legal disclaimer language was accordingly placed out of view of the user or on a secondary page not in view of the user, significant legal liability may be incurred.

At step 1108 a new benchmark is indicative of a modification to the baseline. Such as wherein a new benchmark indicates requisite changes to the digital assets. The new benchmarks may include, for example, correction of errors, or input modifications to one or more digital assets. At step 1112, an audit is performed. The audit checks for validation of the implementation of the new benchmarks to meet the required specifications. Following the audit, and at step 1116, the ticketing discussed throughout may occur. At the ticketing phase, an indication of corrective action may be issued, such as wherein the rules engine indicates an automated fix for digital asset, or wherein the rules engine indicates the necessity of a manual intervention in order to fix an error discovered in the audit.

At step 1120, the exemplary embodiments may include a split testing, post-ticketing phase. Split testing may allow for optionality in the ticketed modifications to the digital assets provided by the audit based on the benchmarks. That is, multiple different versions of a single digital asset may be provided at the split testing phase, each audited for compliance with a benchmark but also each different in some manner from its other like digital assets. In short, split testing thereby allows for experimentation without need of concern that one or more aspects of the experimentation may be out of compliance with the benchmark. Thereby, for example, multiple different marketing campaigns based in the same digital asset may be used by a single entity for the same good or service, and the disclosed rules engine may analytically track which of the marketing campaigns is most successful for the stated goal. Upon this assessment based on sufficient statistically significant data, the rules engine may automatically eliminate one or more of a marketing campaigns, if so directed by its rule set, to allow enhanced provision of only the most successful marketing campaigns.

In light of the discussion of FIG. 3, the skilled artisan will appreciate that the disclosed embodiments provide a unique analytic tool that integrates, and adds to, that which the prior art provided only in a plurality of tools. For example, the disclosed embodiments employ digital asset auditing for purposes heretofore unknown in the art. Further, the compliance ensured by the audit from the rules engine may be varied using an API—that is, many different businesses and verticals may use the same base ruleset, modified using the API only to the extent necessary for the unique aspects of that vertical. Moreover, the aspects disclosed herein allow for a multi-function roll-up of compliance, marketing, and consumer testing tools in a single, closed (to the user) system that requires only minimal user input, and which guides the user as to the inputs required based on the modifiable level of functionality provided by the user.

Thereby, the inventive embodiments may provide an accelerant tool, wherein marketing enablement is enhanced through the use of the embodiments. This marketing enablement may include analytics that insure the best user experience, that insure a user experience in compliance with a campaign and/or regulations, or a user experience that drives the highest success rate for the offeror of goods or services. As such, browser testing and digital asset compliance in the instant embodiments is applied to business issue variance to insure compliance of digital assets to limit business liability, particularly in non-core business aspects.

In order to provide the foregoing, the embodiments insure compliance of any digital asset base program with its subject specifications. Thus, financial liability may be avoided, as may be penalties against digital service providers or marketing entities, by way of non-limiting example. For example, in prior embodiments, if a 3.times. points redemption program where employed by a loyalty program for a 30 day span, but digital assets unintentionally allow the program to extend for 90 days, significant additional liability would be incurred by either the core business associated with the loyalty program, those entities allowing for purchases using redemption of the points, or the service provider that provides the loyalty program. The disclosed embodiments, by insuring compliance of the digital assets with the indicated program for only 30 days, prevent liability for any of these entities. An additional example is the assuring of the compliance of certain product use and product claim, and/or disclaimers or warranties, such as are associated with Credit Card and other Retail Banking products and service programs, as well as Pharmaceutical products, and on-line retail products and services use instructions, and the like. In this case assets frequently fail to render properly, and are "pushed off" or "drop off a content page", and/or are not reasonably viewable or useable, due to the vast array of browsers, software, and versions of end-user technologies used to view and utilize the web, creating a variety of discrepancies in how the content reads or is viewed in relation to how the content provider, originally designed the asset. Although the frequency of these assets not being viewable or usable are no more or less common than any other asset within a given display, the outcome of these particular assets not rendering properly can created acute or significant liability and lead to expansive expenses and damages, as a result, due to the sensitive nature and reason for organizations creating such content in the first place, to warn, notify, or specifically warrant themselves against adverse consumer missteps with products and services. As the embodiments in this case, insure that all product and service claims remain present and are afforded the opportunity to always render, and to be used, accurately. This realization, which is now present within the embodiment, was previously considered highly unlikely, or not accomplishable, due to the fact that the content provider simply could not account for the vast array of browser, software, and operating system combinations being used by all end-users, and further to design content to account for all potential end-user viewing environments. The embodiments, due to the automated process of comparative analysis against a given previous benchmark connected in automated process in closed loop sequence with the ability to deploy that the specified asset through a vast cache of virtual browsers of present and previous versions, prior to deploying an asset into the public domain, as well to constantly test, moving forward, once new browser versions are made available to end-users or alterations are made to the asset, to ensure and afford the ability constantly render and maintain legal, product claim, warranty, use instructions, disclaimers, and the like, so as significant liability, due lack of reasonable customer notice and viewing is prevented, and all digital assets are clear, and do not "drop off a page", and/or become unreadable or unusable.

Moreover, remedial action on digital assets using the rules based engine disclosed herein may include avoidance of transparency breaches. In short, it is typically the case that copy and paste efforts are often employed by the creators of digital assets. Thereby, errors in digital assets may often occur in relation to such copy and paste efforts, such as wherein an incorrect corporate logo is associated with certain digital assets. In such an instance in the known art, significant brand harm may occur to either the owner of the incorrectly provided logo, the owner of the non-provided logo, and/or the service provider that has incorrectly provided a logo. This situation may be avoided through the use of the rules engine of the present embodiment. Yet further, adverse effects on consumers of errors in digital assets may be avoided through the use of the instant embodiments. For example, errors in digital assets that raise consumer ire may often cause migration of the consumer from the entity providing the digital assets. For example, if a user logs into a credit card account having associated therewith loyalty points, and the loyalty point balance for that user is incorrectly shown as 0, the user may be frustrated or fearful to such an extent that the user may migrate to a different credit card. Such errors based on consumer ire may be largely avoided through the use of the instant embodiments.

Still further, the disclosed embodiments may allow for enhanced market penetration. For example, enhanced user loyalty and customer satisfaction due to decreased issues in digital assets may not only serve well the provider of the subject digital assets, but may additionally enhance the view by consumers of the favorability of all similarly situated providers. For example, an enhanced view of a particular bank's Visa card offering may lead to enhanced view of all Visa card offerings.

Figure 4:
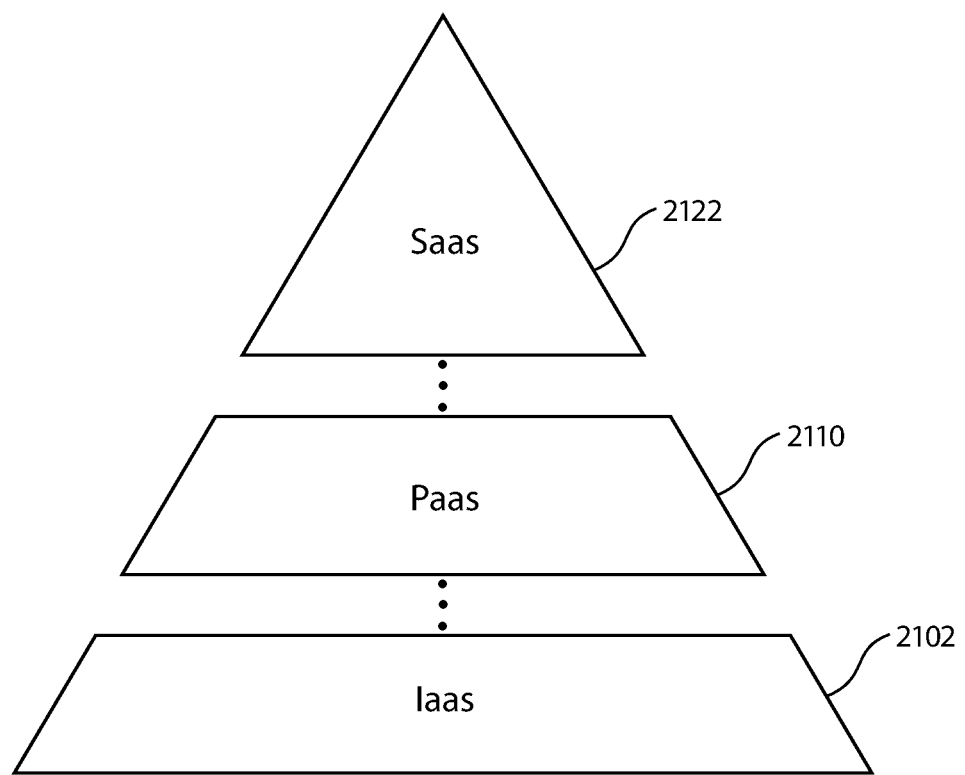
FIG. 4 is a schematic hierarchical diagram illustrating aspects of the exemplary embodiments.

FIG. 4 is a hierarchical illustration of the manner in which the disclosed aspects may be provided by the exemplary embodiments. In the illustration and at its most based level, the disclosed embodiments may provide an infrastructure as a service at block 2102. At this level, provided may be hosting services, support services, triage services, upgrade services, or the like, in support of the providing of the disclosed aspects. At block 2110 a platform as a service may be provided. In this block, directly enabling platform based aspects for the disclosed embodiments may be provided. For example, an API to allow for modification of a disclosed rules engine for different embodiments may be provided, browser testing interaction may be provided, and other unique aspects may be provided to enable the application of the software disclosed herein.

In accordance with the infrastructure and platform, or independently therefrom, the disclosed embodiments may particularly provide a software as a service at block 2122. The software as a service provided at block 2122 may create the unique functionality disclosed herein with respect to FIG. 3. That is, unique aspects may be provided as software at block 2122 that may interact with the underlying rules engine to allow for the providing of unique business processes that may sequence events, seek errors, ensure compliance, and the like, at each of the stages shown in FIG. 3.

Accordingly, the present invention may include at least a cloud-based and/or browser-accessed Software as a Service (SaaS) administrative rules engine having access to digital presence and assets. The rules engine in particular may monitor and identify compliance, and perform as a risk mitigation tool to be utilized by enterprise clients. More particularly, the rules based interrogation engine may provide the more automated and efficient process and methodology for managing, monitoring, and maintaining digital assets and environments and presence, including mobile presence, as discussed herein throughout.

As referenced, the present invention may be used to service loyalty and rewards networks, existing customer marketing, new customer acquisition, and/or existing customer information dissemination through targeted B2B and B2C online and mobile digital lines of communication, marketing campaigns, and the like. In an embodiment of the present invention, the risk mitigation tool is provided to allow for digital assets within web and digital development environments to be individually monitored and identified, maintained in compliance, assessed for currency and accuracy, split and Beta tested for effectiveness, archived, ticketed, organized, and repaired, as discussed with respect to FIG. 4. The present invention may also provide overall risk management and mitigation in one automated and efficient tool for maintaining an organization's online digital environment, digital content development, and mobile presence.

In an embodiment of the present invention, the rules based interrogation engine may be implemented to detect alterations within a given digital view and compare and detect all inconsistencies across multiple complex digital environments that encompass infinite variables, which need to be kept within designated specification(s) or compliance, for example. This type of quality assurance with regard to the information and data provided to third parties may be an automated process to thus allow the monitoring and comparison aspects of digital assets and environments to be a quick and highly efficient process. Such a low lag time to present content confirmation may greatly increase overall compliance with both internal controls and external rules and provide for an agile development processes, thus enhancing the expediency, accuracy, and efficiency of digital asset development and management from concept to completion and the ongoing refinement and redesign processes (website, micro-site, internet and intranet environments, mobile applications, digital content development) through the use of multiple overlapping and coordination of automated comparison methods.

In an embodiment of the present invention, the system may automatically interrogate and compare uniquely identify individualized graphics, single text characters for size and font, as well as word and character development treatments, customized selected groupings of content, text and graphic color variations and nuance by RGB hexadecimal value and pixilation configurations and concentration, as well as inconsistency and/or breakage in HTML and CSS and JavaScript and/or a webpage or destination Uniform Resource Locator (URL). Such interrogation may be performed by the present invention through a rules-based interrogation engine which may identify any number or combination of these selected elements within a web page, entire environment, or within a single identified digital asset, and estimate their deviation and/or difference from the intended display, and can compare the any alteration in a digital element with another, or whole and multiple complex website and/or digital environments.

In addition to the above-references quality assurance functionalities, in an embodiment of the present invention, the system may accumulate, in real time, data related to each instance of interrogation to identify changes and alterations, including where and when such changes occurred or were identified, which may increase the on-going intelligence and history record of what is required for the compliance for the digital asset(s) selected. Similarly, the system may store individual records of each iterative step in the on-going comparison/interrogation process, related to compliance, break fix, and refinement and redesign agile process and realization of a digital asset, or selected group of assets or entire web environment(s), so historical versions may be catalogued, reviewed, and used for various audit purposes, and/or repurposed from a library of key learning's for future system usage.

The present invention may also alleviate an organization's risk associated with financial promotional offers, disclosures, lapses and breaches in brand as well as reputation management issues through the real time monitoring and repair on non-conforming content and data. Such a result may decrease customer attrition caused to non-functioning URL and/or poorly rendered or unreadable content, Partnership and Vendor Attrition due to Service Level Agreement (SLA) breaches and related penalties, Disruption of Supply Chain and Vendors, and inconsistencies in Legal disclaimer and related compliance parameters, and the inaccuracies and inconsistencies and liability of organizations utilizing partial or full manual process to perform these functions.

In an embodiment of the present invention, the system may provide the ability to identify and/or compare "snippets" or "selected zones", in either specified digital asset, a portion of a digital asset, an entire digital page of content and/or image(s), and/or a single or multiple page(s) and/or web environment(s) as a contextual comparison in, for example, the HTML DOM (Document Object Model) Layer. Similarly, the system may interrogate "snippets" or "selected zones" as well for inconsistencies and to provide a validation of all internal and external links with an intended code baseline of CSS and JavaScript and/or a webpage or differences within the destination of Uniform Resource Locator (URL) line, and/or within a Pixel Comparison. The system may also be able to discern RGB hexadecimal value(s) and/or pixilation configurations and concentrations to functionality to identify any unintended display.

In an embodiment of the present invention, the business rule engine may be provided to provide a rules based interrogational engine that allows for the setting of specific tolerances within URL, webpage, "snippet" or "selected zones" on a Webpage related to a severity or sensitivity tolerance level (high, med, low). In conjunction with the setting of tolerance(s) in these areas, the system may link certain alert and management capabilities to the business rules engine to, for example, alert a distribution list of users based on the predetermined tolerance severity levels, as well as integrating the severity of alert into an organized group architecture. The system may provide specific channels of engagement for issue management through, for example, email, phone, and SMS, for accountability as well as for an audit trail of performance and resolution. As would be appreciated by those skilled in the art, a frequency of interrogations, for example, may be set by a user and may include periodic settings such as (multi-day, daily, weekly, and monthly, for example and may alert users to all or specific types of variances that fall outside the set business rules and tolerances.

As described herein, the present invention provides for the automation of quality assurance (QA) by automating specific QA checkpoints in the development of a digital asset and as a result, the amount of human labor required, because the quantitative intelligence of the present invention may continuously accumulate data related to all identified changes, alterations, and deletions as the digital asset(s) or 'intended "snippet(s)" as they are continuously altered. As a record of development progress within any given digital asset(s) or intended "snippet(s)" is logged and archived, and the user may then be assured that only the most current version is being viewed. As system results are accumulated, the system may improve systemic accuracy, thus limiting and decreasing the effects of human error from testing, lessening errors and increases management controls and efficiency.

In an embodiment of the present invention, the system may be a digital marketing and compliance tool, comparison engine, an asset management, and risk mitigation tool, which may dissect and analyze digital assets from one piece of content or pixelization over a period of time or multiple pieces of content to determine what changes have been made to content (image, html, CSS, other programmatic code, and textual content) on an asset. The present invention may be used to analyze a website, mailer, or other digitally derived content.

As illustrated in FIGS. 5A and 5B, the system of the present invention may provide a product that allows for the creation and auditing of jobs which may be executable tasks designed to interrogate and compare certain media targets in accordance with the present invention. As illustrated in FIG. 5A, the user interface associated with the present invention may allow for the creation of a new job, execution of existing jobs, reporting of job status and outcomes, and the reporting of any system issues and or follow-up need by the user in the form of a ticket issued related to a job. The system may also provide functionality related to the control of multiple jobs through a campaign manager and may also allow for easy access to historical use records, records which may also be used by the QA portions of the present invention to track effectiveness. The system may allow for each job to be titled and may provide a status update to alert a user to whether, for example, the job is new, is complaint (at least from its last run) and/or whether an error has occurred.

As illustrated in FIG. 5B, in addition to much of the functionality described above, job records may be more easily navigated to allow a user to select a recent job. As illustrated, the present invention may also provide highly visible alters/status updates to make the user aware in real-time of any issues, for example, which may occur when a plurality of jobs is running in a given period of time. As discussed herein, jobs may be run at a predetermined time and/or over a predetermined interval. Jobs may also be queued to run when certain benchmarks are met, such as, for example, the number of visitors to a particular URL has been reach, or the number of click-through for a particular link has been exceed. Although many iterations of benchmarks may be used, third-party user interaction with a piece of content may be used as a trigger for job execution and may be used in conjunction with other metrics, such as the time boundaries discussed above.

As illustrated in FIG. 5C, a job to be created may include an identifier, a free-form description portion, and both a base URL and Target URL addressing space, for example, when a job is meant to be limited to the interrogation and comparison of two web pages. Once created, the present invention may present to the user an image of either the base URL and/or the target URL, for example, to confirm for the user that the addresses provided were pointed to the desired webpage. Once the user has created a job, the present invention may provide an interface as illustrated in FIGS. 5D and 5E, for example. FIG. 5D illustrates a job details page having at least one activity log comprising various messages and statuses for at least one particular job. A user may be notified, for example, if a job benchmark has been created, if a job is in queue, if an executed job was successful, if there is a variance request, if there was an issue detected, if a scan has been completed, and/or if a user has been notified of any of one or more of the aforementioned activities. Such a details page may provide the user with easy and complete access to substantially all information related to a particular job. Information related to the type of browsers that are anticipated to be encountered, for example, may be listed and/or selected. In this way, a particular job may be optimized towards a specific group our users if, for example, the target URLs are assumed to exist only on iOS devices.

As illustrated in FIG. 5E, additional details may be provided by the present invention and may include an activity log with all of the various messages and statuses for a job. Such a log, as illustrated, may allow for more real time analysis of the activity associated with a job and may allow a user of the present invention to confirm that the expected tasks are being completed in the desired manner.

As discussed above, if a job is constructed to analyze particular content, execution of that job may result in the recordation of a job record related to the interrogation and/or comparison throughout a piece of content. As a non-limiting example only, a user may select an area on a web page to monitor (text, images, buttons, headers, footers, etc.). From this single or multi-select user transaction, a user may set a digital asset baseline. From such a baseline, the user may then execute individual jobs. As an example, a comparison-based job may craw a target asset and compares selected areas from the baseline with the same areas on the target page(s). Each variance is then logged to the database and further analysis is completed to determine the root cause of the variance. Users may be alerted via the system provided GUI or via email, for example. The system may also have the capability to also alert users via SNMP if needed.

Figure 6A:
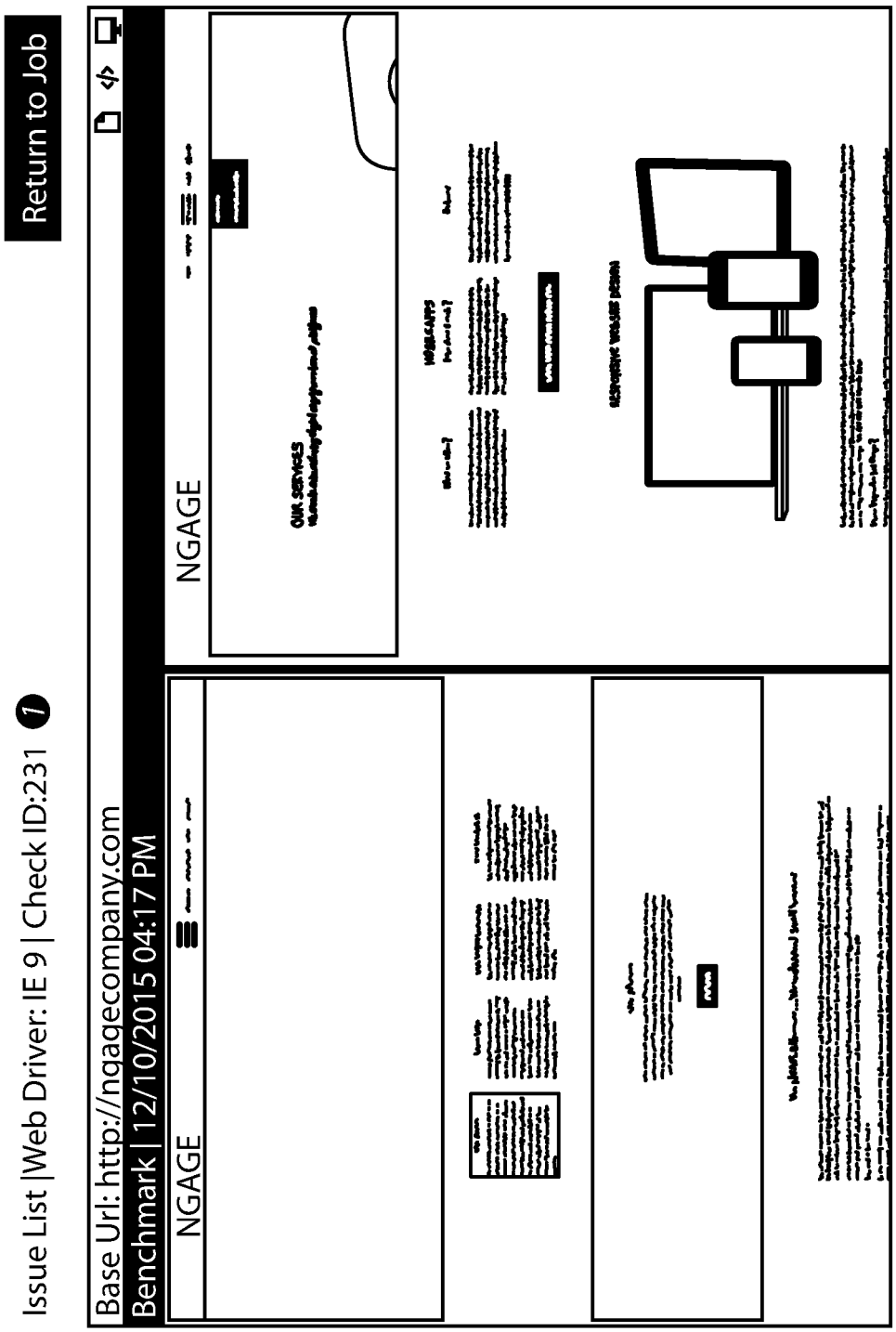
FIG. 6A-B illustrate exemplary embodiments of the present invention.
Figure 6B:
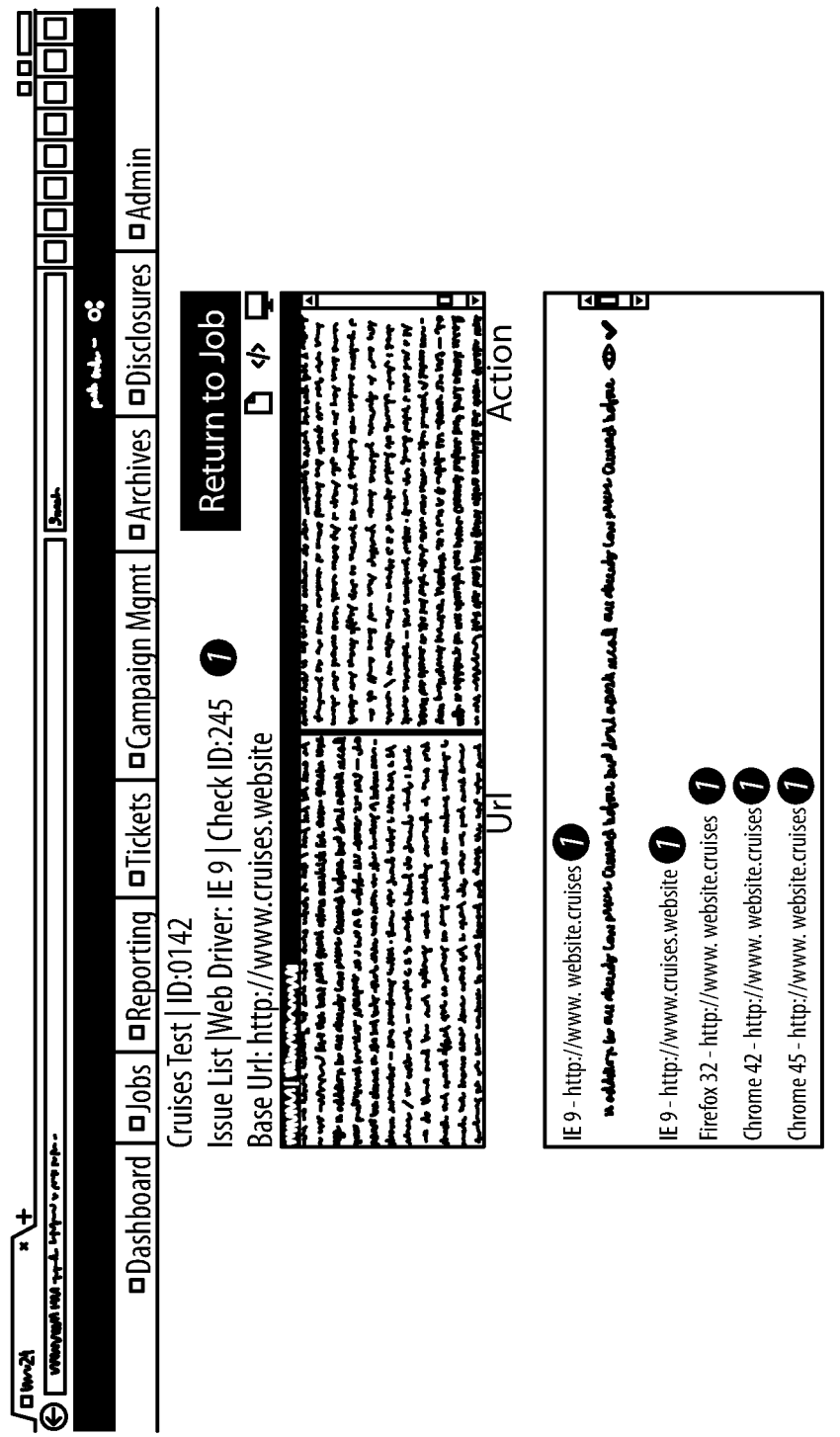

A user may also be provided the ability to see a side by side visual comparison of the baseline and target pages, for example, as illustrated in FIG. 6A. A variant area may be highlighted on either side of the visual comparison screen. A user may also be presented with details of the issues that were found with the asset(s). Users may also time delay or calendar such a change in status to allow them to follow up at another time (or have someone else follow up for them) or a user may change the status of the issue to "Resolved" if warranted. As illustrated by FIGS. 6A and 6B, the present invention may allow a user to compare a full website over time or immediately with another site (production, staging, UAT, development) and/or any component of any website. The present invention may provide a user the ability to compare pixels in one image to another image, even if the size, name, and description of the image are exactly the same. The present invention may be able to determine variances from pixel to pixel or across an entire image.

Figure 7:
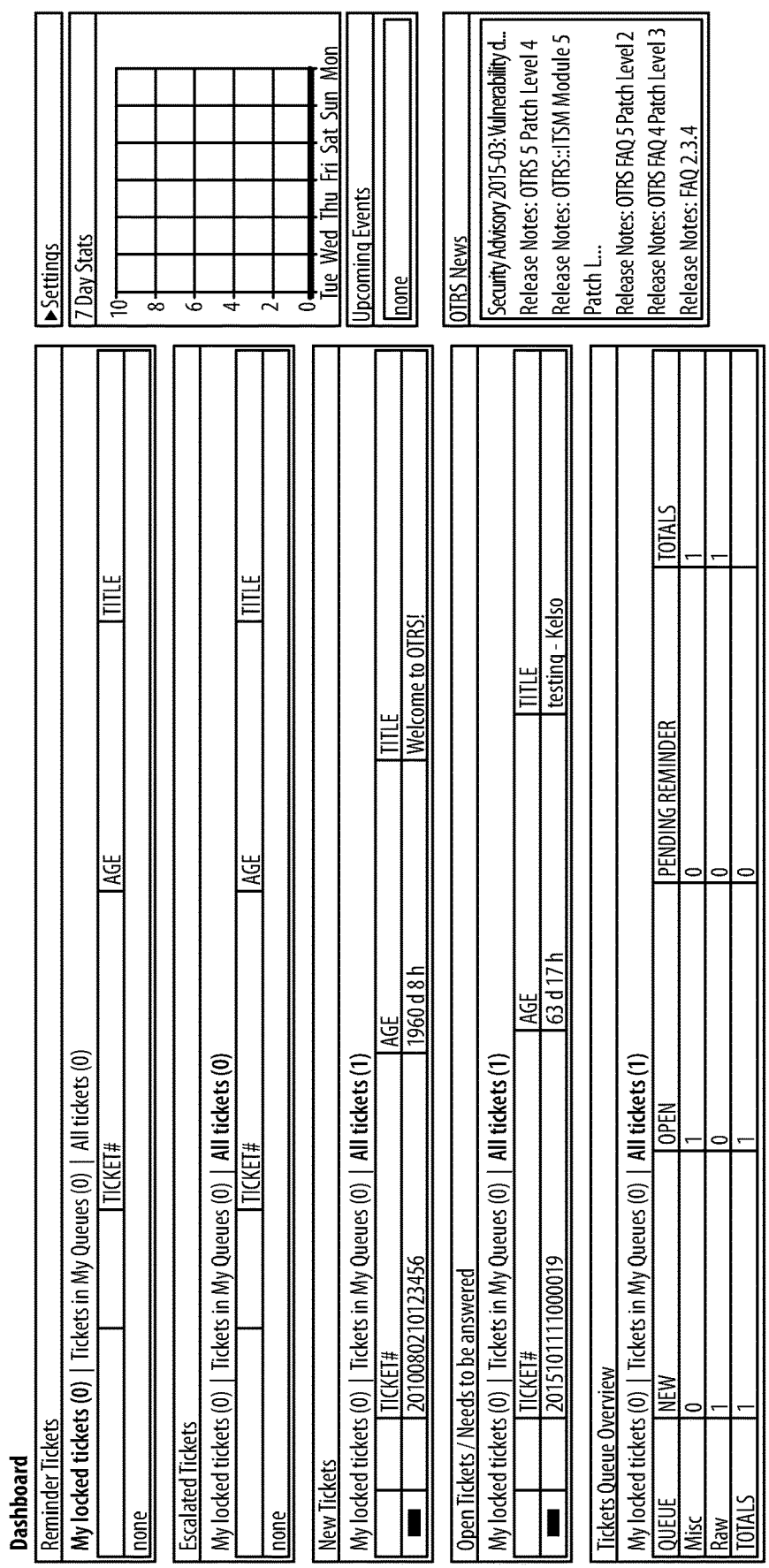
FIG. 7 illustrates an exemplary embodiment of the present invention.

In an embodiment of the present invention, the system is accessed through at least one application plug-in installed in at least one third-party system. Once the plug-in is installed, the user may be presented with a dashboard, as illustrated in FIG. 7, which may display summary information on issues, open tickets, compliant jobs, and total jobs that have been completed. Additionally, in the dashboard, there may be a display summarizing recent scan activity, job status, and actions that need to be taken (if necessary), among access to the other functionality discussed herein. The dashboard may also provide information related to open tickets related to issues found as between interrogated content, for example, a running time delineated stats counter, calendar features, settings menu and a list of reminders and/or news associated with the content.

As illustrated in FIG. 8, an archival management subsystem may be used to ensures that a job, its benchmark, its associated content, imagery, and the like is captured and stored on its retention, such as in a WORM format, for example. The present invention may also include at least one disclosure portlet which may allow a customer to compare a job against the required disclosures needed for a company. For example, banks and pharmaceutical companies, to name just two types of heavily regulated industries, have strict requirements on what disclosures are necessary and may be exposed to great damage if such disclosures are not correct. The present invention allows a user to check the organizational specific disclosures that are needed and determine if a comparison site has those disclosures present. If the disclosures are not present, an error and ticket may be generated.

Use of the system provides administrative functionality which may allow users and administrators to add users to the system, add users to security or email groups as needed, while auditing authentication and authorization rules which may accompany use of the system by any user. The present invention may also interface successfully with authentication and authorization systems located remote from the system which may be capable of hooking into the authentication/authorization components already implemented by a system user.

Figure 9:
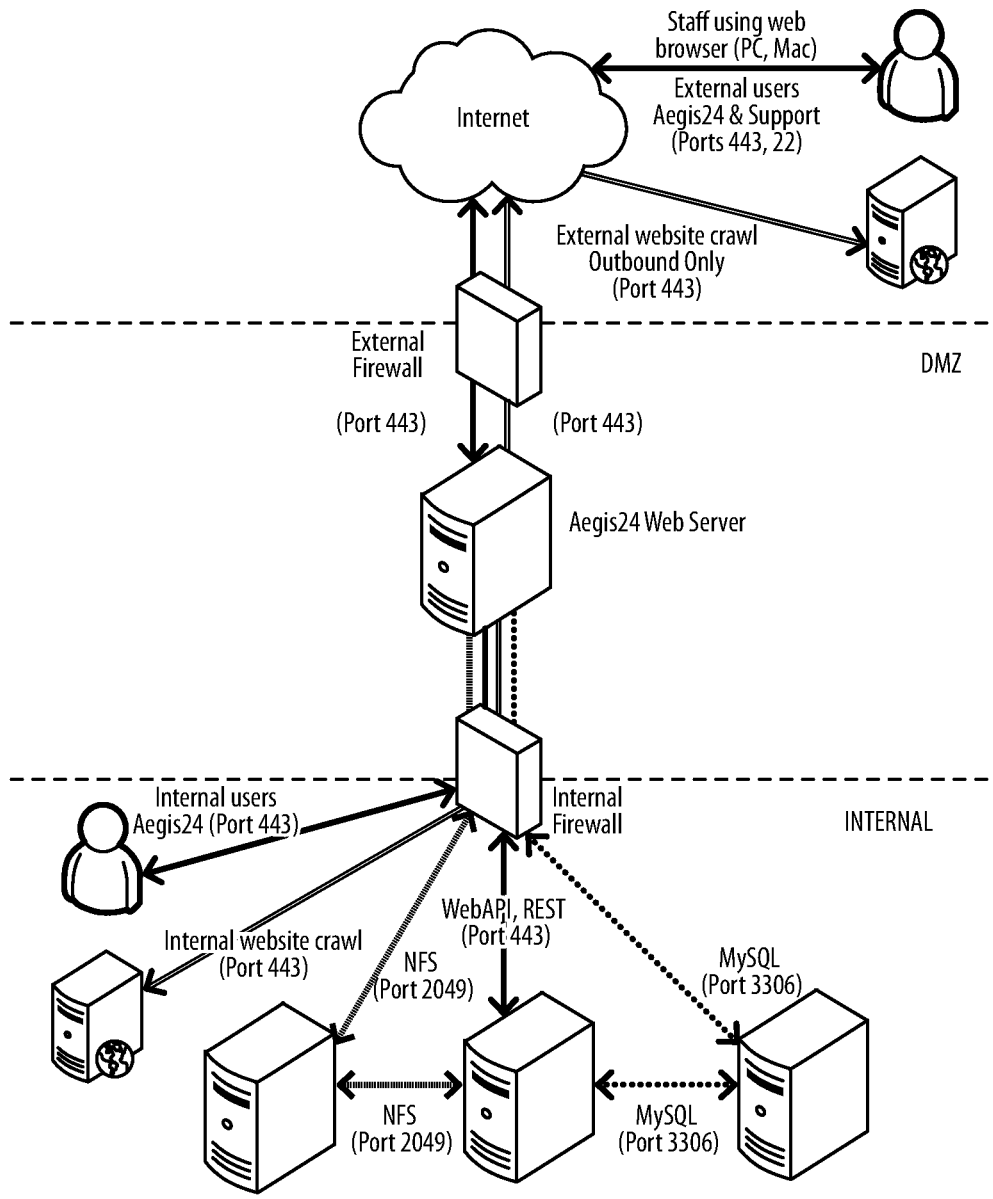
FIG. 9 is a block diagram of an exemplary computing system for use in accordance with herein described systems and methods.

FIG. 9 is an example of a simplified functional block diagram of a computer system 700. The functional descriptions of the present invention can be implemented in hardware, software or some combination thereof. For example, a recommendation engine and an integration engine of the present invention can be implemented using a computer system.

As shown in FIG. 9, the computer system 700 includes a processor 702, a memory system 704 and one or more input/output (I/O) devices 706 in communication by a communication 'fabric'. The communication fabric can be implemented in a variety of ways and may include one or more computer buses 708, 710 and/or bridge and/or router devices 712 as shown in FIG. 9. The I/O devices 706 can include network adapters and/or mass storage devices from which the computer system 700 can send and receive data for generating and transmitting advertisements with endorsements and associated news. The computer system 700 may be in communication with the Internet via the I/O devices 708.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

The various illustrative logics, logical blocks, modules, and engines, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

In an embodiment of the present invention, the system may include a network architecture as illustrated in FIG. 9, which may include a multiple server system across at least one dynamic network. System access by a user may first occur remotely using a VPN or SSL VPN, for example, into a targeted work environment. Access into the work environment will allow a user access to the system web server, which may house the front-end application and dashboard, as discussed above. Within the front-end application server, a user may create a job, access their currently run jobs or their team's jobs, submit a ticket, access past disclosure or archival information, or gain access to reports. Behind the system web server environment may reside a backend infrastructure which may include a firewall environment that may allow the web server to communicate to the associated back-end systems. All server transactions, especially those passing through a firewall, may be encrypted using SSL, for example.

Front-end system programs may include programs used to display the user interface (UI) web pages to the user, for example. In addition to libraries provided by Java frameworks, the primary third party UI framework utilized may be handled via an AJAX web application development framework that enables developers to build high-quality user interfaces with Java, both on the server- and client-side. Such a system may provide a set of libraries of ready-to-use user interface components and a clean framework for creating your own components. The focus is on ease of-use, re-usability, extensibility, and meeting the requirements of large enterprise applications. As discussed above, the system may utilize a plug-in that may support the user process of recording the navigation commands and the selection commands of specific website content.

The backend of the system may be responsible for processing benchmark and variance functions of the system. Both functions may take commands from the system plug-in level and send them to a server to perform the commands using a designated web driver. The system may avoid using a dynamic, virtual server platform to handle concurrent application sessions by utilizing a browser stack remotely hosted from the system. Such a backend may allow for more easily accessible memory and computing environment expansion.

Figure 10:
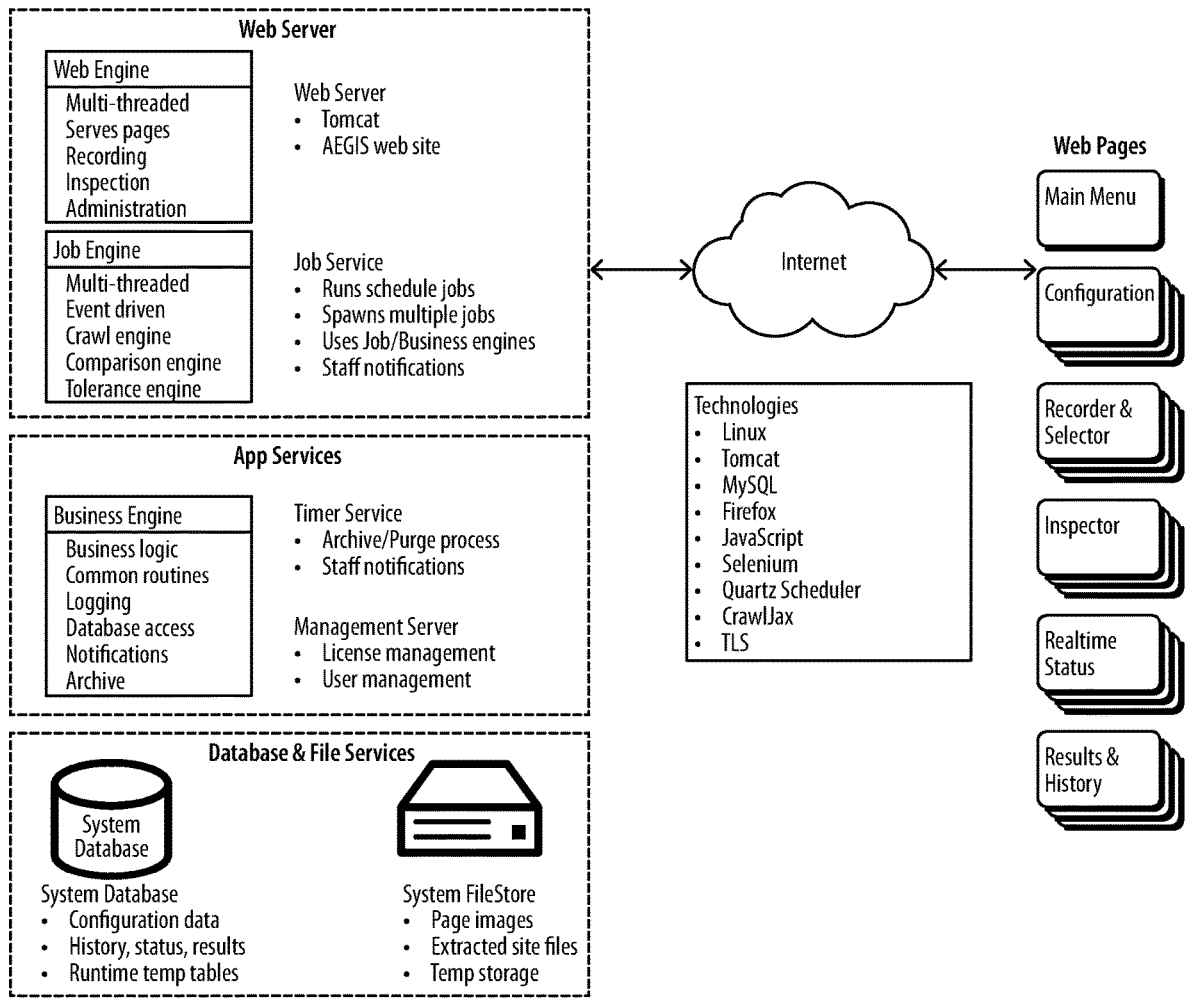
FIG. 10 is a block diagram of an exemplary computing system for use in accordance with herein described systems and methods.

As illustrated in FIG. 10, the system web server may house at least two engines, a web engine and a job engine. The web engine may be multi-threaded and allow for multiple jobs to be run simultaneously without impacting the performance of other jobs that are already being processed. The web engine may also be responsible for web recording, digital media inspection, and general administration and management. The job engine may be event driven and may be used to crawl various sites and to compare those same sites to at least one base site. The job engine may also have a tolerance engine built into the system and allow a user to run scheduled jobs, spawn multiple jobs, leverage the business engines, and provide staff notifications.

In an embodiment of the present invention, a receiver of medical information may be provided with a normalized presentation of information to ensure the complete delivery and viewability of such information. For example, when purchasing medical devices and/or prescription drugs, some information may be provided to the recipient of such goods via electronic delivery, such as, for example, an email, web portal, and/or app GUI. Although the medical provider may exert some control over the delivery of the information and/or the GUI used by the recipient, such control does not always exists and may not be guaranteed or sufficiently verified to satisfy the needs of the provider, such as regulatory requirements, for example.

An illustrative example includes the provision of medical use information to a receiver of prescription drugs. For example, a Medicare insured person may go to a local pharmacy and present a prescription for a certain prescription drug. Although the prescription drug may include regulatory mandated information on the label of the dug container and/or on additional labeling printed by the pharmacy, the drug provider and/or the pharmacy may wish to send additional information to the recipient electronically as described above. In this example, the receiver of the additional information has agreed to visit a website whose address is provided on some aspect of the provided labeling and does so to view additional information related to prescription drug. However, the server accessed by the recipient through the provided web address is only capable of providing properly formatted information to versions of a browser newer than the browser used by the recipient. Thus, the older browser may not display the information as intended. For example, the information may not be formatted as intended nor may it be fully displayed (such as being "shown" off screen or out of the viewable area). More generally, the information and possibly embedded action buttons or links, may not be displayed or provided in a way which will allow them to be functionally useful to the intended recipient, resulting in a failure to provide or certify that certain information was provided to the intended recipient.

In an embodiment of the present invention, the present invention may identify and recognize the browser version, as well as device type, connection speed, location, and other attributes known to those skilled in the art, as used by the accessing drug recipient and may provide an information access point suitable to provide the above referenced information in a substantially suitable format as to comply with any regulatory and/or other rule or regulation regarding the providing of information to a recipient. As described herein, the present invention may detect the use of an older version internet browser and may direct the incoming access request to one of a plurality of virtual servers compatible with the accessing browser version. By way of non-limiting example only, accessing a provider's website with version 0.2.149 of Google Chrome requires different formatting and technical capabilities that accessing with 47.0.2526.106 m of Google Chrome.

The present invention may also provide reporting features providing to a user: overall page level variance report; contextual variance report; pixel variance report; and/or a snippet variance report. Templated Reports may be used to provide users the ability to create reports with existing tracked data to provide differentiated levels of reporting. Both detail and summary level data will be supported. Customized reports may also be created and include a drag and drop interface to create unique reporting based on existing data. Frequency, distribution list and data would be defined for each report to meet business user and executive level needs. Reports may also provide historical information and enable tracking and reporting of issue management and remediation and/or tracking of issue remediation timeframe and SLA adherence. Reports may also allow for "versioning" and the maintenance of historical versions of selected assets over specified timeframes and/or the ability to 'tag' specific areas/assets/snippets/pages/content areas to maintain historical versions for auditing purposes.

As noted above, the systems and methods of the present disclosure allow for automatic detection of alterations/changes/variations in digital assets, and for alerting a user to such alterations/changes/variations. For example, in the case of a company's website pages, the system of the present disclosure automatically monitors the website pages (or portions thereof) for unauthorized or unexpected variations in the website pages (e.g., changes to the website appearance, elements on the pages, changes in code underlying the pages, changes in images on the pages (e.g., changes in image content, resolution, etc.), and other changes). Such features will be further discussed in detail in connection with FIGS. 11-18. Before discussing FIGS. 11-18 in detail, the following glossary is provided:

Plugin—The plugin is a Firefox XPI add-on the contains all of the code for this process. It is written primarily in JavaScript with some Mozilla-specific XPI formatting instructions.

Benchmark Session—The act of using the plugin components on the target website to record user actions and web page elements selections. These actions and selections are bundled into a script and passed to the backend service to create a website benchmark, that is, a version of the website on which later versions of the website will be compared against.

Recording—A recording is a collection of recorder elements. It is the digital representation of the traversal process.

Recorder Element—A recorder element (recorder, for short) is a single user action needed to traverse and interact with a website, such as, clicking a link, typing text into a web page, hovering over a menu, etc. As a user interacts with a website, the plugin captures the action and creates a recorder.

Inspection—An inspection is a collection of inspector elements. It is the digital representation of all of the site content that the user selects for later comparison.

Inspector Element—An inspector element (inspector, for short) is a single block of web page HTML the user selects for later comparison. Using the plugin, a user hovers over a content area within a web page and the plugin draws a blue rectangle around the area. When the user clicks a button on the plugin control panel, the HTML for that content area is captured and saved as an inspector.

Case—A case is a collection of recorders and inspectors for a given web page.

Script—The script is a JSON representation of the recording collection, inspection collection, and other metadata is required to build the initial job benchmark and subsequent comparison (variance) runs.

Job—A job is a definition that contains information about the website to be monitored including the website URL, the browsers to be tested, and a unique job number. The job is saved into a database within the JS_JOBS table. The current script for the job is encrypted and save into the "base_rs_json_blob" column of the database record.

Benchmark—The benchmark is the current version of the script, as stored within the job record, that all future comparison runs (variance runs) will be compared against. When this script is created, it is submitted to the backend benchmark process which reads the script, programmatically traverses the website and validates the content. If all is well, the process saves captured website information into the database.

Plugin Page—When a user begins a recording session, the user is presented with a browser page split into two (2) halves. The top half contains the target website from which sections will be selected for later comparison. The bottom half contains the plugin panel. This panel allows the user to visualize the script that is being build and has buttons and text boxes for managing their selections.

Figure 11:
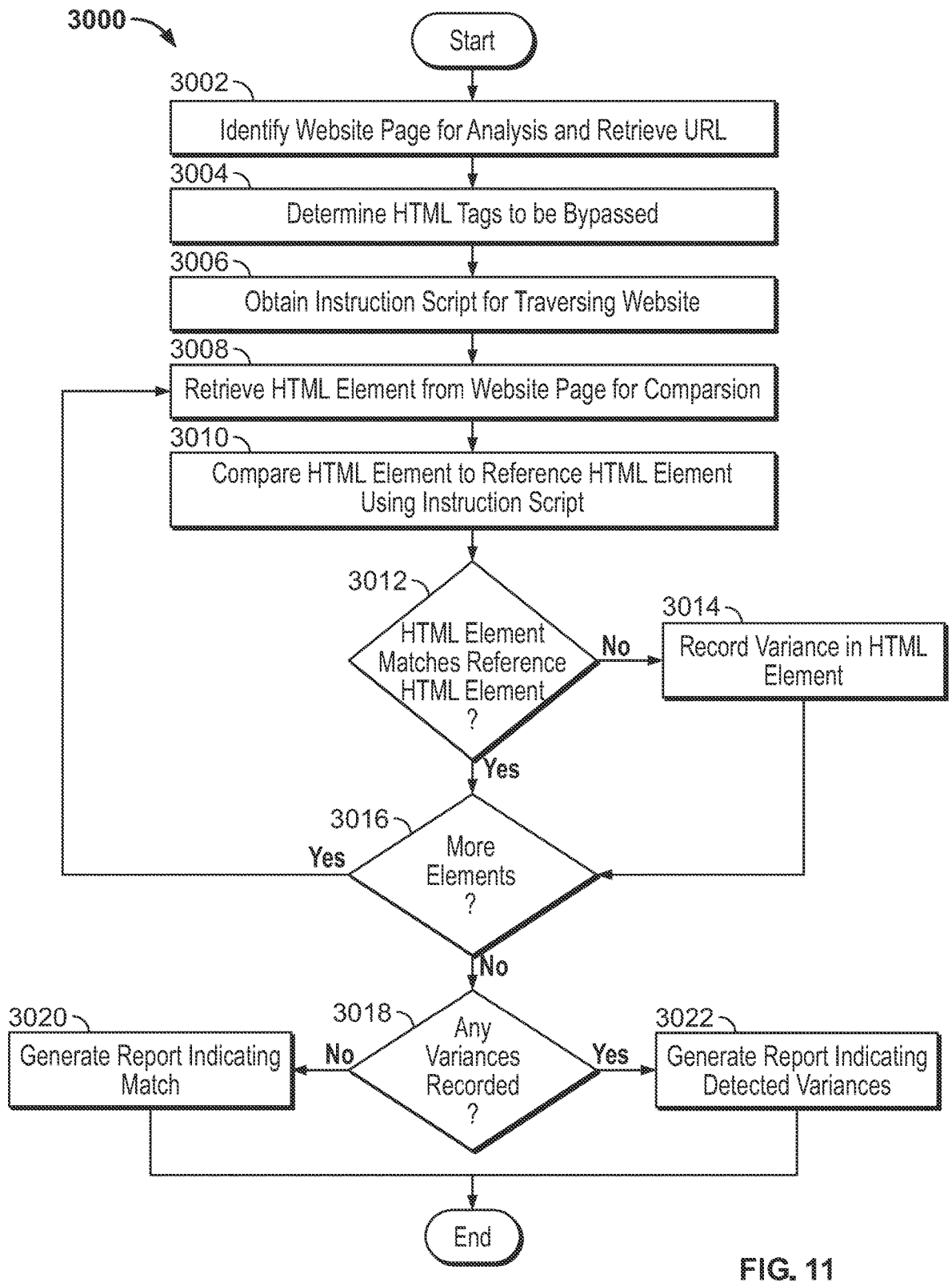
FIGS. 11-15 are flowcharts illustrating processing steps carried out by the system for automatically detecting, logging, and reporting variances in digital assets such as website pages.

FIGS. 11-15 are flowcharts illustrating processing steps carried out by the system for automatically detecting, logging, and reporting variances in digital assets such as website pages. Turning to FIG. 11, the flowchart illustrates overall processing steps 3000 carried out by the system for automatically detecting, logging, and reporting variances in one or more website pages. Beginning in step 3002, the system identifies website pages for analysis, and retrieves a URL corresponding to the website page. Next, in step 3004, the system determines HTML tags in the website page that should be bypassed, e.g., tags for which automatic monitoring and variance detection by the system are not desired. Then, in step 3006, the system obtains a pre-defined instruction script for traversing the website page. The instruction script is a digital file which includes instructions that control how the system parses each website page and identifies which elements of the website page are candidates for automatic variance detection. In step 3008, the system retrieves an HTML element from the website page for comparison to a reference HTML element. Then, in step 3010, the system compares the HTML element to a reference HTML element in accordance with the instructions provided in the instruction script. In step 3012, the system determines whether the selected HTML element matches the reference HTML element. If not, step 3014 occurs, wherein the system identifies a variance in the HTML element and records the variance for future reference. Otherwise, step 3016 occurs wherein the system determines whether additional HTML elements exist in the page and require processing. If a positive determination is made, control returns to step 3008; otherwise, step 3018 occurs.

In step 3018, the system determines whether an variances have been recorded. If a negative determination is made, step 3020 occurs, wherein the system generates a report indicating that the elements of the HTML page match the reference elements, thereby indicating that no variances have been detected in the elements of the HTML page. Otherwise, step 3022 occurs, wherein the system generates a report indicating that variances have been detected in one or more elements of the HTML page. Importantly, the processing steps 3000 of FIG. 11 allow for the automatic detection, tracking, and reporting of variations in digital assets.

The processing steps of FIG. 11 can be initiated in two ways: by manually clicking the "Create A New Job" button and walking through the new job wizard on the system (sometimes referred to herein as the "ejis™" system, the "ējis™ system," and/or the "aegis system") frontend web portal, or clicking the "New Benchmark" button for an existing job. In both cases, the user will be presented with the ējis™ plugin page. This page allows the user to traverse a website and select areas on the web pages to save for later comparison. The end user clicks, mouseovers, keystrokes, and selections are saved in a json-formatted script and saved to the database. Each job exists as a record within the JS_JOBS table in the ējis™ database and contains many column values. Two important database columns are "public_id" and "base_rs_json_blob." "public_id" is the unique id of each job record. "base_rs_json_blob" contains an encrypted version of the JSON-formatted instructions for traversing the targeted website (recorder items) and for each HTML element that will be compared (inspector items). The recorder and inspector items together form a "case." The processing steps 3000 of FIG. 11 could include the following workflow processes:

1. Find js_jobs record for job based on the public_id passed to the variance routine.
2. Decrypt and convert the base_rs_json_blob data into a Java object. This is a code representation of the script
3. Get the URL of the website from the script.
4. Based on the public_id, get the list of HTML element tags that are bypassed for comparison. Typically, a block of HTML may contain element tags that the administrator knows will constantly be different (e.g. a timestamp). These can be bypassed so they do not trigger a variance condition.
5. Based on the public_id, get the list of URL's that are bypassed when determining if the script recorder elements are landing on the correct pages.
6. Get all of the web drivers names for this job, i.e. get all of the web browser types and versions that the targeted website will be run through.
7. For each web driver
   a. Query the database to validate that a benchmark exists for this job and web driver.
   b. Create aWebDriver object. All subsequent commands will be issued through this Web Driver object.
      i. During this creation, the initial call to a $3^{rd}$-party Selenium grid hosted infrastructure provider is made. If there are any connection or initialization problems, the code will abort and the job will end.
   c. Create a list of Case objects from all of the cases within the script.
   d. For each Case
      i. Extract the recorder and inspector items.
      ii. For each recorder item
         1. Find the element on the current page.
         2. If not found, set status to bad.
         3. Determine recorder verb e.g. a mouse click, a selection from a dropdown box, or typing of text.
         4. Send the appropriate command based on verb.
         5. Send a command to take a screenshot and save it on the ējis™ server.
         6. If all is good, set status to good.
         7. Save a Definition record into an array with status.
      iii. For each inspector item
         1. Find the element on the current page.
         2. If not found, set status to bad.
         3. From the returned element, extract the "outerhtml". This is the HTML content within the web page area being compared.
         4. Save the web page to a file on the ējis™ server.
         5. Send a command to highlight a border around the element.

6. Send a command to take a screenshot and save it on the ējis™ server.
   7. If all is good, set status to good.
   8. Save a Definition record into an array with the "outerhtml" and the status.
  iv. Save the Case record into an array.
  v. Loop back to 7d for next Case.
 e. Send a command to close the WebDriver.
 f. For each Case record in case array
  i. Save Case record into database and mark it as a benchmark.
  ii. For each Definition record
    1. Save Definition record into database.
 g. Loop back to 7a for next web driver.
8. At this point, the script is run for all web browsers defined for the job.
9. Save activities and statuses into the database.
10. Notify administrators and users if defined.
11. End job.

Figure 12:
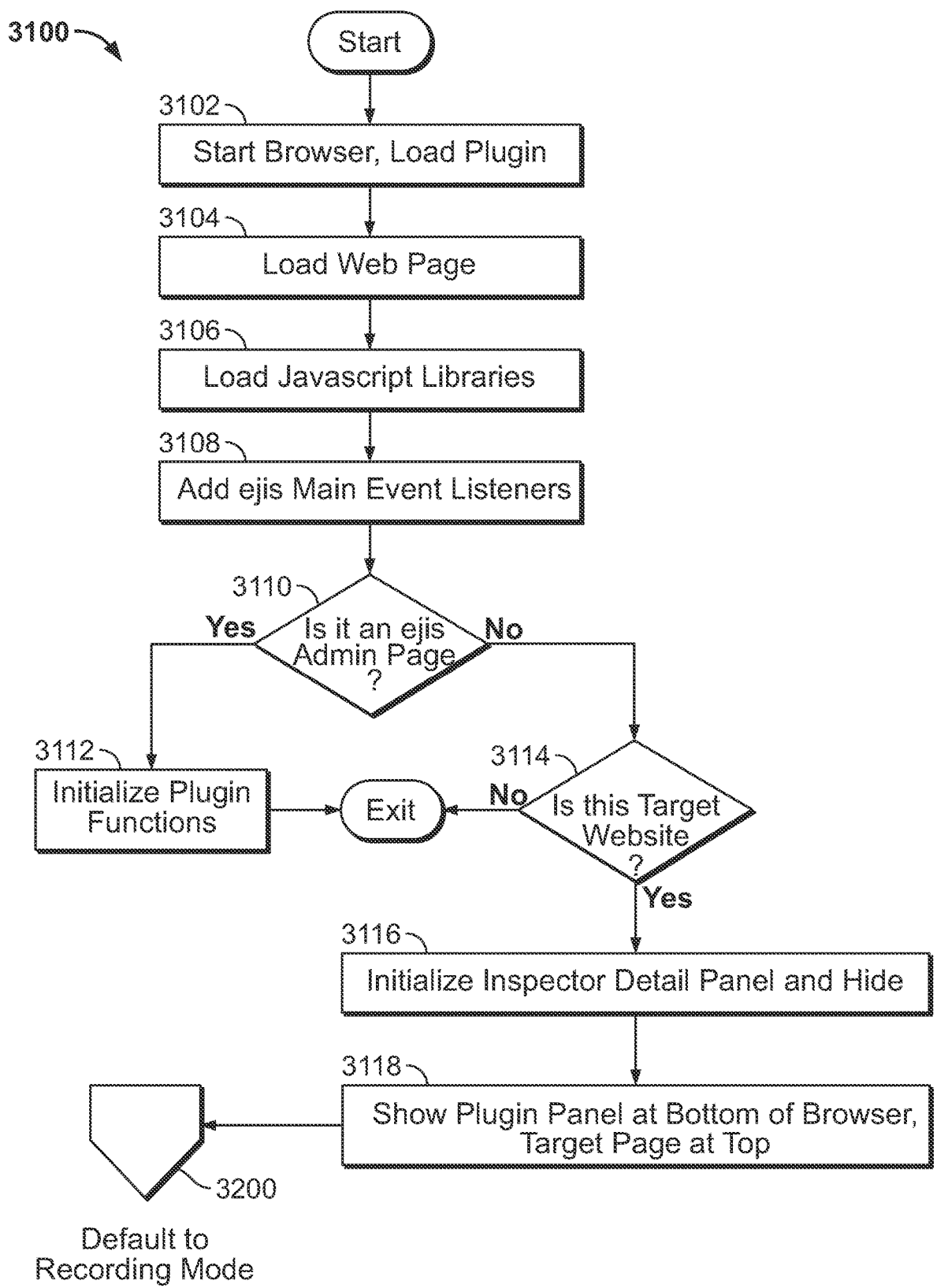
Figure 16:
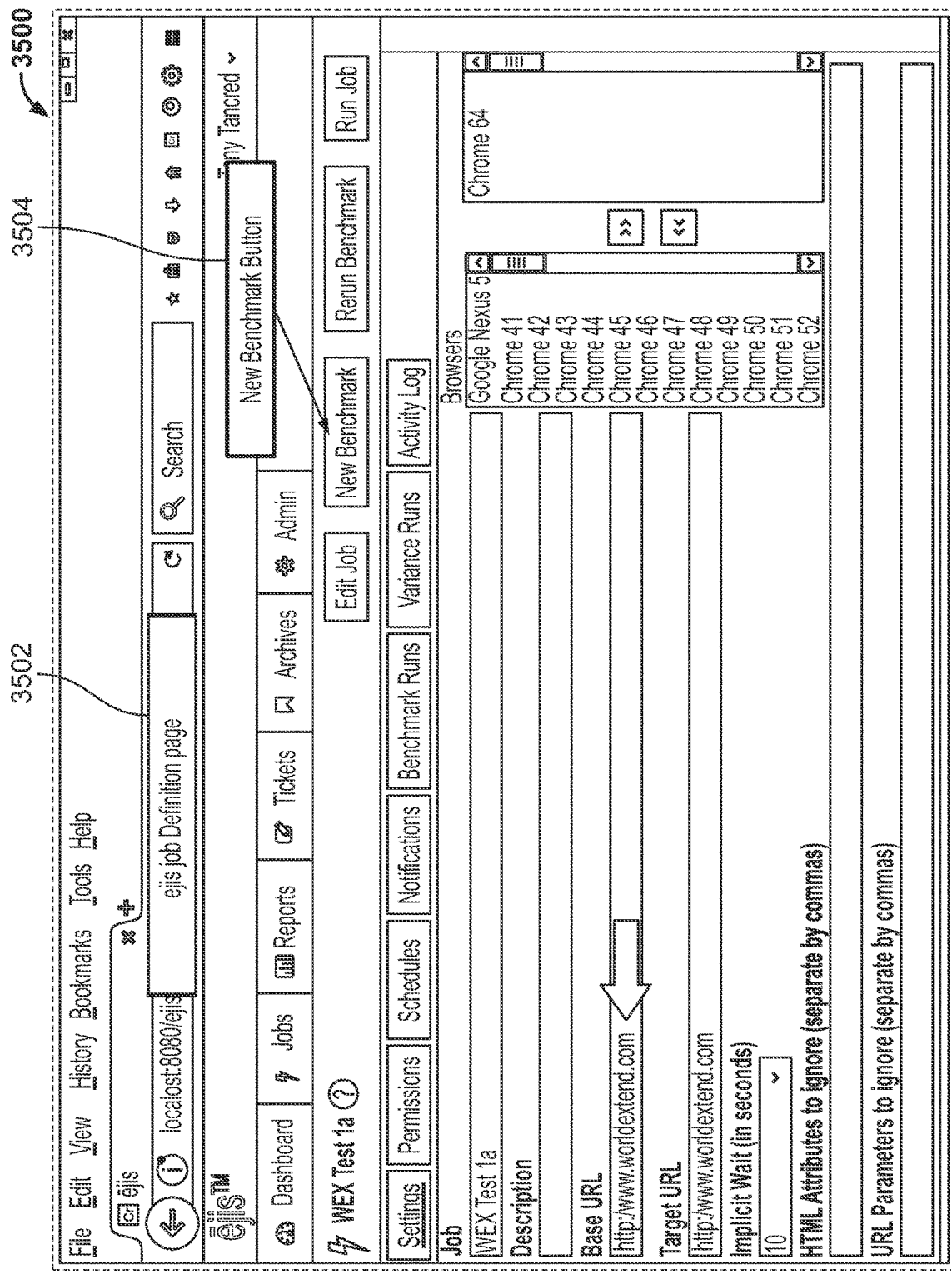
FIGS. 16-18 are screenshots illustrating sample user interface screens generated by the system for allowing a user to review a target website page and to select portions of the page for automatic variance detection by the system.

FIG. 12 is flowchart illustrating processing steps 3100 carried out by the system for generating a web browser plug-in that allows a user to review a digital asset (e.g., a website) and select one or more elements of the digital asset for which automatic monitoring for variations in the one or more elements is desired. This plug-in is shown in FIGS. 16-18 and is discussed with reference to these figures below. In step 3102, a user loads his or her web browser, and the plug-in is loaded into the browser. In step 3104, the web browser loads a target web page that the user desires to review in the browser and identify elements for automatic variance detection. In step 3106, the system loads any applicable JavaScript libraries that are required for supporting the functionality provided by the web browser plug-in. In step 3108, the system (sometimes referred to herein and in the drawings as the "ējis™" system) adds one or more main event "listeners" which are code portions that, when executed by the browser plug-in, monitor for instances of the user identifying elements of the target web page for which automatic variance detection is desired. In step 3110, the system determines whether the user has selected an administrative web page. If so, step 3112 occurs, wherein the system initializes the plug-in functions described herein. Otherwise, step 3114 occurs, wherein the system determines whether the selected web page is the target web page. If not, processing ends. Otherwise, step 3116 occurs, wherein the system initializes an inspector detail panel (discussed in more detail in connection with FIGS. 16-18 below), and then hides the panel. In step 3118, the system shows the plug-in panel at the bottom of the browser, and the target web page at the top of the browser. Control then passes to processing steps 3200 (recording mode), discussed in detail below in connection with FIG. 13.

Figure 13:
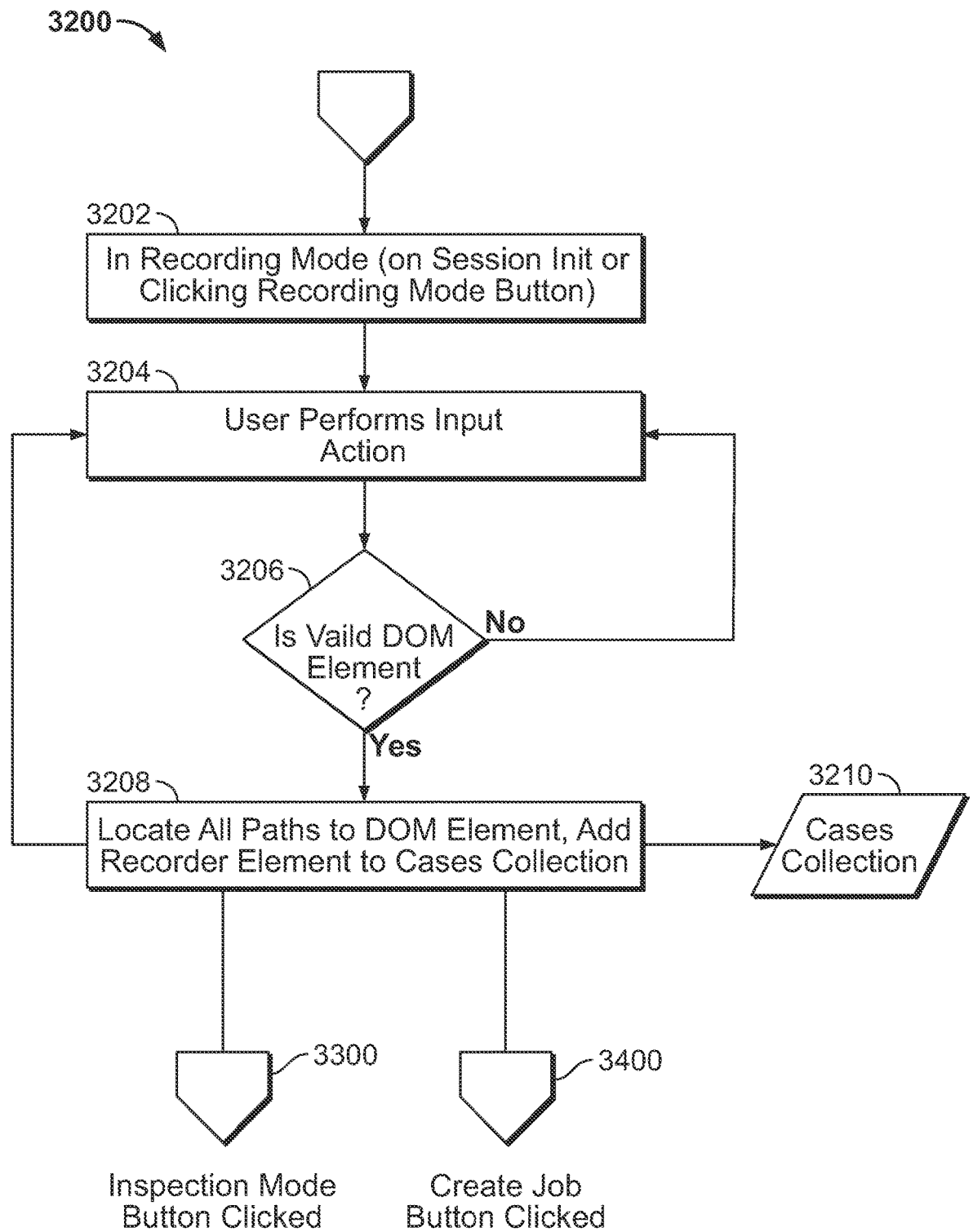

FIG. 13 is a flowchart illustrating the recording mode processing steps 3200 carried out by the system. Beginning in step 3202, the system is operated in recording mode (either on session initialization or by clicking a "Recording Mode" button in the plugin). Next, in step 3204, the user performs an input action. Then, in step 3206, the system determines whether a valid document object model ("DOM") event exists. If not, control passes back to step 3204. Otherwise, step 3208 occurs, wherein the system locates all paths to the DOM event, and adds a recorder element to create a collection of cases (element 3210). Inspection mode 3300 and create job mode 3400, discussed below, are also initiated.

Figure 14:
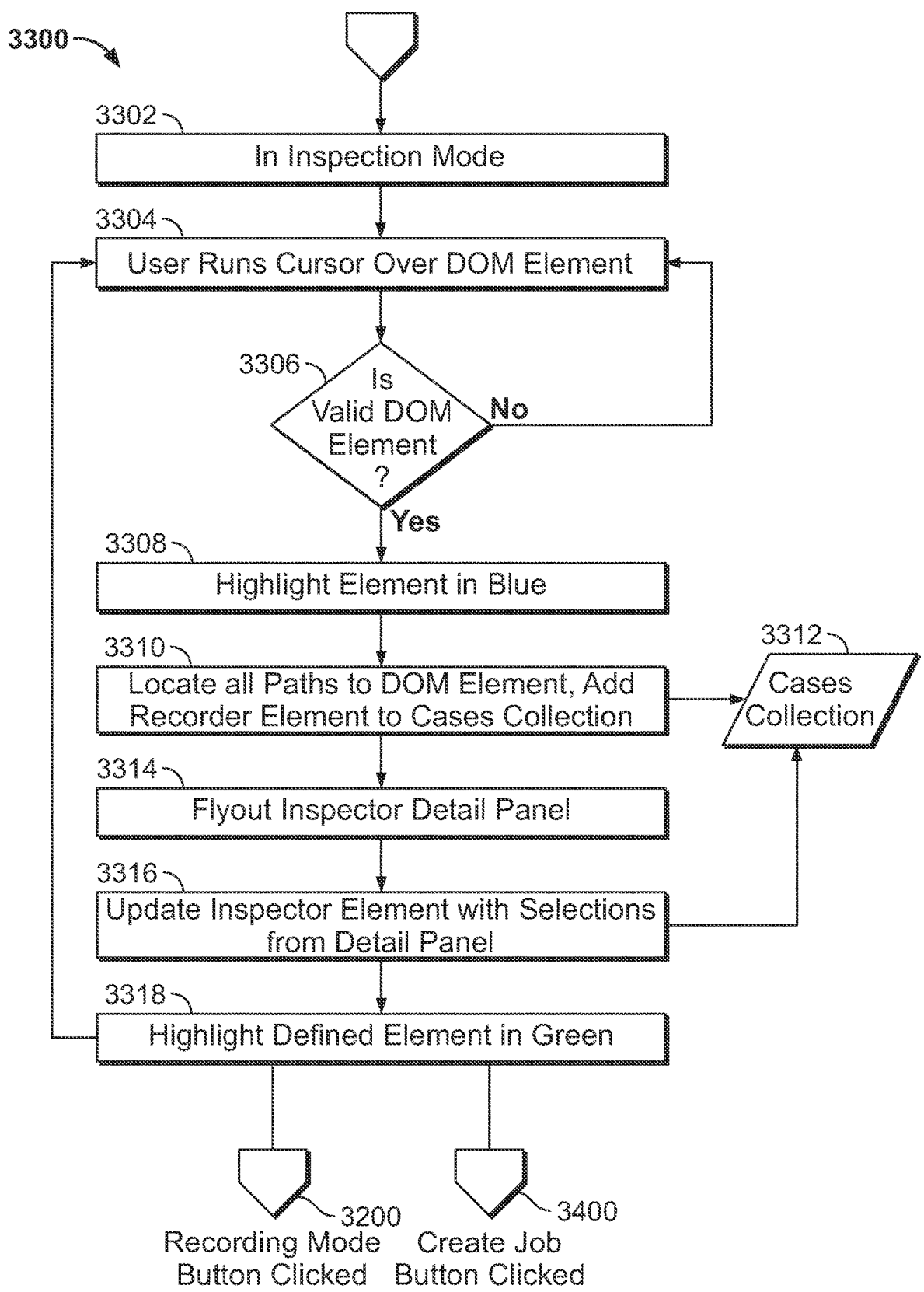

FIG. 14 is a flowchart illustrating the inspection mode 3300 processing steps in greater detail. In step 3302, the system operates in inspection mode. In step 3304, the user runs his/her mouse cursor over a DOM element in the target page. In step 3306, the system determines whether the DOM element is valid. If it is not, control returns back to step 3304. Otherwise, step 3308 occurs, wherein the system highlights the DOM element in blue. Then, in step 3310, the system locates all paths to the DOM element, and adds a recorder element to the cases collection 3312. Then, in step 3314, the system activates (flyout) the inspector detail panel in the web browser. Next, in step 3316, the system updates the inspector element with selections from the detail panel. Then, in step 3318, the system highlights the defined element in green. Record mode processing steps 3200 (described above), as well as the create job mode 3400 (discussed below) can also occur.

Figure 15:
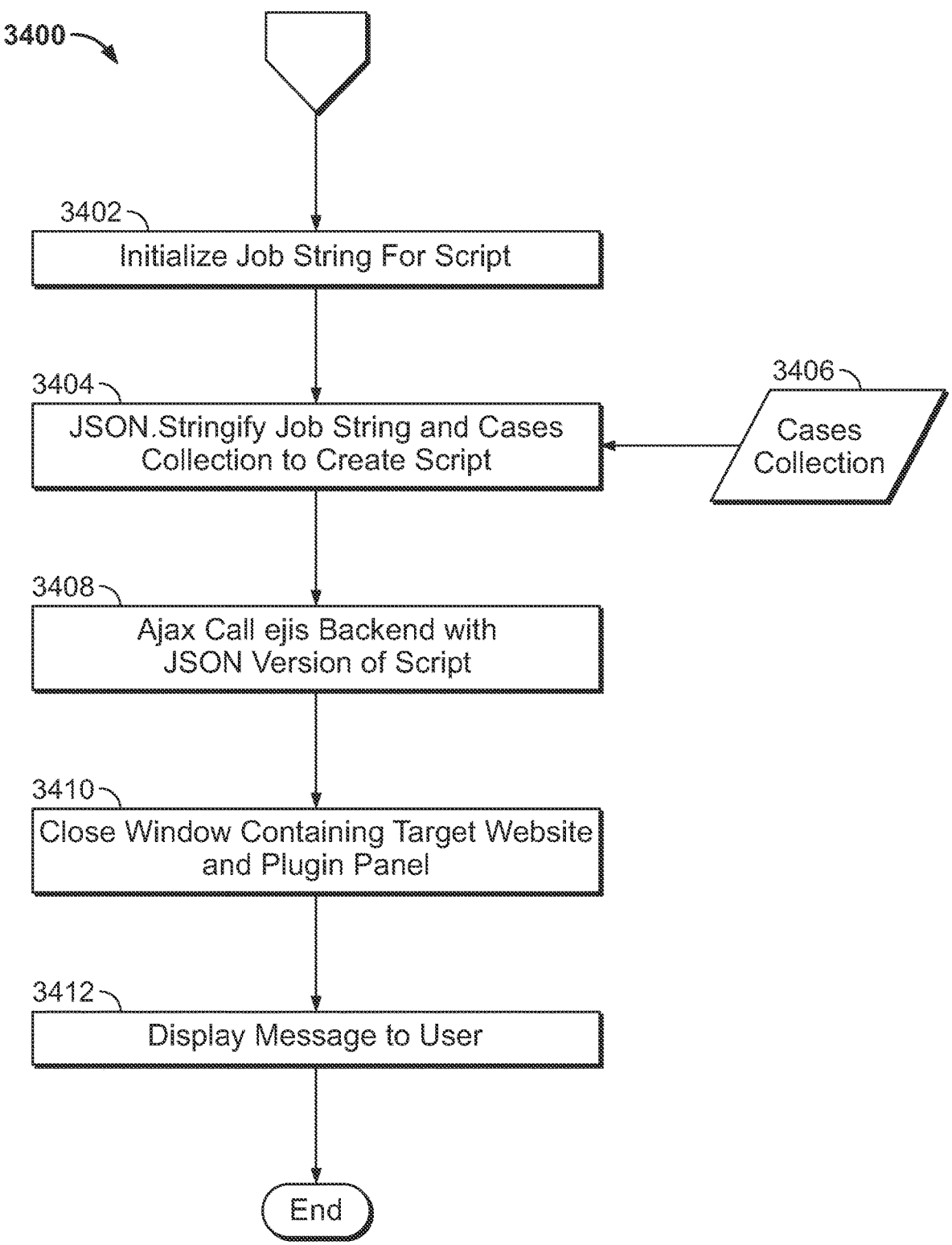

FIG. 15 is a flowchart illustrating processing steps of the create job mode 3400. In step 3402, the system initializes a job string for the script to be created. Next, in step 3404, the system creates the job script (a JSON.Stringify job script) that includes all of the cases in the case collection 3406. In step 3408, the system calls the ējis™ backend (server) with a JSON version of the script. Then, in step 3410, the system closes a window containing the target website and the plugin panel. Finally, in step 3412, the system displays a message to the user.

FIGS. 16-18 are screenshots illustrating sample user interface screens generated by the system for allowing a user to review a target website page and to select portions of the page for automatic variance detection by the system. Specifically, the user interface screens generated by the system and illustrated in FIGS. 16-18 allow for processing of websites beyond a defined Base Website or a Base URL, and allow the system to perform automatic variance detection across multiple websites, including third-party websites (also referred to herein as "Multi-Website Traverse"). For example, as is known in the art, a business website can be linked to one or more external or partner websites in order to complete user functions. This can include linking to an external website to submit a credit card payment, to view account information, to retrieve rewards information, to conduct a transaction by redeeming point for travel, etc. The system of the present disclosure allows the user to traverse across multiple websites to setup benchmarks and define variance runs (e.g., jobs) so that the system automatically detects for variances across multiple website pages (including third-party website pages), automatically. As will be explained in further detail below, the system will "follow" the user's traversing path across multiple websites, allow the user to tag specific assets/content across multiple websites to create a benchmark, and run variance jobs. The system also records the URLs within case records, even if the URL is on a different website. Accessed and requested content on the URLs is saved into a database. When the variance job process runs, the same process is repeated automatically, and the content at the time of the variance run is compared to the content from the benchmark run. This Multi-Website Traverse greatly improves the functionality of computer system by allowing the user to automatically detect variances in multiple websites, thereby simplifying computational complexity, vastly improving detection speeds, and reducing memory requirements.

FIG. 16 is a screenshot of a web browser screen 3500 generated by the system, which includes a job definition page 3502 and a benchmark button 3504. The "Base URL" field contains the web address of the target website. When the user wants to create a new benchmark (i.e. start a recording session), he/she clicks the New Benchmark button 3504 to display the ējis™ Plugin Page. It is noted that the system allows for variance checking across different versions of the same website, such as production, pre-production, and test versions of the same website. Advantageously, this allows an enterprise to check for variances that could exist in such versions of the website, but which are not readily apparent from a visual inspection/comparison of the website. Such a feature therefore allows the system to serve an important quality checking and testing function in connection with the development and testing of an organization's website.

Figure 17A:
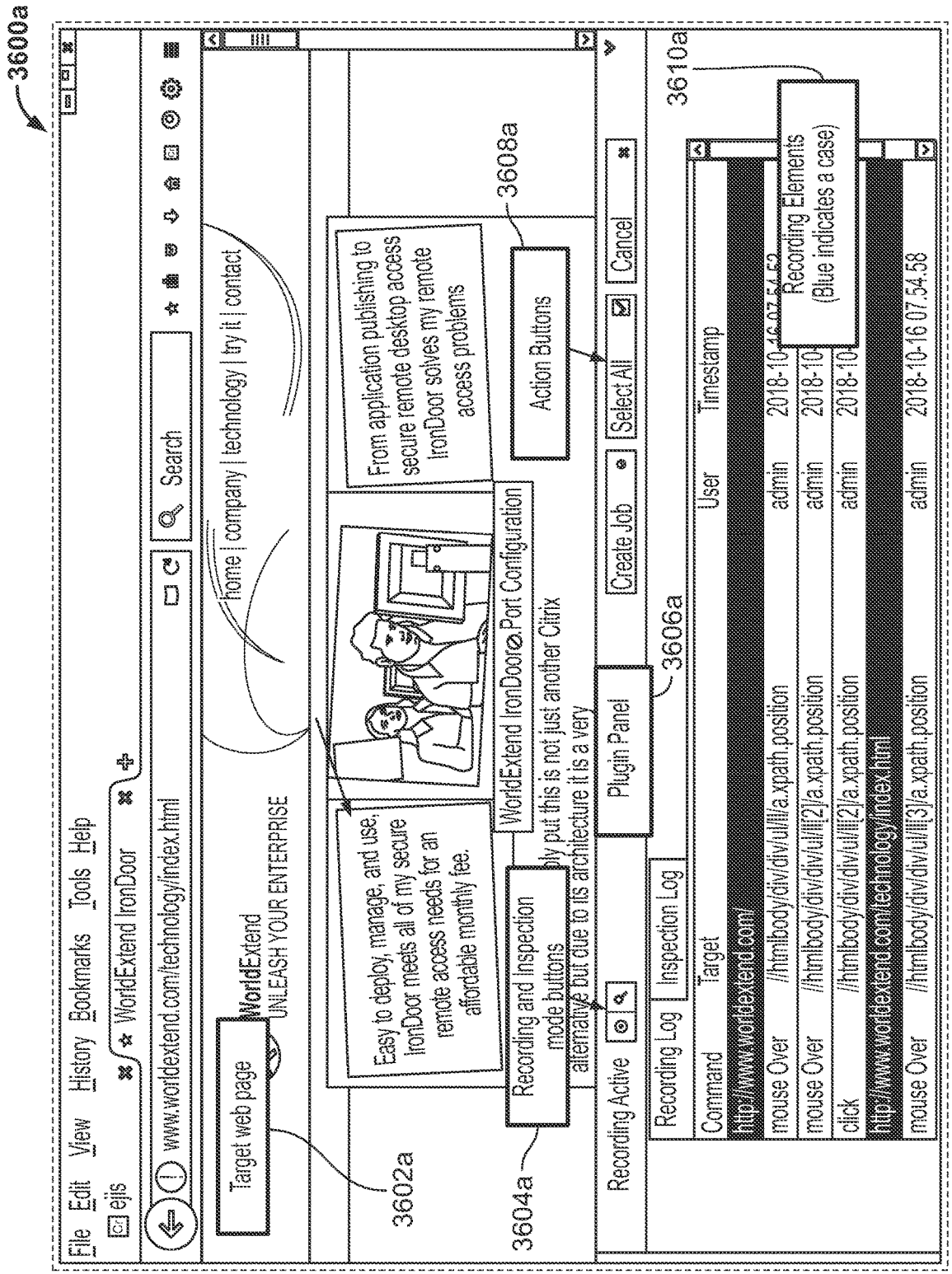
Figure 17B:
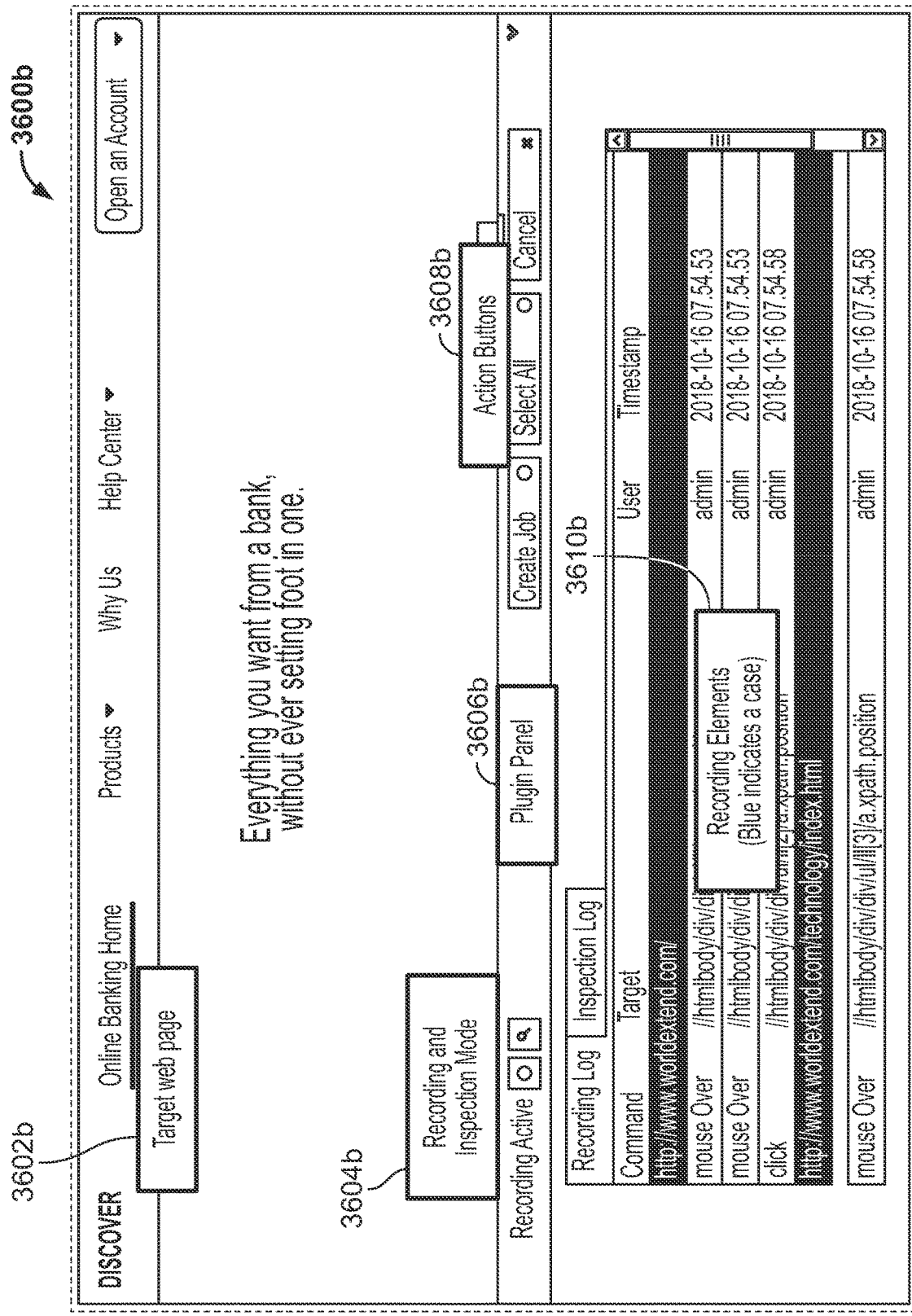
Figure 18:
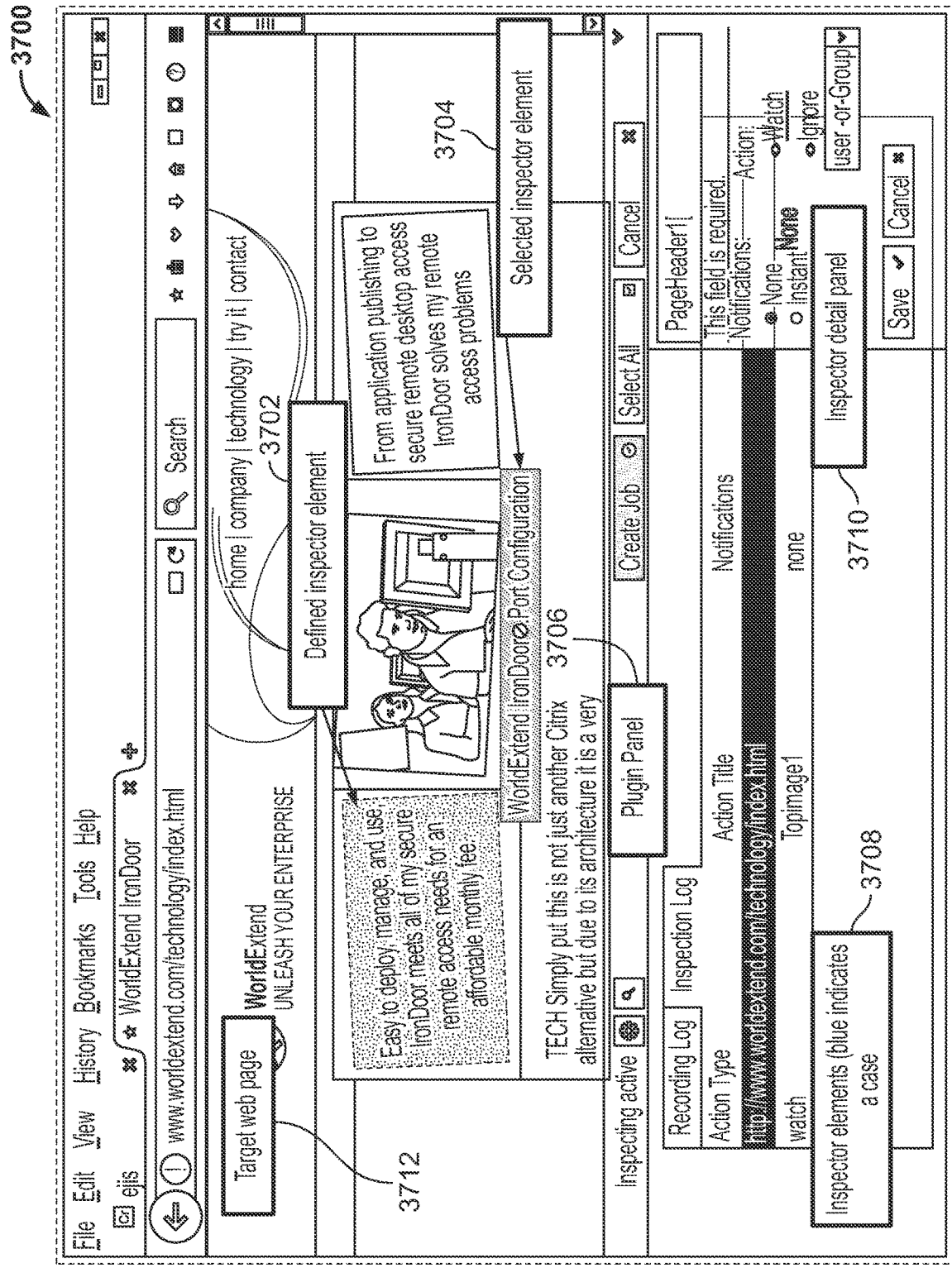

FIGS. 17A-17B are screenshots illustrating additional web browser screens 3600*a,b* generated by the system, which include a target web page area 3602*a,b*, recording and inspection mode buttons 3604*a,b*, a plugin panel 3606*a,b*, action buttons 3608*a,b*, and recorder elements 3610*a,b* (indicated in blue). These browser screen is used to traverse the target website. User actions are recorded and displayed in the Recording Log at the bottom. Each case (i.e. collection of web page actions) is highlighted in blue. The cases can then be stored in database records. FIG. 18 is a screenshot illustrating a third web browser screen 3700 generated by the system. This screen includes a plugin page in an inspection mode where the system is used to select web page elements for the benchmark and later comparison. When a user locates his cursor over an element, it is highlighted in blue and the inspector detail panel flies out, wherein the user can define the inspection element. Elements previously selected and defined are highlighted in green. As can be seen, the system allows the user to define an inspector element 3702 which, once defined, automatically detects for variations in the element. The user can also select another inspector element, such as the element 3704 shown in FIG. 18. The plugin panel 3706 is also displayed to the user, and lists inspect elements 3708 in blue. The inspector detail panel 3710 allows the user to provide detailed information for each inspector element, such as the name of the inspector element, and attributes such as notifications and actions to be taken by the element.

The system can further include a an Enhanced Element Search ("EES") feature, which provides a different mechanism to monitor for variances in assets on a given web page. The EES allows the user to predefine a web page and an element attribute key pair for the backend benchmark and variance processes to search for (as opposed to an element defined using the plugin discussed herein). This functionality is particularly useful to find the same element on many different websites, allowing the user to not perform a recording session on each website.

On a web page, elements are defined using HTML and can look like the following: <div id='top_section' name='top' width='100px' class='header'>Hello!</div>

The text "div" is the HTML tag. The "div" element is encapsulated between the beginning <div> and the ending </div>. The text "id", "name", "width", and "class" are element attributes. Each attribute has a name and value, which we call the key pair.

Using the EES feature, the user defines a key pair to use for searching. For example, the user would define "name=top" as the search criteria. When the ējis™ backend processes are finding elements to use for comparison, the system will perform a search on all elements of a page for those that have an element attribute called "name" with a value of "top". This element will be retrieved and stored in the database.

In addition to the EES feature discussed above, the system can further include an Expanded Search Comparison ("ESC") feature, which allows the user to pre-define websites and specific asset/content (via an element attribute key pair) for the backend benchmark and variance processes (as opposed to an element defined using the plugin). The ESC feature provides significant advantages over existing (open source) Internet search systems which only search for a particular name or brand across the Internet but do not provide intelligence/analytics as to whether a particular name or brand is actually being displayed correctly and/or in accordance with pre-defined parameters on one or more websites. The ESC feature of the present disclosure solves this problem by allowing a user to define a field of URLs and to do automatic variance checking within the defined field of URLs, thereby providing intelligence within one or more web pages as to whether digital assets (e.g., names, logos, advertisements, content, etc.) are actually being appropriately displayed within the one or more web pages.

As discussed above, to select web assets or content for comparison on a website, the user starts a recording session using the plugin. When the user finds the asset or content they want to 'tag' or 'capture', the user then toggles the plugin into inspection mode to select the specific asset/content. The inspection mode is used to select specific assets/content or "web page elements" for the benchmark and variance comparison jobs. When the user locates his cursor over a specific asset or content element, it is highlighted in blue and the inspector detail panel flies out; where the user can define the inspection element (elements previously selected and defined are highlighted in green).

The ESC feature provides the user with a unique mechanism (element attribute key pair) to find specific assets or content that needs to be analyzed on any given website without knowing the exact location of the specific asset or content on the website. For example, the specific asset or content that needs to be analyzed could appear anywhere on the website page and the system will identify the asset or content, 'lock onto it', and perform the comparison, analytic and reporting functions discussed herein. The ESC feature is particularly useful if the user wants to locate the same asset or content (element) on many different websites and does not know where the specific asset's or content's location is on each website.

By way of example, on a website page, all elements are defined using HTML and can look like the following HTML code string:

<div id='top_section' name='Cr24code' width='100px' class='header'>Hello!</div>

In the example HTML code string, the text "div" is the HTML tag. The "div" element is encapsulated between the beginning <div> and the ending </div>. The text "id", "name", "width", and "class" are element attributes. Each attribute has a name and value, which is called the 'key pair.' The key pair is leveraged and used by the system to identify specific assets or content on websites without knowing or pre-identifying the location of the specific asset or content on the website page. Using the ESC feature, the user can define a key pair for searching on any website page. Using the above HTML code string, the user can define "name=Cr24code" as the search criteria. When the backend processes of the system are finding elements to use for comparison, they will perform a search on all elements of a webpage for those that have an element attribute called "name" with a value of "Cr24code". This element will be retrieved and stored in the database.

The ESC feature can also provides new, incremental data elements and aggregated reports for new measurement and analytics for specific assets or content, such as the following:

1. Number of times, and percentage of time, a specific asset or content is presented or shown to an audience;
2. How often (number of times) the asset or content is rendered correctly according to specific corporate brand standards, without defects to an audience;
3. When specific asset or content renders incorrectly, outside of corporate brand standards—which specific browser versions are responsible for the 'distortion/defect';
4. When the specific asset or content appears to an audience—the number of times/frequency percentage of time, it appears "above the fold" visually.

When the specific asset or content appears to an audience the system takes a screenshot of the entire website page to reveal the other content on the website page that is around or near the specific asset or content to be analyzed.

Importantly, the EES and ESC features described herein provide a multi-tiered, triangulated, automatic content search and comparison system in a way not possible with existing search tools. Specifically, the EES component of the system allows for rapid searching for desired content across a variety of web pages using key pair searching (the first tier/module of the system), and when matches are found, the system provides even deeper comparison and variance checking and analysis to ensure that the located content conforms with pre-defined standards and has not been varied (the second tier/module of the system). Together, the EES and ESC features represent a significant technological improvement in the functioning of computer-based content searching systems by allowing for not only rapid searching and identification of desired content in digital assets, but also deep evaluation and analysis of the located content to rapidly ascertain whether the content conforms to expected standards.

Figure 19:
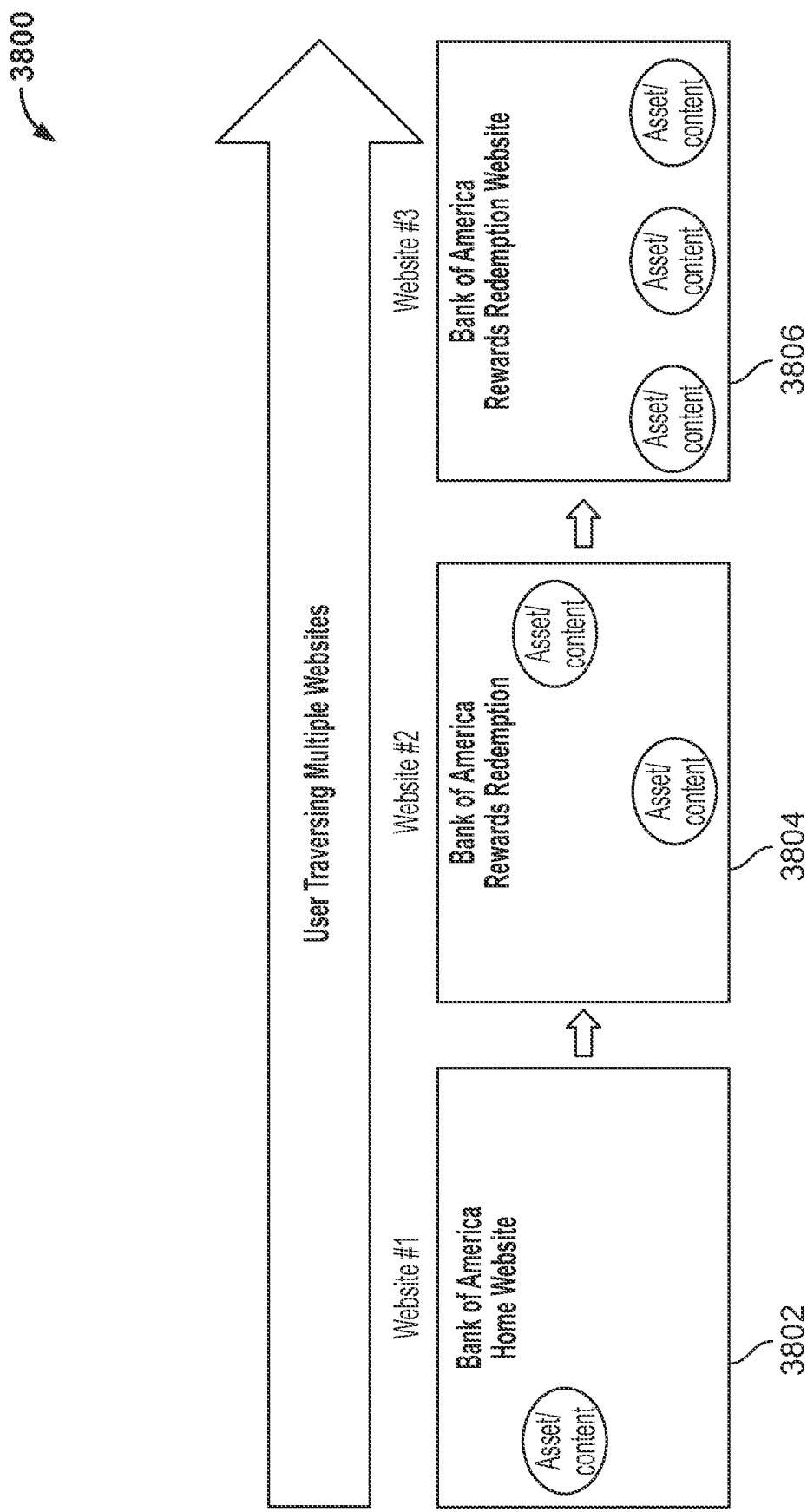
FIG. 19 is a diagram illustrating automatic variance detection by the system across multiple websites.

FIG. 19 is a diagram illustrating a case flow example of the system performing a Multi-Website Traverse, indicated generally as 3800, where the following steps are performed:

In step 3802, on WEBSITE #1—Bank Home Website:
The user goes to the website www.bankofamerica.com [WEBSITE #1]
The user 'tags' the "view credit cards" button
The user clicks the 'view credit cards' button and goes to the credit card page of that same website
The user clicks 'View rewards' and goes to the 'rewards' website (which is a different website—WEBSITE #2)

In step 3804, on WEBSITE #2—Bank Rewards Website:
The user tags multiple assets on the 'Rewards' website
The user clicks 'redeem travel' button and goes to the 'travel redemption' website (which is a different website—WEBSITE #3)

In step 3806, on WEBSITE #3—Bank Rewards Redemption Website:
The user tags multiple assets on the 'Travel Rewards Redemption' website
The user completes benchmark job Advantageously, in the case flow example 3800, only one ējis™ benchmark job is created and consists of multiple assets and specific content being tagged across three different and unique website. This greatly simplifies computational complexity and storage requirements, as well as greatly simplifies and expedites the variance detection process, by allowing variance detection to rapidly occur automatically across multiple websites using a single job executed by the system.

FIGS. 20A-25B are screenshots illustrating sample user interface screens generated by the system for allowing a user to review a target website page in graphical format as well as in HTML code format using the systems and methods discussed herein. Specifically, the screens shown in FIGS. 20A-25B allow for real-time graphic and HTML code assert discovery across numerous browser versions.

Figure 20A:
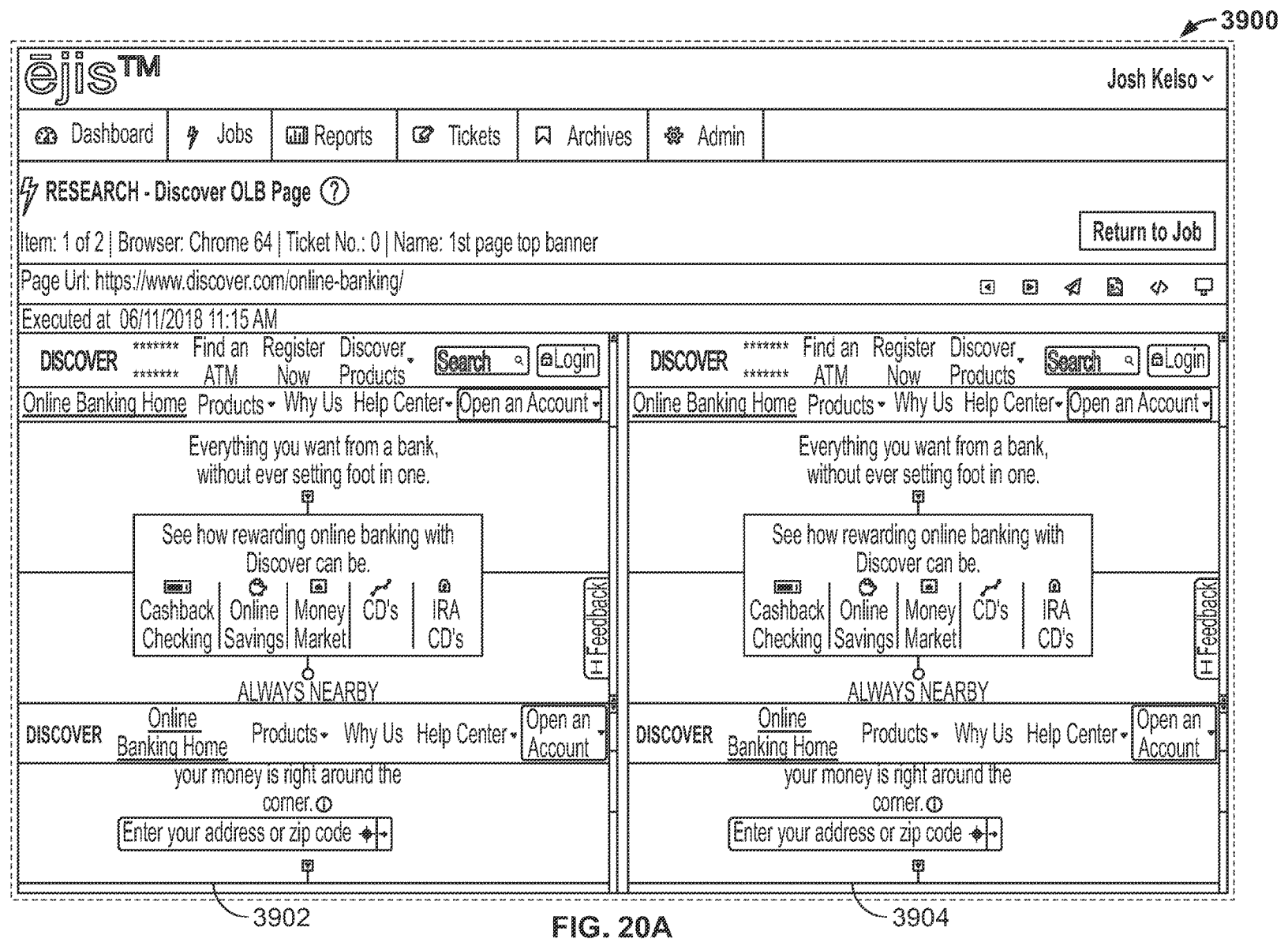

FIG. 20A is an example of a screenshot of a web browser screen 3900 generated by the system, which includes a benchmark view 3902 and a variance view 3904. The benchmark view 3902 and the variance view 3904 show a graphical view of a website page. As can be seen in FIG. 20A, there is no variance visible between the benchmark page, and the current view of the website page.

FIG. 20B is example screenshot of a web browser screen 4000 generated by the system, which includes a benchmark view 4002 and a variance view 4004 of the HTML code associated with the website page shown in FIG. 20A. As can be seen, red highlights with strike-through in the variance view 4004 indicate code that is not present from the benchmark view 4002, while green highlights indicate net new code that is not present in the benchmark view 4002. As can be appreciated, by presenting a web page in both graphical and code representations, the system allows for detection of variances that might not be visible by the human eye, but nonetheless exist. Vice versa, the system allows for detection of variances in a web page that are not detectable in code, but are detectable via visual inspection of the graphical rendering of the web page, such as web pages that display the same images but with different resolutions.

Figure 21A:
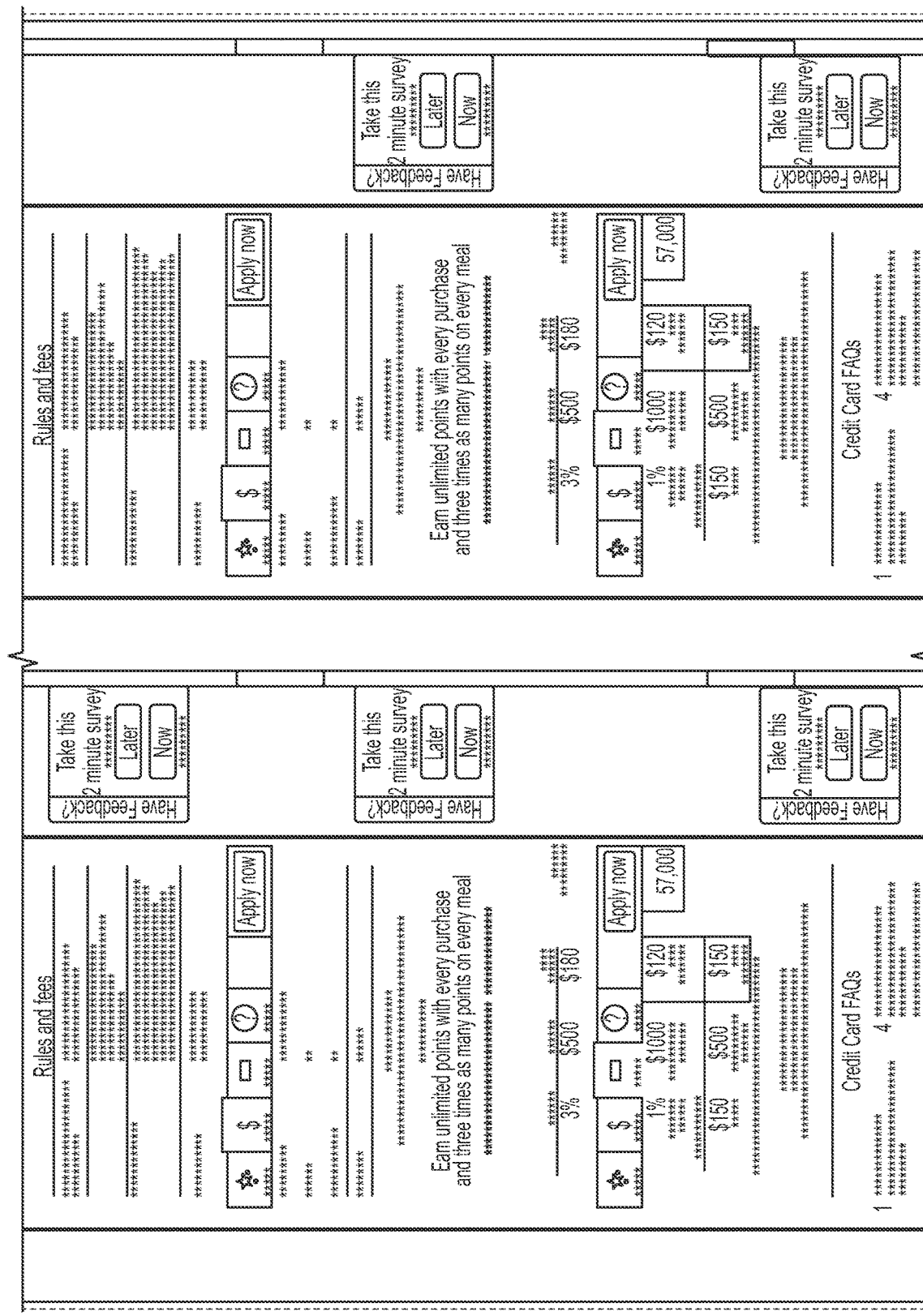
Figure 21A:
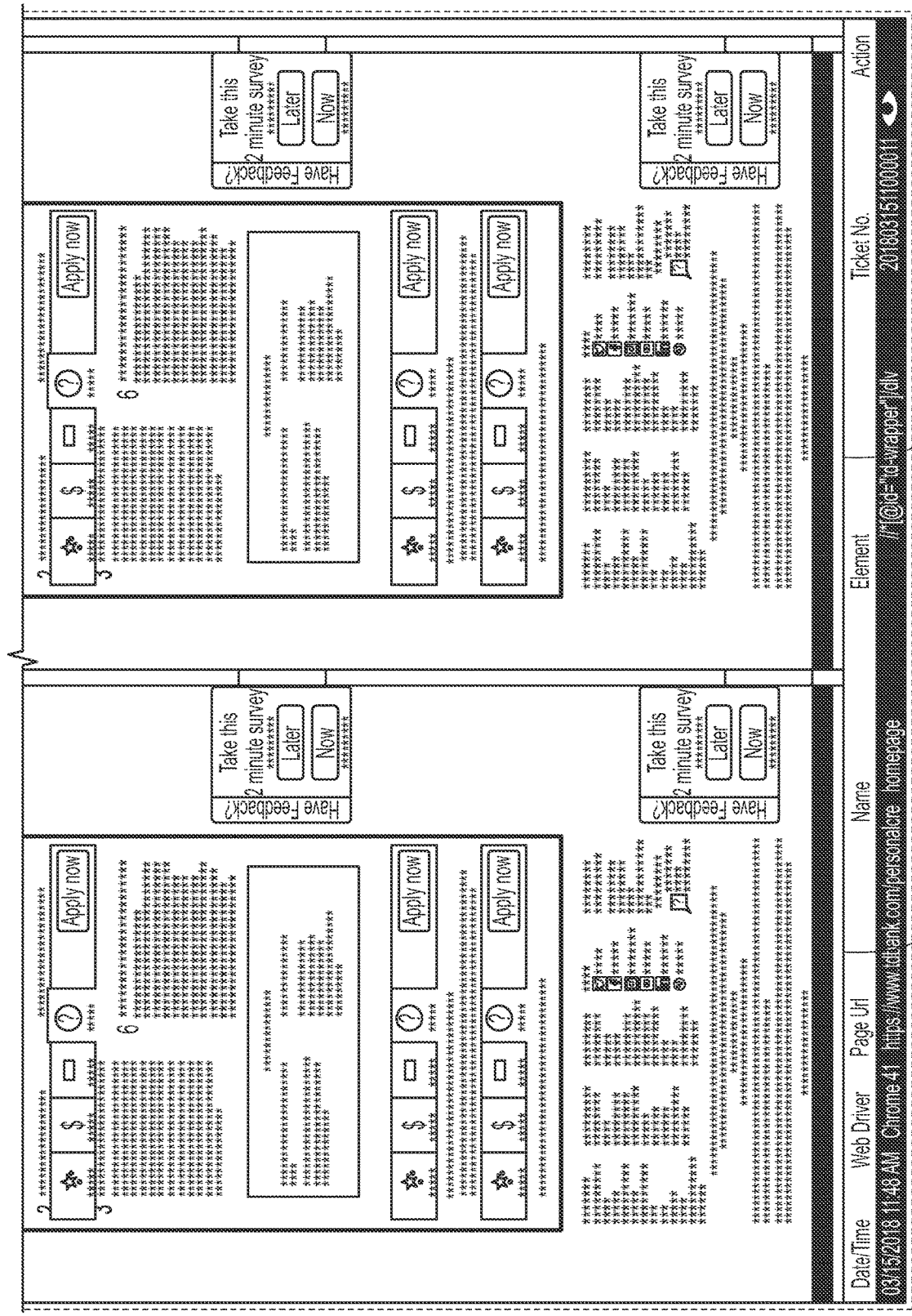
Figure 21B:
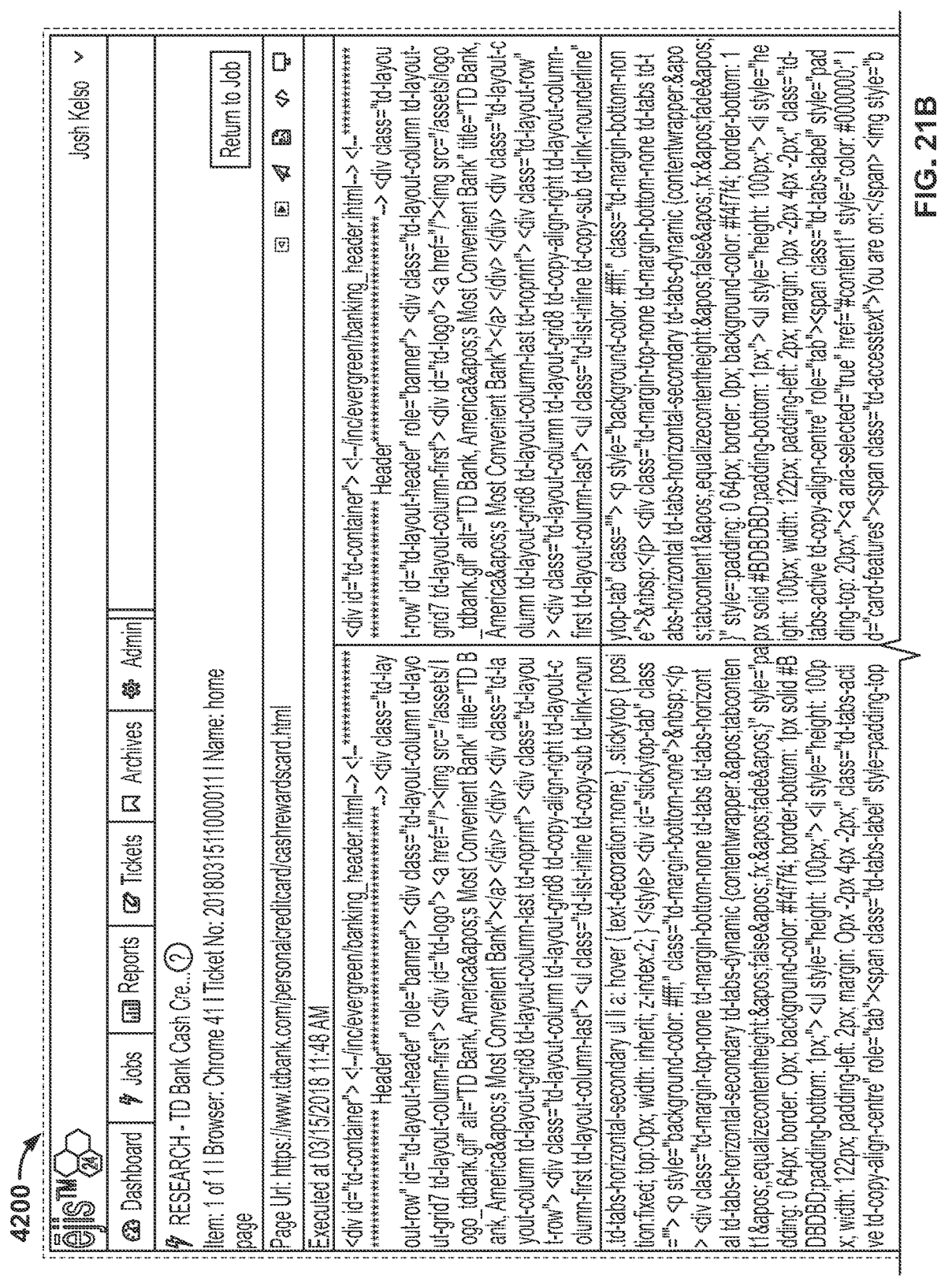

FIG. 21A is another example a screenshot of a web browser screen 4100 generated by the system, which includes a benchmark view 4102 and a variance view 4104. The benchmark view 4102 and the variance view 4104 show a graphical view of a website page. FIG. 21B is an example a screenshot of a web browser screen 4200 generated by the system, which includes a benchmark view 4202 and a variance view 4204 of HTML code associated with the website page shown in FIG. 21A. FIGS. 21A and 21B are screenshots from a bank production website. The system scanned a scrolling 7-8 page asset of graphics and its 954 lines of HTML code in less than 60 seconds. The system automatically discovered a variance 4206 in the HTML code on line 851.

As can be appreciated, the system of the present disclosure provides powerful tools for automatically traversing website content and detecting variances in such content, thereby representing a marked technological improvement over existing content management software systems. The system provides speed, comprehensiveness, and precision in detecting variances in content in a manner not possible in existing systems.

Figure 22A:
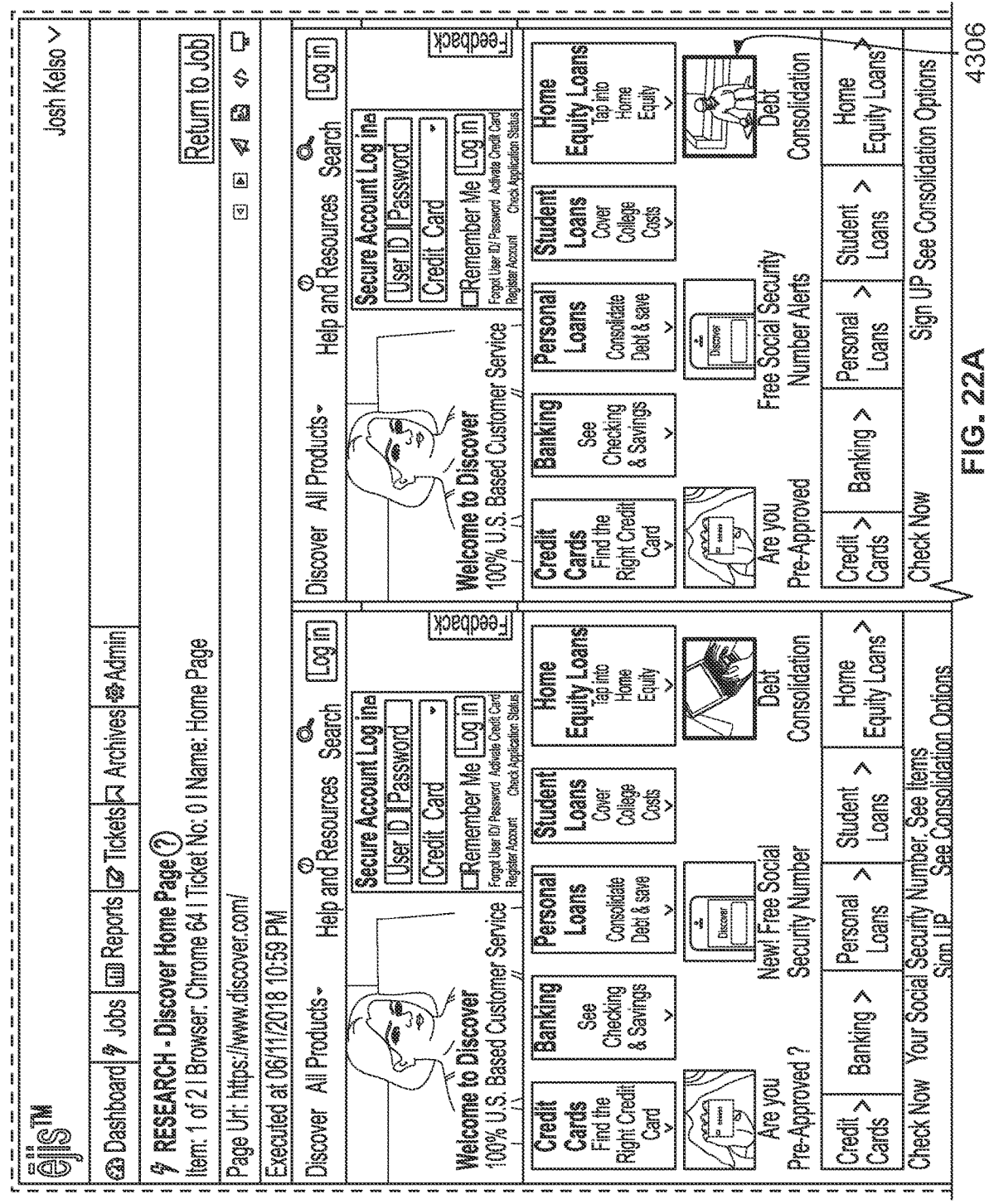
Figure 22A:
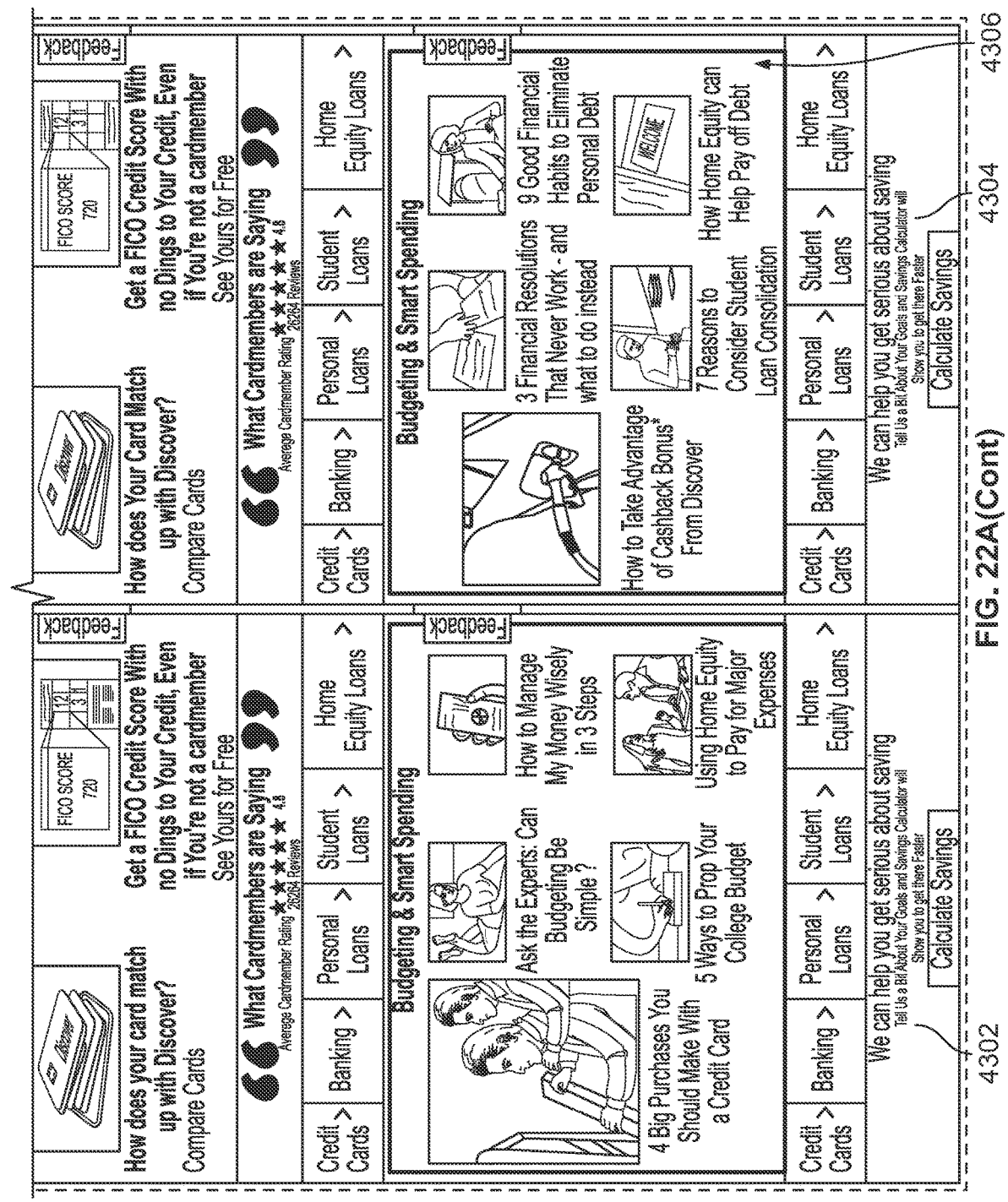
Figure 22B:

FIG. 22A is another example of a screenshot of a web browser screen 4300 generated by the system, which includes a benchmark view 4302 and a variance view 4304. The benchmark view 4302 and the variance view 4304 show a graphical view of a website page, where the variance view 4304 shows two variances 4306. FIG. 22B is an example screenshot of a web browser screen 4400 generated by the system, which includes a benchmark view 4402 and a variance view 4404 of HTML code associated with the website page shown in FIG. 22A. Red highlights with strike-through in the variance view 4404 indicate code that is not present from the benchmark view 4402, while green highlights indicate net new code that is not present in the benchmark view 4402. As seen, the system scanned the website home page and detected and identified two graphical changes, and changes in the HTML code. The system identifies, locates, highlights, archives, notifies users, and reports the new marketing images. Other graphical changes can include blurred or distorted images, a change in image size, a change in image location, etc.

Figure 23A:
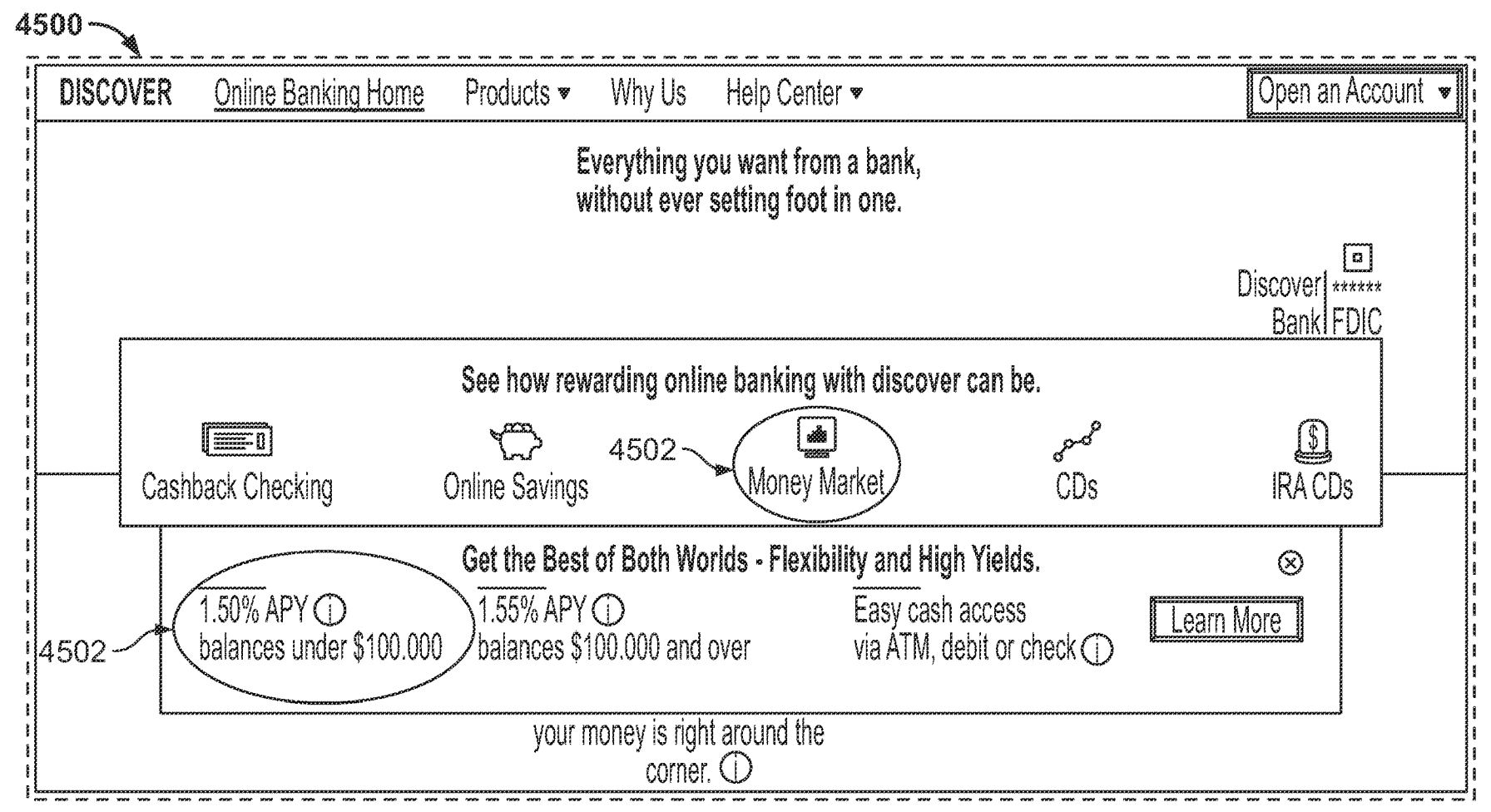
Figure 23B:
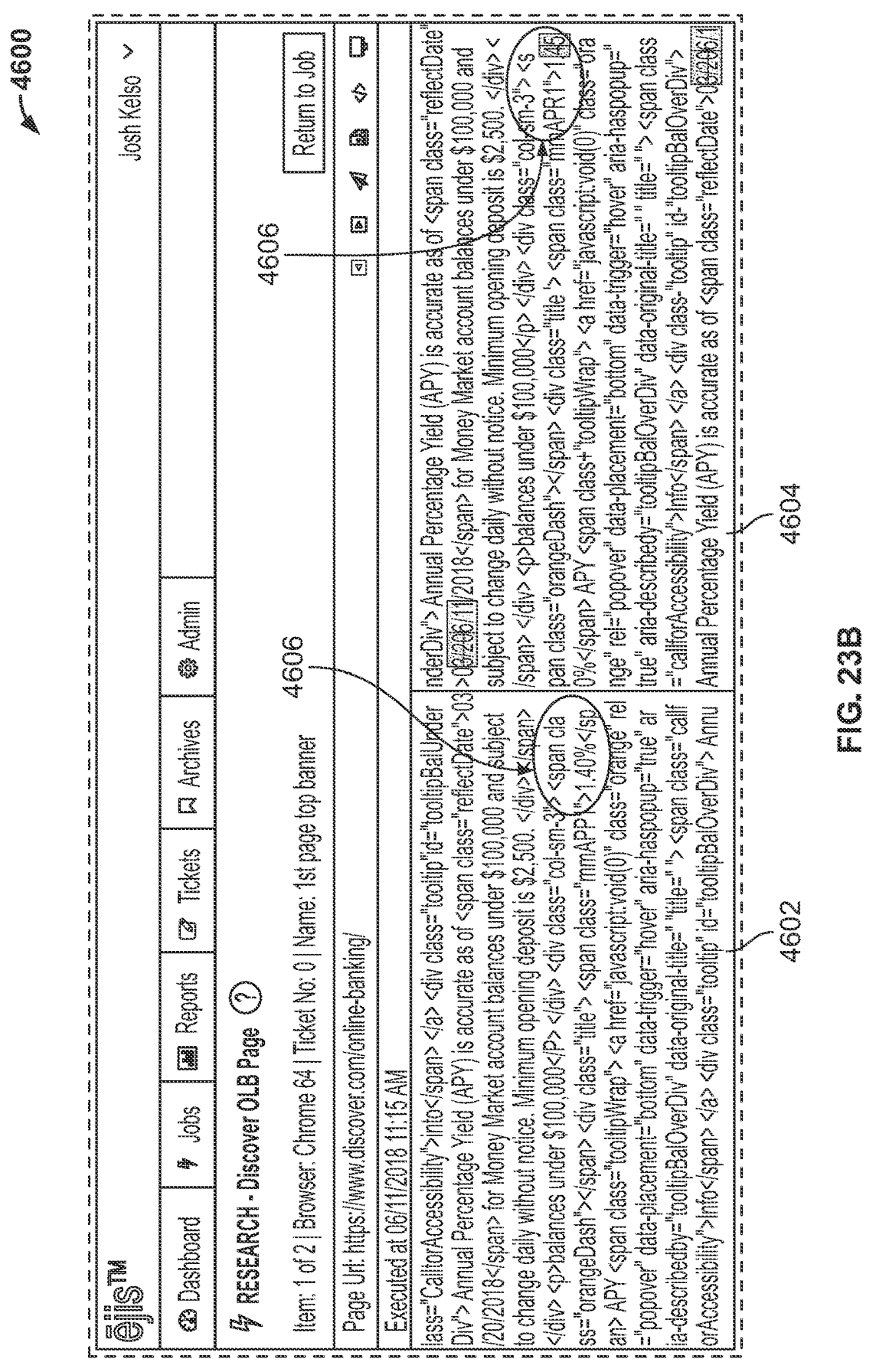

FIG. 23A is another example of a screenshot of a web browser screen 4500 generated by the system, which includes a variance view 4502, which shows a graphical view of a website page. The variance view 4502 shows two variances 4504, which are graphical changes from a benchmark page (not shown). FIG. 23B is an example screenshot of a web browser screen 4600 generated by the system, which includes a benchmark view 4602 and a variance view 4604 of HTML code associated with the website page shown in FIG. 23A. Red highlights with strike-through in the variance view 4606 indicate code that is not present from the benchmark view 4602, while green highlights indicate net new code that is not present in the benchmark view 4602. As seen in FIGS. 23A and 23B, the owner of the website changed the graphical view of the webpage to indicate that the APY is 1.50%, whereas the HTML code was change to increase the APY from 1.40% to 1.45%. The system scanned the home page and automatically detected this change, which is not visually apparent and can easily be overlooked during a manual and time-consuming search. The system identified this important rate change in under 20 seconds.

Figure 24A:
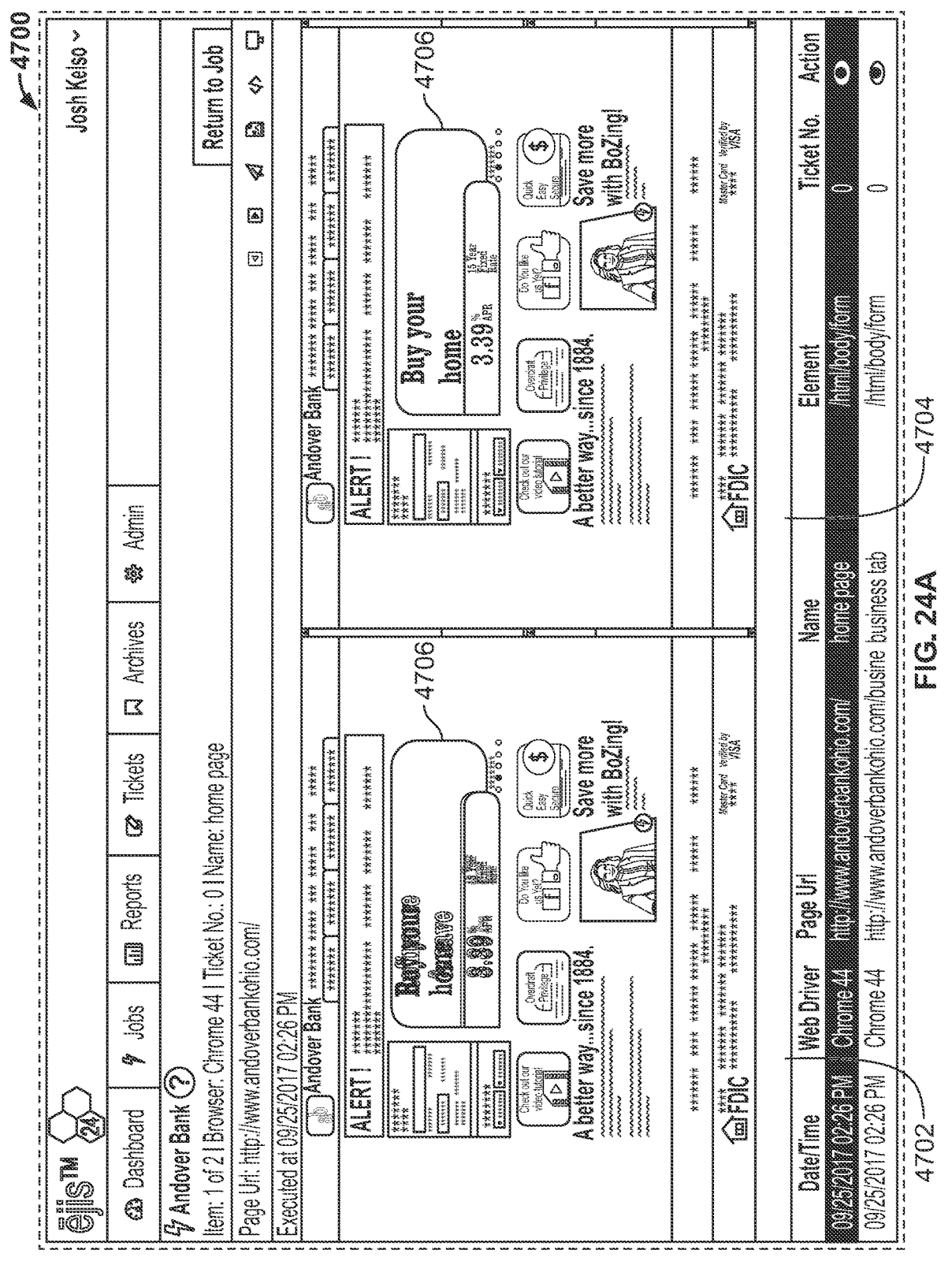

FIG. 24A is another example of a screenshot of a web browser screen 4700 generated by the system, which includes a benchmark view 4702 and a variance view 4704. The benchmark view 4702 and the variance view 4704 show a graphical view of a website page. A difference 4706 exists between the two views, where the "buy your home" graphic is blurred on the benchmark view. FIG. 24B is an example screenshot of a web browser screen 4800 generated by the system, which includes a benchmark view 4802 and a variance view 4804 of HTML code associated with the website page shown in FIG. 24A. As can be seen, the HTML code is the same between the benchmark view 4802 and the variance view 4804, even though the "buy your home" graphic is different between the benchmark view 4702 and the variance view 4704 in FIG. 24A. This is a false positive identified by the system.

Figure 25A:
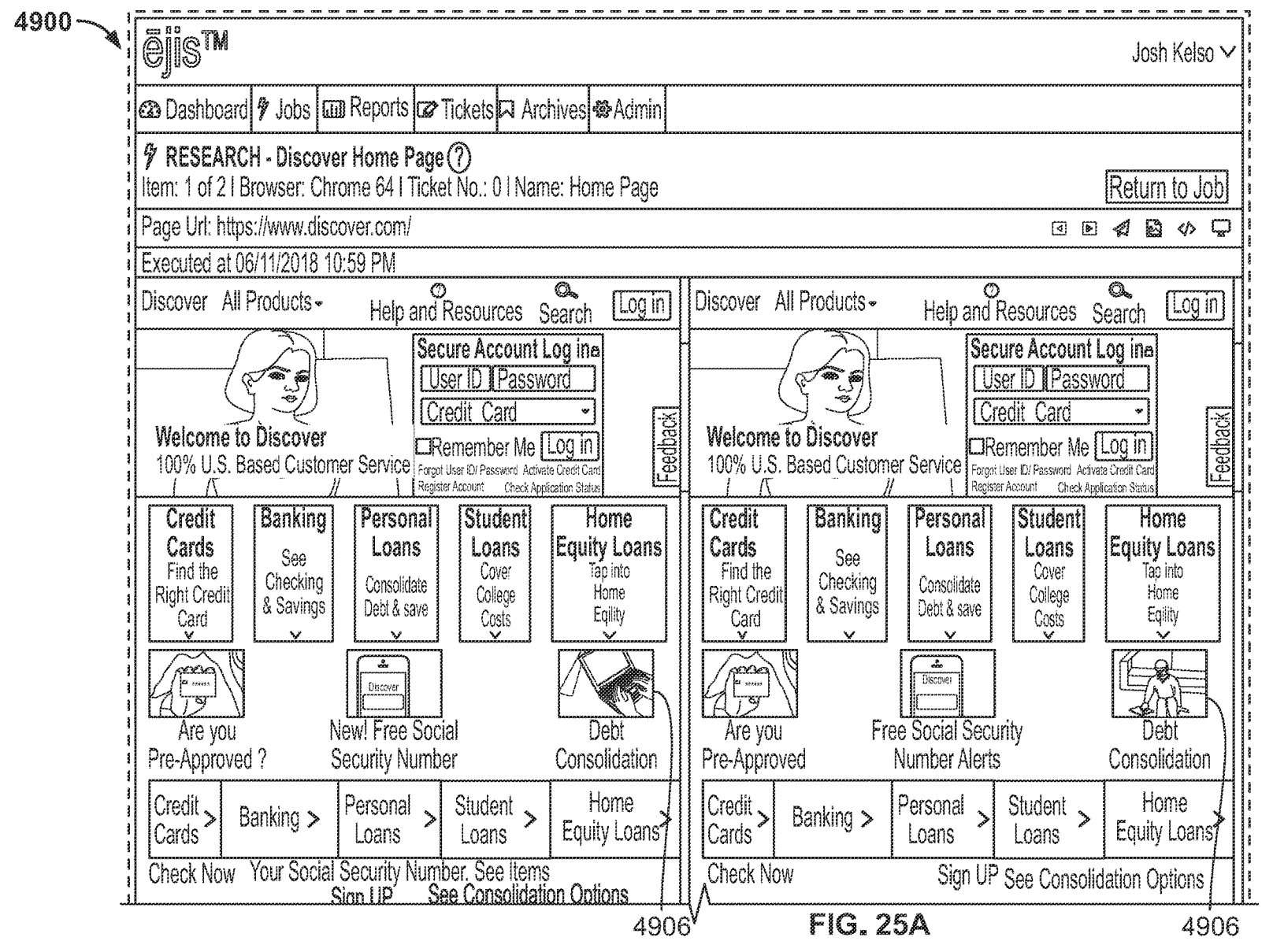
Figure 25A:
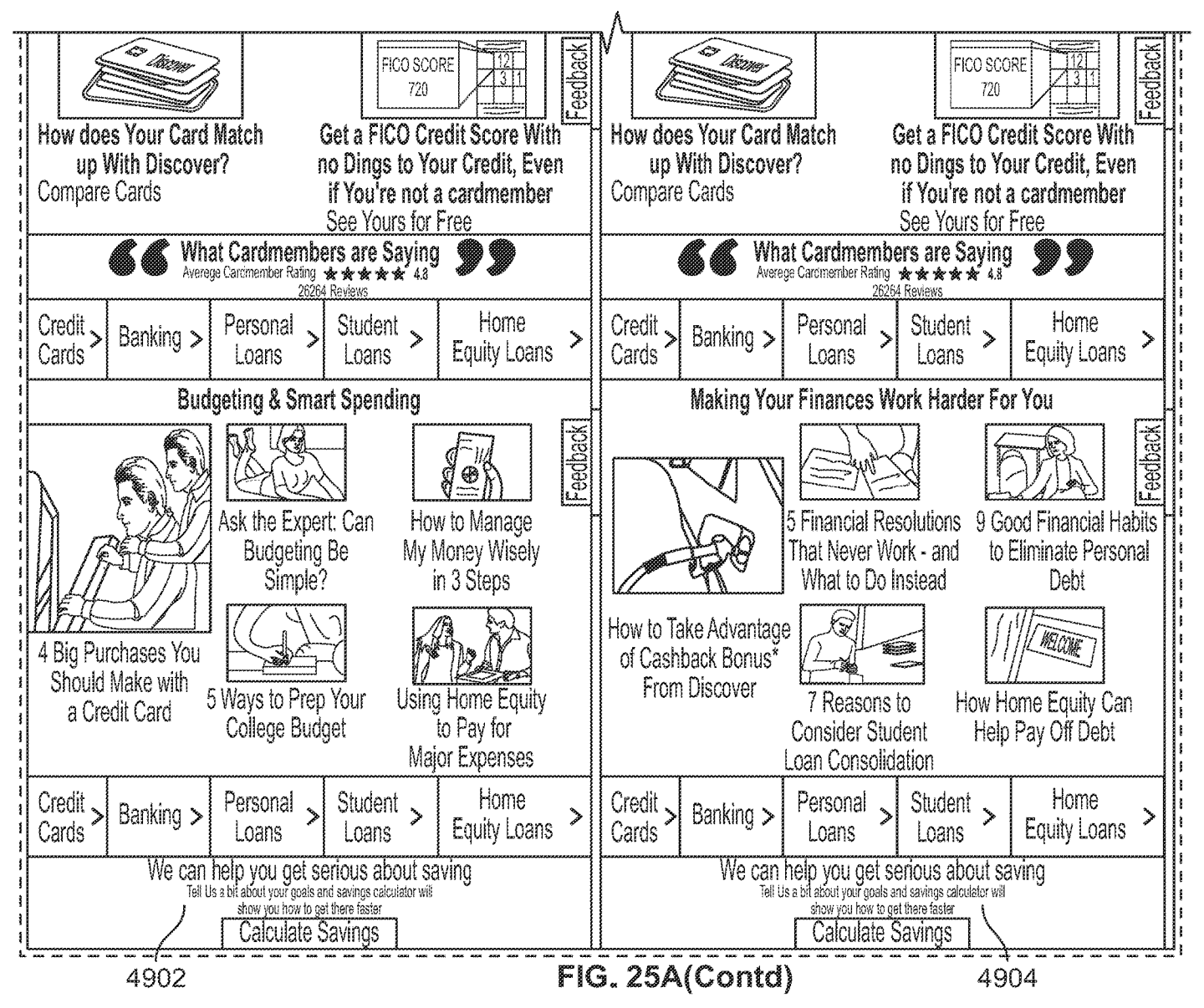
Figure 25B:
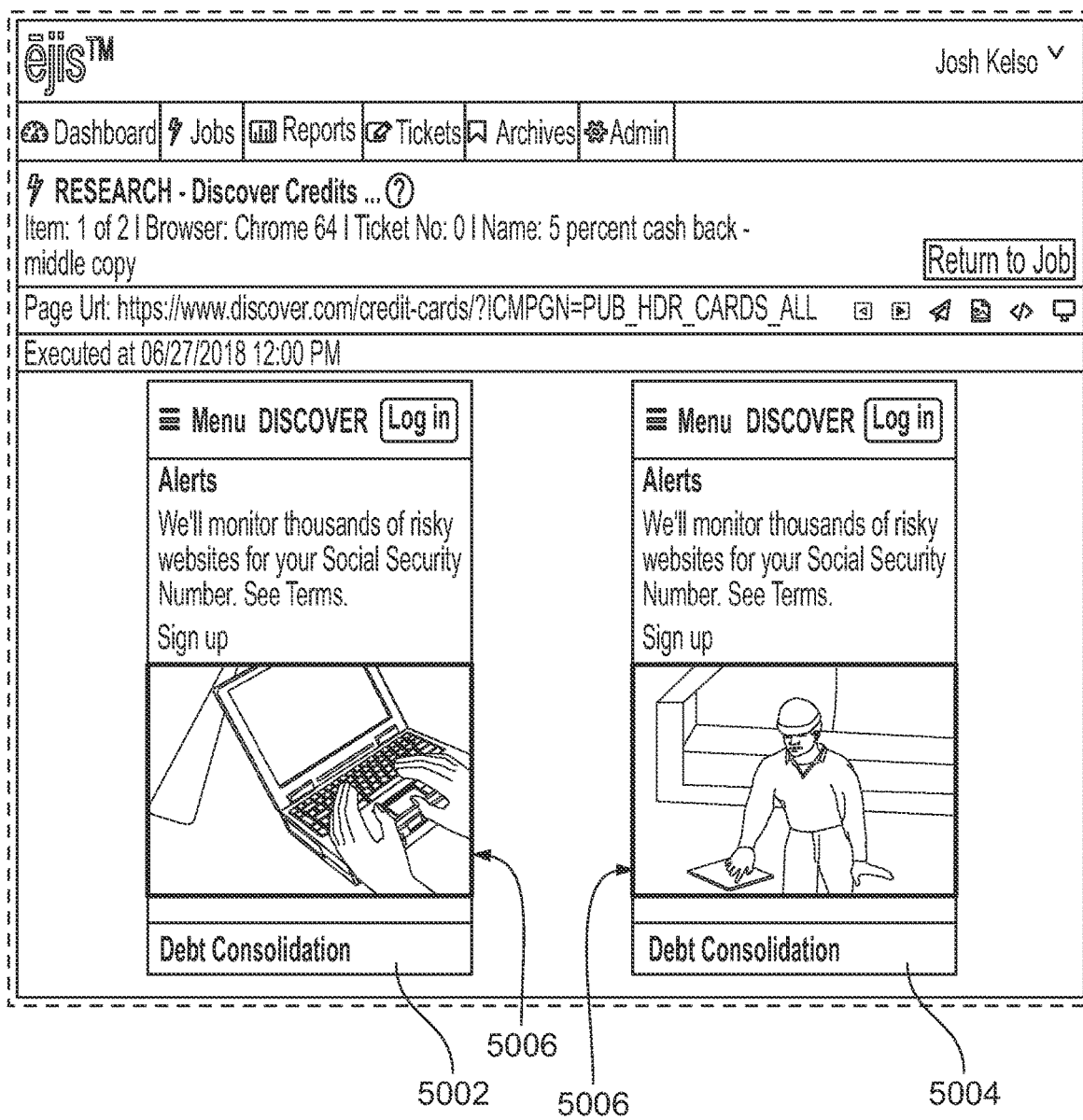

FIG. 25A is example of a screenshot of a web browser screen 4900 generated by the system in a desktop/laptop/tablet format. FIG. 25B is example of a screenshot of a web browser screen 5000 generated by the system in a mobile device format. FIGS. 25A and 25B show the system providing the same capabilities across different device formats and screen sizes. Specifically, FIG. 25A shows a variance 4906 between a benchmark view 4902 and a variance view 4904 on the desktop/laptop/tablet format, and FIG. 25B shows a variance 5000 between a benchmark view 5002 and a variance view 5004 on the mobile device format.

Figure 26:
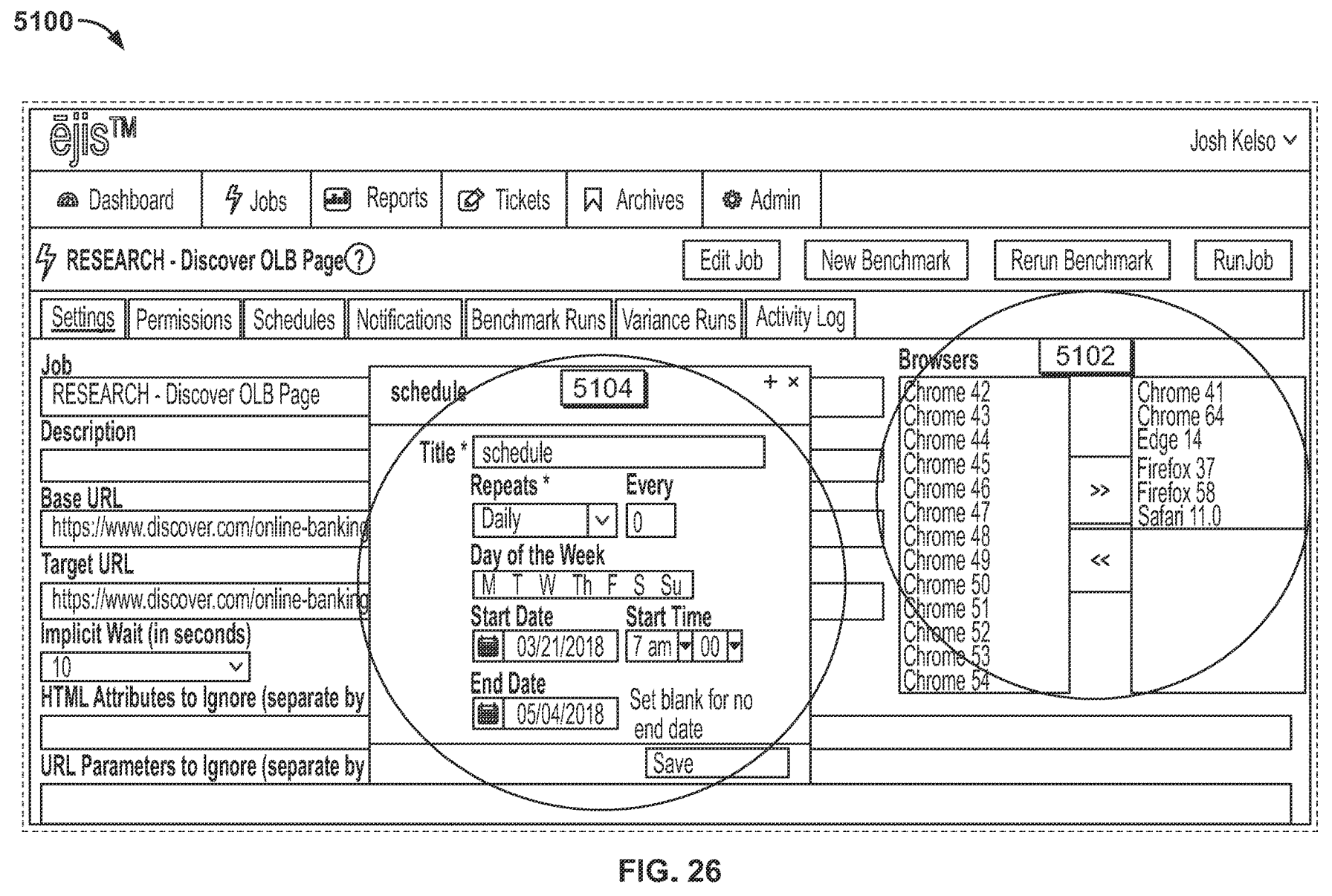

FIG. 26 shows a screenshot of a web browser screen 5100 generated by the system, showing real-time graphic and code asset discovery across multiple browsers. As shown in circle 5102, the system expands a testing footprint beyond a standard 5-20 reviews of a digital asset, providing for more active browsers, operating systems, and devices to match an adaptation stand of 450+ reviews, and beyond with reduced costs. As shown in circle 5104, the system monitors digital content every specified time period (e.g., every minute, every month, etc.) Again, the system provides vast speed improvements over a manual review, which, for example, would require 630 hours and cost $25,200 to review 10 assets across 10 reviews, 3 days a week, every other hour.

FIG. 27A shows a screenshot of an audit format an audit compliance report for an assert review generated by the system. The audit format allows asset reconciliation and archived history to be easily validated and understood. FIG. 27B shows a screenshot of a dashboard of the present disclosure, which shows compliance reporting for asset view with Date/Time, Status, User ID, and a link to screenshots for quick internal-user spot-check and validation.

The plugin discussed herein is installed by the user before the user ever records a session. The plugin is executed every time a page is loaded within the web browser, whether the page is part of the target website or not. The plugin will determine if the web page is a target or not and will execute appropriate functions if so. When the New Benchmark button is clicked on the ējis™ Job Definition page, the new window will be assigned a browser window name of "aegisWindow" to indicate it is a target website. The following are steps performed during an ējis™ benchmark session:

1. Any web page is loaded and the ējis™ plugin gets control.
2. selenium-ide-overlay.xul is loaded and has script definitions.
3. The script definitions load other JavaScript libraries which call various JavaScript functions.
4. selenium-ide-overlay.js calls SeleniumIDE.Overlay.onContentLoaded.
5. seleniumIDE.Overlay.onContentLoaded calls aegis.onContentLoaded.
6. aegis.onContentLoaded:
   a. Get URL of page being viewed within plugin page.
   b. If a Firefox system page ("chrome:"), if it is, exit.
   c. Add ējis™ event listeners for main functions.
   d. If an ējis™ administration page, initialize plugin panel functions and make sure panel is hidden.
      i. Initialize MainController.init and call JavascriptAdapter.js→DOMInjector.js to inject MainController into plugin page.
      ii. Call RecordingContoller.init
         1. Previous script definitions will now load other JavaScript libraries which call various JavaScript functions to initialize the recorder.
         2. Injects required recorder JavaScript functions into plugin page
         3. Add event handlers for different user actions e.g. typing, changing field focus, mousedown, mouseover, click, select.
         4. Call JavascriptAdapter.js→DOMInjector.js to inject RecordingController into plugin page.
      iii. Call InspectionContoller.init
         1. Call JavascriptAdapter.js→DOMInjector.js to inject InspectionController into plugin page.
         2. The acid_dom JavaScript's (the inspector) are injected and ready to capture the selection of html elements. Inspection event handlers are added for mouseover, mouseout, and click.
   e. If window name is not "aegisWindow", exit.
   f. At this point, we have the target web site start page, we've initialized the plugin page, now initialize the target page.
      i. Call IInspectorController.init.
         1. Set up toggle of show panel.
         2. If in inspection mode (at this point we're not), call me.loadState to load ADI.activateLookup.
   g. Call aegis.showPanel to display the bottom panel in recording mode.
7. The target website start page is now being displayed in the top half of the browser window and the ējis™ plugin panel on the bottom half in recording mode.
8. In recording mode, user interacts with the web page by typing, clicking, or moving the mouse over web page elements.

a. On a click:
  i. Recorder-handlers.js event handler gets control, determines if it's a valid click (i.e. good mouse coordinates).
  ii. Calls locatorBuilders.js to determine all of the different ways to locate the element (by id, by position in DOM tree, by position from another element, etc.).
  iii. Passes command "click" and locator paths to recorder.js.record function, which notifies ISeleniumController.notify("record").
  iv. ISeleniumController calls aegis.js onrecord event handler to create a new case if necessary and add a recorder element to the cases collection within internal memory and being displayed on the plugin panel.
b. The same process occurs for each type of interaction (keydown, mouseover, and select) by calling its specific functions. Any pertinent information for that interaction (e.g. the value typed in a text box) is recorded within the recorder element.

9. In inspection mode, the user selects which elements of a web page, they'd like to save for later comparison for variances. The user enters inspection mode by clicking the Inspection Mode button on the plugin panel. Click on Inspection Mode button
  a. Clear any selections not defined.
  b. Set inspection mode flags and begin inspection mode.
  c. On mouseover, the DOM element, pointed to by the mouse coordinates, is validated to determine if it's "chooseable", that is, not a predefined, excluded element AND it is an actual HTML DOM element.
    i. If so, highlight the element in blue.
    ii. If the user clicks on that highlighted element function aegis.js.onselect is called from event handler.
      1. Insert new case if needed
      2. Stage inspection element
    iii. Open the inspection item detail panel and wait for user input, passing inspection element.
    iv. In the Inspector detail panel, the user can choose to:
      1. "watch" this element (compare it during a variance run)
      2. "ignore" the element (he might want to ignore an element embedded in a larger element)
      3. "instant notification", where a user or group of users is notified via email when the element is out of compliance (as opposed to being notified when the variance job ends)
    v. When the inspection details are saved:
      1. Add the returned inspection element to the cases collection.
      2. Highlight saved DOM element in green on the target web page.
  d. For each inspection, perform the same process.

10. When user is finished traversing site, ējis™ has built a collection of cases, recordings, and inspections. To complete the process and submit the job as a Benchmark, they click on the "Create Job" button.
  a. Initialize a Javascript variable "job" and build a string with the jobid, baseurl, screen dimensions, window dimensions, and the cases built from the session. This is the script
  b. Perform an ajax call to the ējis™ backend with the JSON version of the script.
  c. Close the window with the target website and plugin panel.
  d. Present a dialog message to the user informing that the job was submitted.

It is noted that the web browser plugin described herein is a customized, special-purpose software plugin which is executed by the web browser, which itself executes on a user's local computer system (e.g., smart phone, computer system, tablet, etc.). The plugin communicates with one or more backend (remote) computer systems, and both the plugin and the backend computer system provide the automatic variance detection functions described herein.

Importantly, the systems and methods disclosed herein allow provide a significant advantage in that the system can be used to automatically detect whether a "production" version of a website is correctly operating and, most importantly, correctly presenting desired assets (e.g., content) to the user and in accordance with expected outcomes by illustrating for the user instances where variances are detected. By flexibly allowing the user to identify assets for which variance detection is desired and allowing the system to focus only on such assets, the system saves time, effort, and computing resources. Moreover, by "de-coupling" assets from web pages (e.g., by allowing the user to do variance detection at a granular level with in a particular web page as noted above, such as by detecting for changes in image locations, content locations within a page, image resolutions, advertisement "area" taken up within a certain page by an advertisement, etc.), the system allows for rich and automatic detection of variance in assets present within web pages. By way of example, using the system, a provider of advertising content can determine whether an advertisement has been placed at the proper location within a web page, whether the advertisement is rendered by the web page in way that advertisement takes up expected screen area, whether graphical elements corresponding to the advertisement are rendered with the correct resolution, whether any links associated with the advertisement are currently functioning, etc.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A system for automatically monitoring variations in a target web page, comprising:
  a local computer system executing a web browser;
  a plugin executed by the web browser of the local computer system, the plugin causing the web browser to:
    display the target web page in the web browser, and
    allow a user to select one or more elements of the target web page for which the user desires automatic variance detection; and
  a remote computer system in communication with the local computer system, the remote computer system:
    receiving the one or more elements selected by the user using the plugin,
    processing the target web page to automatically compare, over a period of time, sections of code representations of the target web page and pixel rendering of the one or more elements of the target web page to respective benchmark iterations of the target web page, to identify whether the one or more elements of the target web page have been varied, and generating and transmitting a report to the user indicating whether the one or more elements of the target web page have been varied;

wherein the plugin displays a graphical representation and the code representations of the target web page, such that: (i) variances in the one or more elements of the target web page that are not visible in the code representations of the target web page are visible in the graphical representation of the target web page; and (ii) other variances in the one or more elements of the target web page that are not visible in the graphical representation of the target web page are visible in the code representations of the target web page, and wherein the remote computer system determines analytics relating to the one or more elements of the target web page, the analytics including: a first number of times the one or more elements of the target web page are shown to an audience; a second number of times the one or more elements are correctly rendered by the target web page in accordance with a corporate brand standard; and a third number of times the one or more elements are incorrectly rendered by the target web page in violation of the corporate brand standard.

2. The system of claim 1, wherein the plugin causes the web browser to generate a first display region displaying the target web page and a plugin panel below the target web page.

3. The system of claim 2, wherein the first display region allows the user to select the one or more elements of the target web page by clicking on the one or more elements and defining an inspector element for each of the one or more elements.

4. The system of claim 3, wherein the plugin panel generates a recorder element for each of the inspector elements and displays a list of each recorder element.

5. The system of claim 3, wherein the plugin generates an inspector detail panel which allows the user to define detailed information about each inspector element.

6. The system of claim 4, wherein the plugin transmits information about the inspector elements and the recorder elements to the remote computer system.

7. The system of claim 6, wherein the remote computer system processes the information about the inspector elements and the recorder elements to control the automatic variance detection for the one or more elements of the target web page.

8. The system of claim 1, wherein the plugin causes the web browser to:
allow the user to select a link on the target web page;
display a linked web page corresponding to the link in the web browser; and
allow the user to select one or more further elements of the linked web page for which the user desires additional automatic variance detection.

9. The system of claim 8, wherein the remote computer system:
receives the one or more further elements selected by the user using the plugin;
processes the linked web page to automatically identify whether the one or more further elements of the linked web page have been varied; and
indicates whether the one or more further elements of the linked web page have been varied in the report.

10. The system of claim 1, wherein the plugin causes the web browser to:

display a benchmark view and a variance output view, wherein the benchmark view displays the target web page at a point in time when the user sets a benchmark, and the variance output view displays the target web page in real-time; and indicate on at least one of the benchmark view or the variance output view whether the one or more elements of the target web page have been varied.

11. The system of claim 10, wherein the benchmark view and the variance output view are each a graphical view of the target web page.

12. The system of claim 11, wherein in the graphical view, the one or more elements of the target web page having been varied comprise: a change in image content, a distorted or blurry image, a change in image location, a change image size, or a changed text.

13. The system of claim 10, wherein the benchmark view and the variance output view are each an HTML code view of the target web page.

14. A method for automatically monitoring variations in a target web page, comprising:
providing a local computer system executing a web browser and a plugin executed by the web browser of the local computer system;
displaying the target web page in the web browser;
allowing a user to select one or more elements of the target web page for which the user desires automatic variance detection;
receiving at a remote computer system in communication with the local computer system the one or more elements selected by the user using the plugin;
processing the target web page to automatically compare, over a period of time, sections of code representations of the target web page and pixel rendering of the one or more elements of the target web page to respective benchmark iterations of the target web page, to identify whether the one or more elements of the target web page have been varied;
generating and transmitting a report to the user indicating whether the one or more elements of the target web page have been varied;
displaying a graphical representation and the code representations of the target web page, such that: (i) variances in the one or more elements of the target web page that are not visible in the code representations of the target web page are visible in the graphical representation of the target web page; and (ii) other variances in the one or more elements of the target web page that are not visible in the graphical representation of the target web page are visible in the code representations of the target web page; and
determining analytics relating to the one or more elements of the target web page, the analytics including: a first number of times the one or more elements of the target web page are shown to an audience; a second number of times the one or more elements are correctly rendered by the target web page in accordance with a corporate brand standard; and a third number of times the one or more elements are incorrectly rendered by the target web page in violation of the corporate brand standard.

15. The method of claim 14, further comprising generating a first display region displaying the target web page and a plugin panel below the target web page.

16. The method of claim 15, wherein the first display region allows the user to select the one or more elements of the target web page by clicking on the one or more elements and defining an inspector element for each of the one or more elements.

17. The method of claim 16, further comprising generating a recorder element for each of the inspector elements and displaying a list of each recorder element.

18. The method of claim 16, further comprising generating an inspector detail panel which allows the user to define detailed information about each inspector element.

19. The method of claim 17, further comprising transmitting information about the inspector elements and the recorder elements to the remote computer system.

20. The method of claim 19, further comprising processing at the remote computer system the information about the inspector elements and the recorder elements to control the automatic variance detection for the one or more elements of the target web page.

21. The method of claim 14, further comprising:
allowing the user to select a link on the target web page;
displaying a linked web page corresponding to the link in the web browser; and
allowing the user to select one or more further elements of the linked web page for which the user desires additional automatic variance detection.

22. The method of claim 21, further comprising:
receiving the one or more further elements selected by the user using the plugin;
processing the linked web page to automatically identify whether the one or more further elements of the linked web page have been varied; and
indicating whether the one or more further elements of the linked web page have been varied in the report.

23. The method of claim 14, further comprising:
displaying a benchmark view and a variance output view, wherein the benchmark view displays the target web page at a point in time when the user sets a benchmark, and the variance output view displays the target web page in real-time; and
indicating on at least one of the benchmark view or the variance output view whether the one or more elements of the target web page have been varied.

24. The method of claim 23, wherein the benchmark view and the variance output view are each a graphical view of the target web page.

25. The method of claim 24, wherein in the graphical view, the one or more elements of the target web page having been varied comprise: a change in image content, a distorted or blurry image, a change in image location, a change image size, or a changed text.

26. The method of claim 23, wherein the benchmark view and the variance output view are each an HTML code view of the target web page.

* * * * *